United States Patent [19]

Enelow et al.

[11] 4,237,536
[45] Dec. 2, 1980

[54] SYSTEM FOR INDICATING AND CONTROLLING DISPENSING OF BEVERAGES

[75] Inventors: Michael R. Enelow, Miami Lakes; Michael Levy, Plantation; William P. Porter, Coral Springs, all of Fla.

[73] Assignee: M.R.E. Enterprises, Inc., Miami Lakes, Fla.

[21] Appl. No.: 950,810

[22] Filed: Oct. 12, 1978

[51] Int. Cl.³ .................. G06F 15/20; B67D 5/06
[52] U.S. Cl. .................... 364/465; 222/23; 222/129.3; 340/618; 364/479; 364/509; 364/900
[58] Field of Search ............ 364/465, 509, 510, 200, 364/900, 479; 222/129, 129.1, 129.2, 129.3, 129.4, 23, 25–28; 235/92 FL; 340/612, 618, 711, 177 R

[56] References Cited
U.S. PATENT DOCUMENTS

| 2,648,058 | 8/1953 | Breedlove | 340/618 |
|---|---|---|---|
| 3,261,506 | 7/1966 | Chenoweth et al. | 222/134 |
| 3,267,436 | 8/1966 | Alpert et al. | 364/900 |
| 3,370,753 | 2/1968 | Yingst et al. | 222/129.1 |
| 3,599,833 | 8/1971 | Reichenberger | 222/23 |
| 3,629,858 | 12/1971 | Hayakawa et al. | 364/900 |
| 3,656,145 | 4/1972 | Proops | 222/30 |
| 3,675,820 | 7/1972 | Newberry et al. | 222/129.4 |
| 3,688,947 | 9/1972 | Reichenberger | 222/129.3 |
| 3,814,285 | 6/1974 | Craig | 222/2 |
| 3,858,758 | 1/1975 | May | 364/465 |
| 3,920,149 | 11/1975 | Fortino et al. | 222/129.3 |
| 3,940,019 | 2/1976 | Kross et al. | 222/30 |
| 3,949,207 | 4/1976 | Savary et al. | 364/510 |
| 4,036,403 | 7/1977 | Barnes et al. | 222/23 |
| 4,075,460 | 2/1978 | Gorgens | 364/465 |
| 4,107,777 | 8/1978 | Pearson et al. | 364/521 |

Primary Examiner—Errol A. Krass
Attorney, Agent, or Firm—Lowe, King, Price and Becker

[57] ABSTRACT

The amount of beverage dispensed from each of a plurality of reservoirs in units at a plurality of remote locations, such as hotel rooms, is controlled and indicated. A central console, such as a hotel front desk, includes a keyboard for deriving data and command signals, as well as a data processor that responds to the data and command signals to derive addressing and command signals for the units. A display at the central console responds to the keyboard data and command signals to display the keyboard data signals, as well as data signals derived from addressed units. At each of the units, a liquid flow controller for each reservoir responds to an output of a data processor at the unit. The unit data processor responds to a customer input and command signals from the console to activate the flow controller. In response to a unit being addressed by the console, the unit data processor supplies signals to the console to indicate the amount of beverage dispensed from the reservoirs.

21 Claims, 31 Drawing Figures

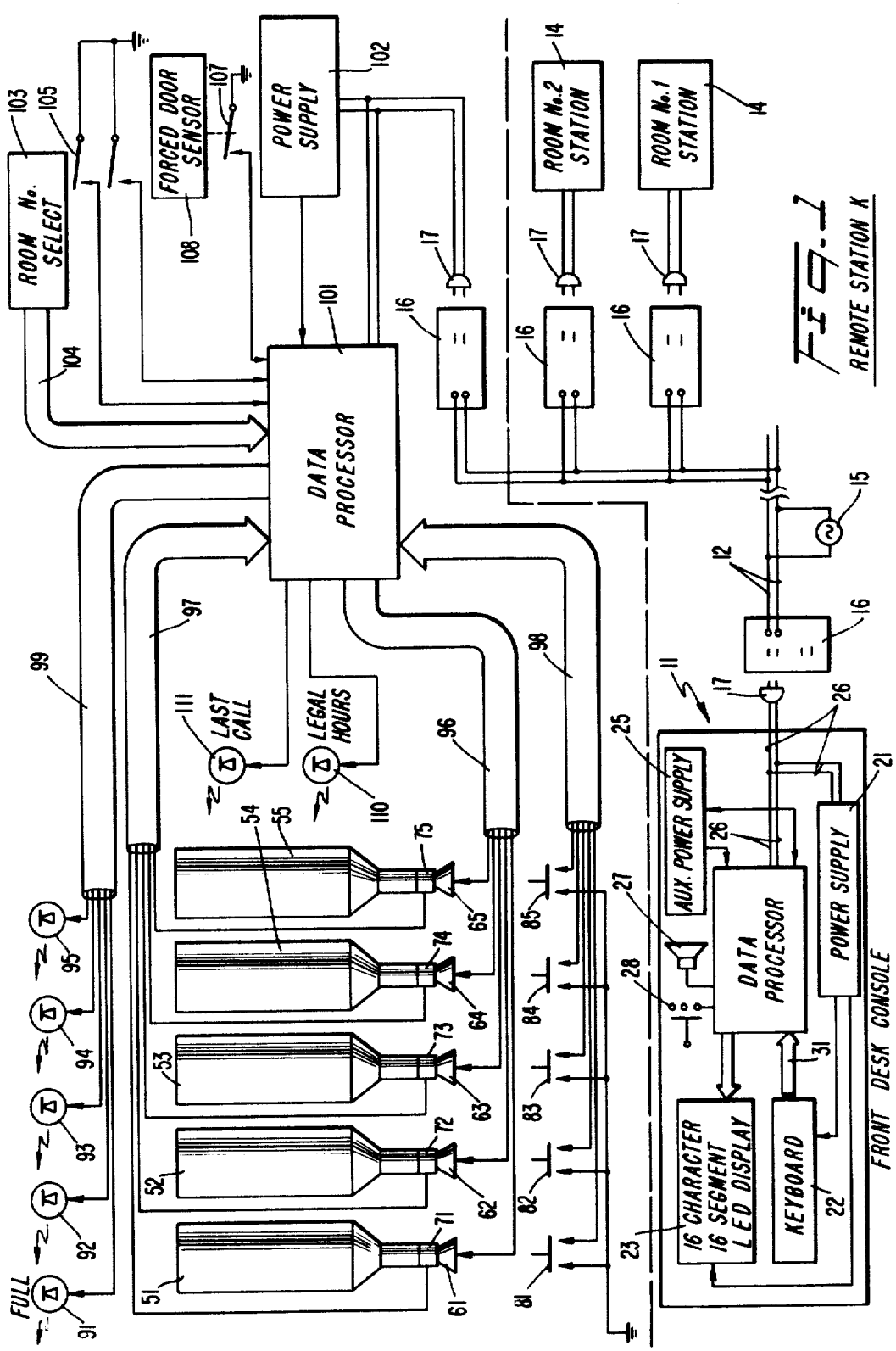

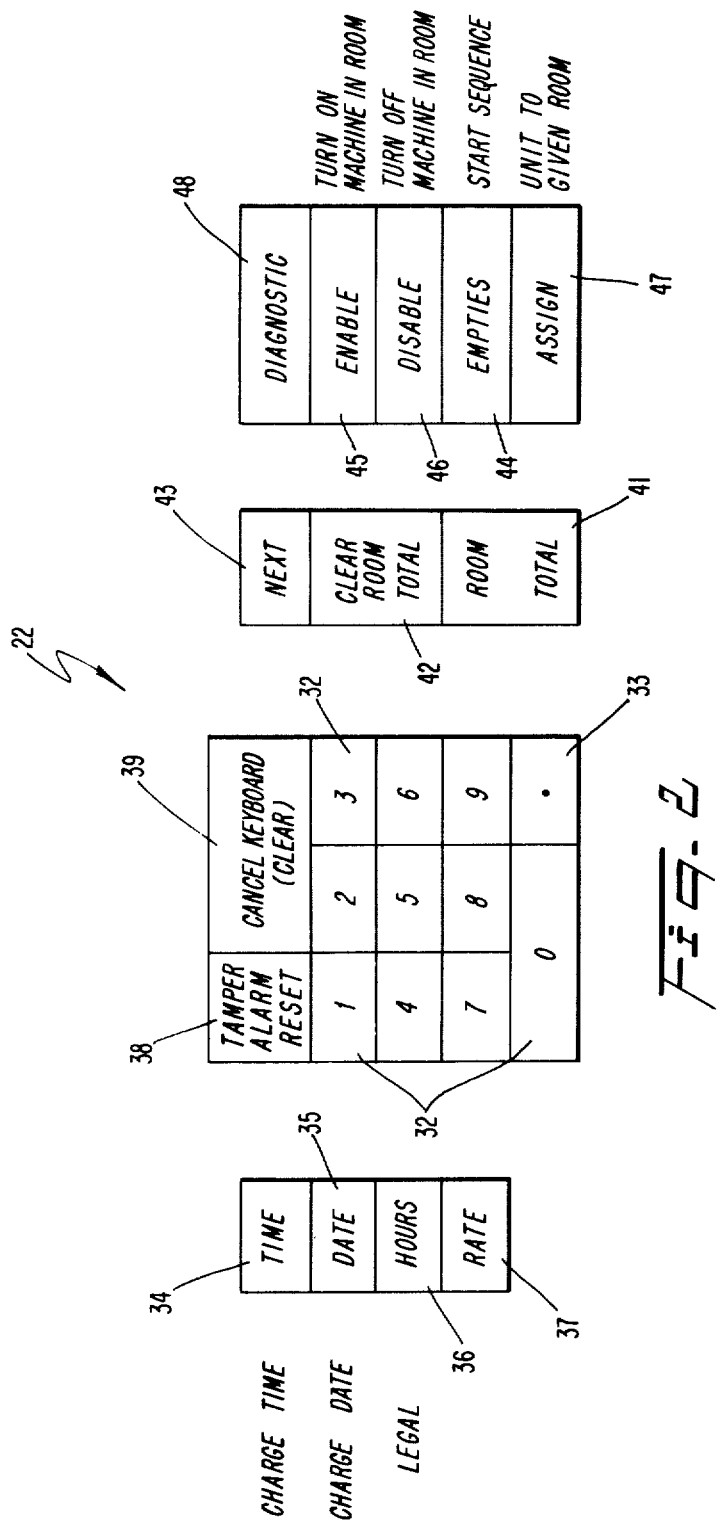

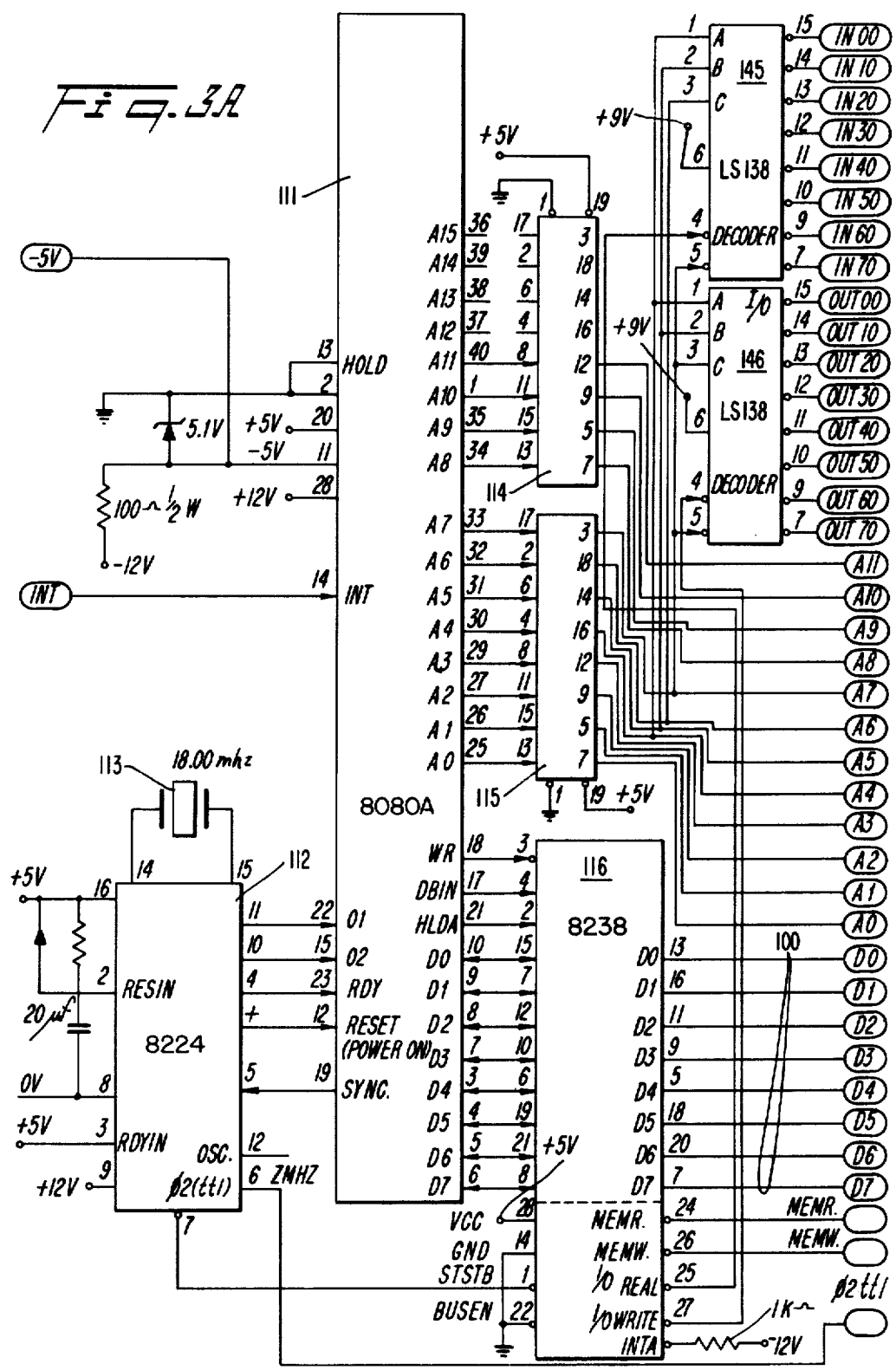

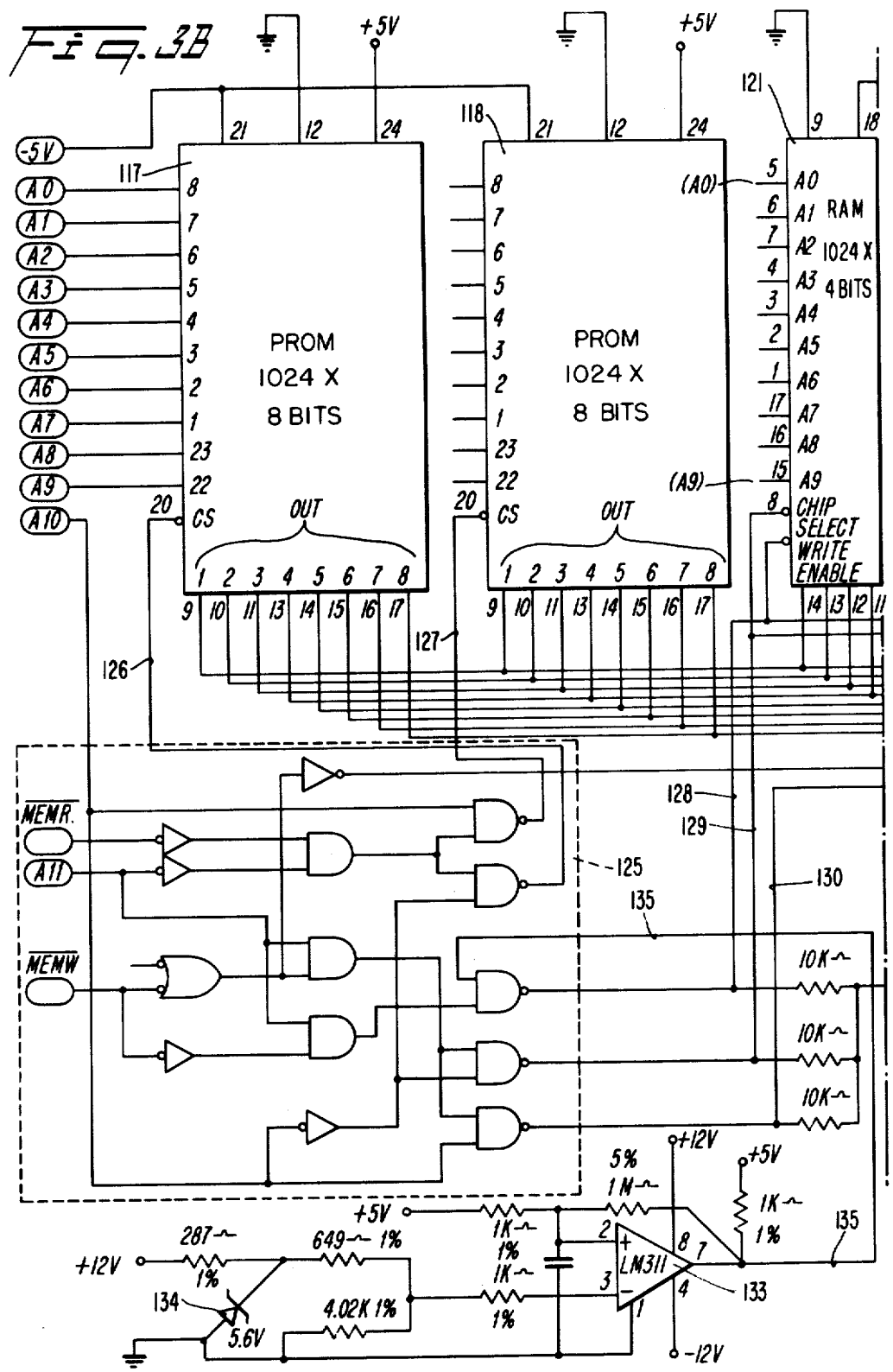

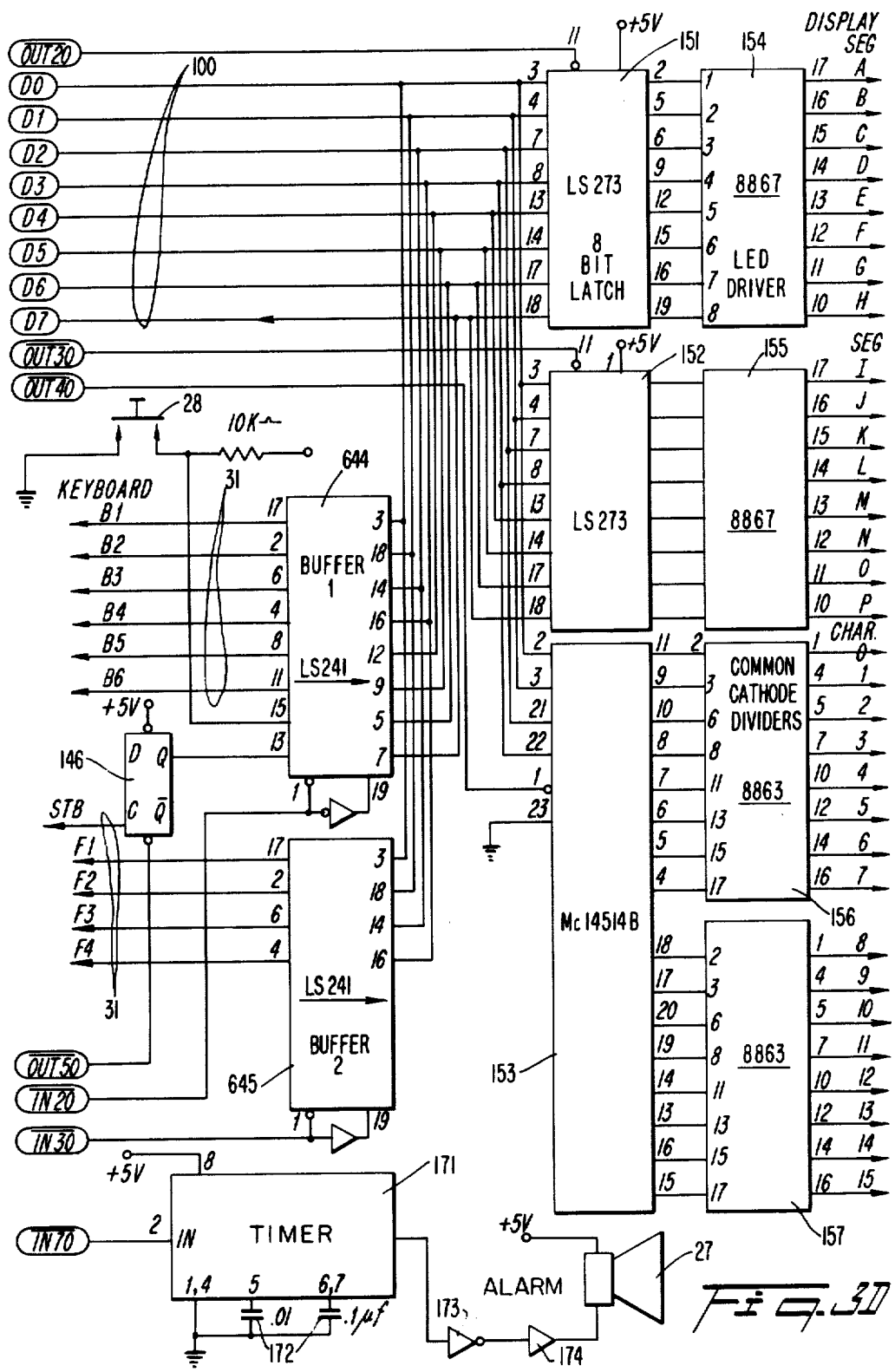

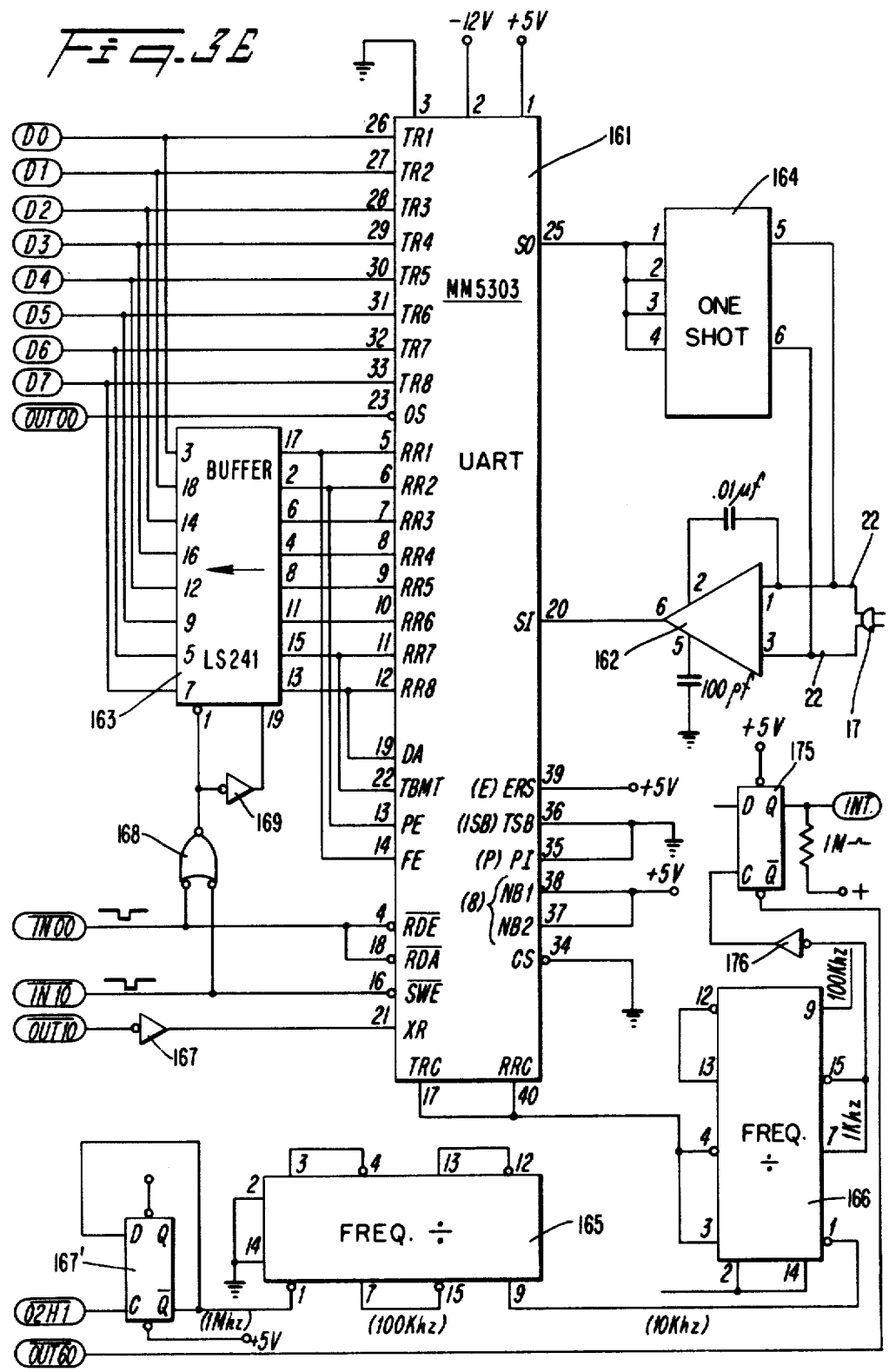

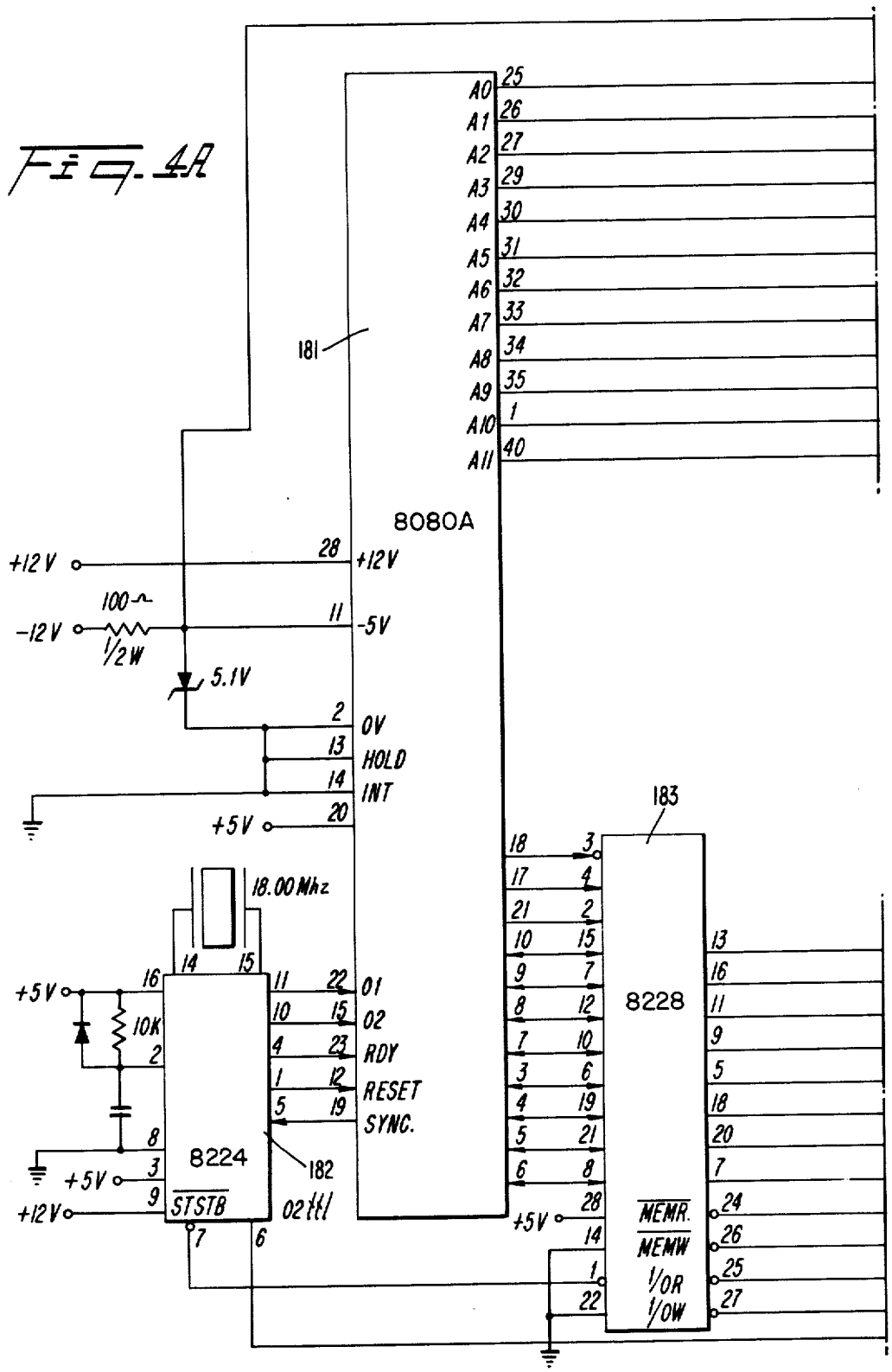

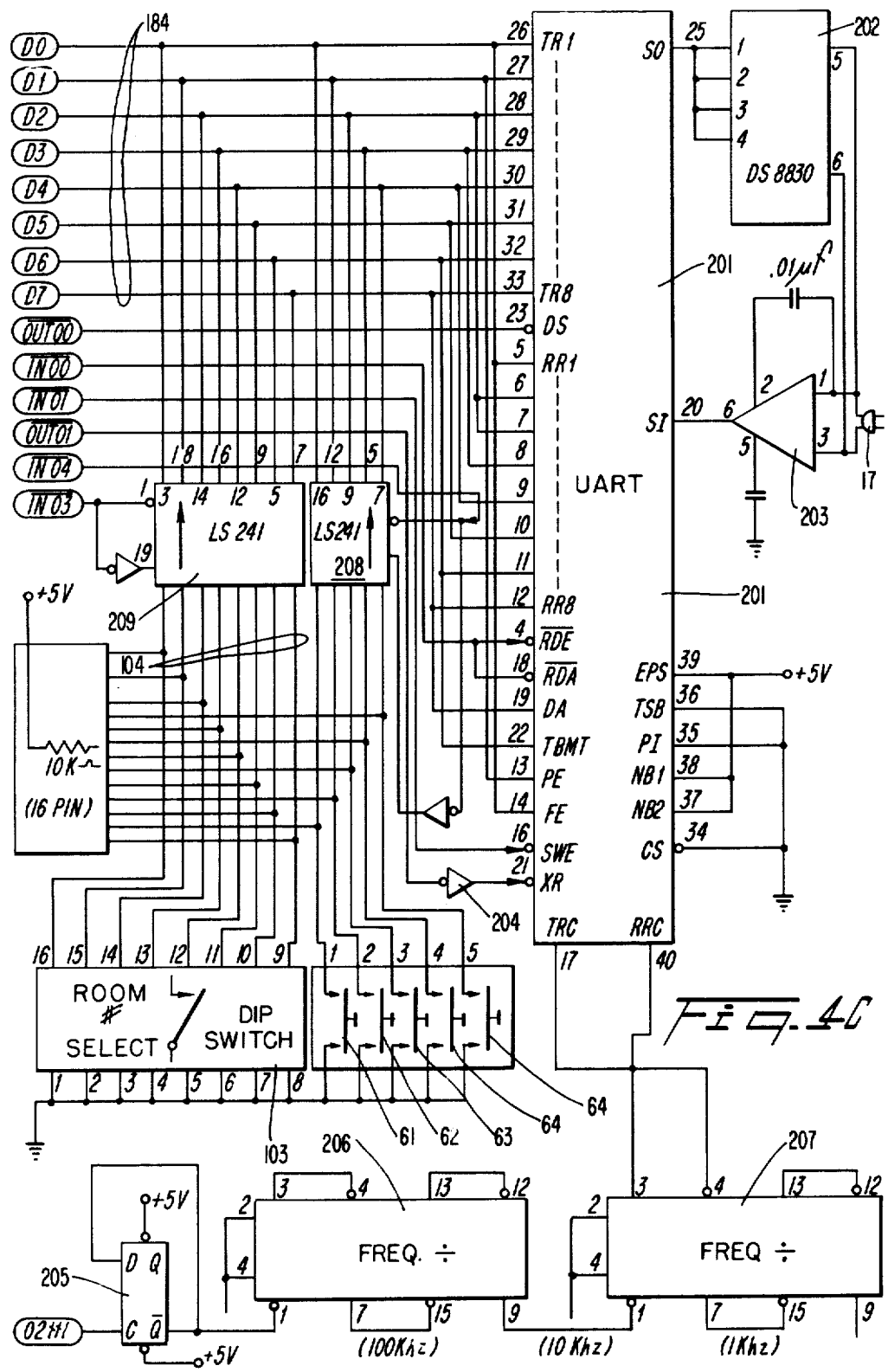

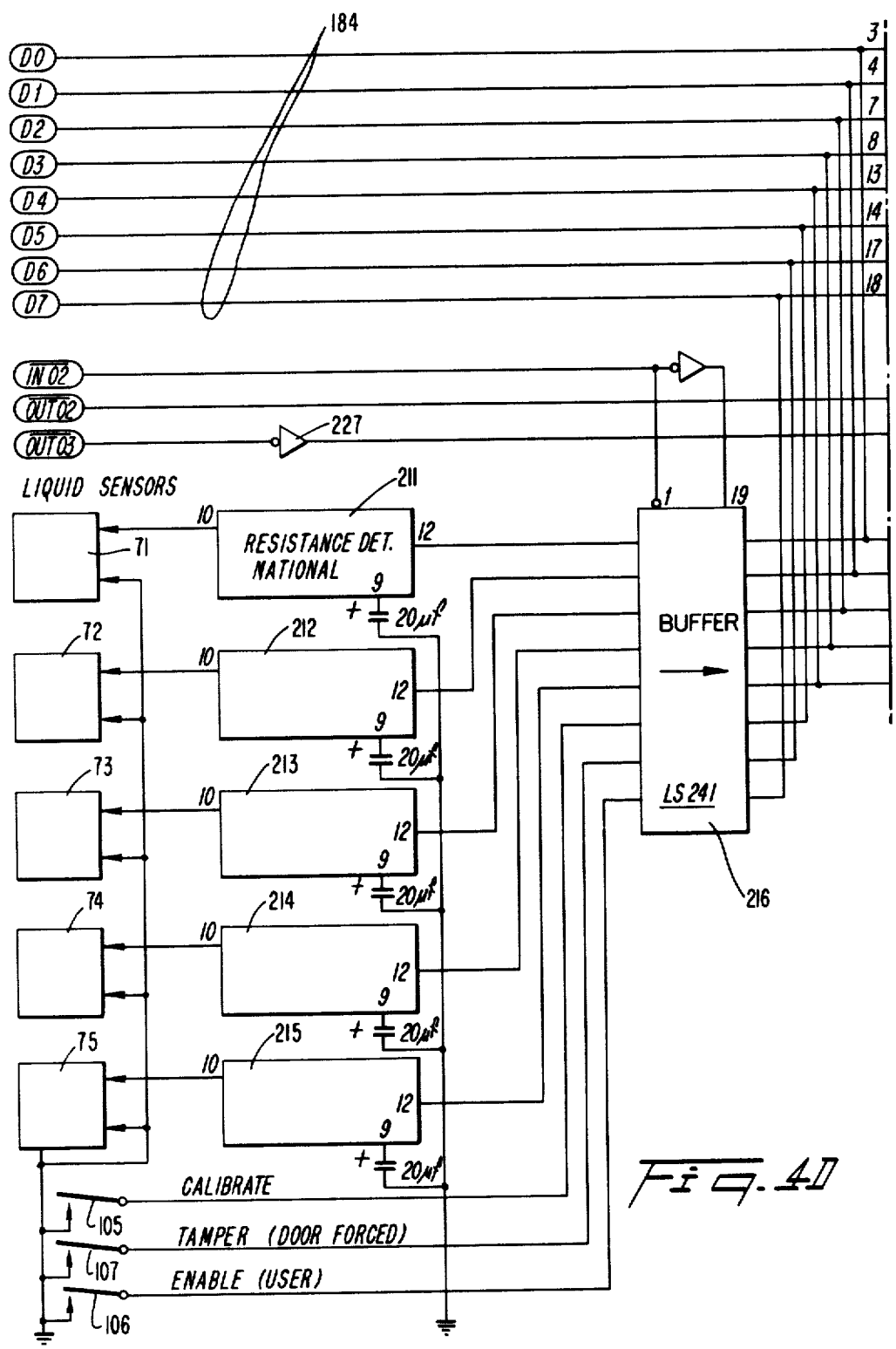

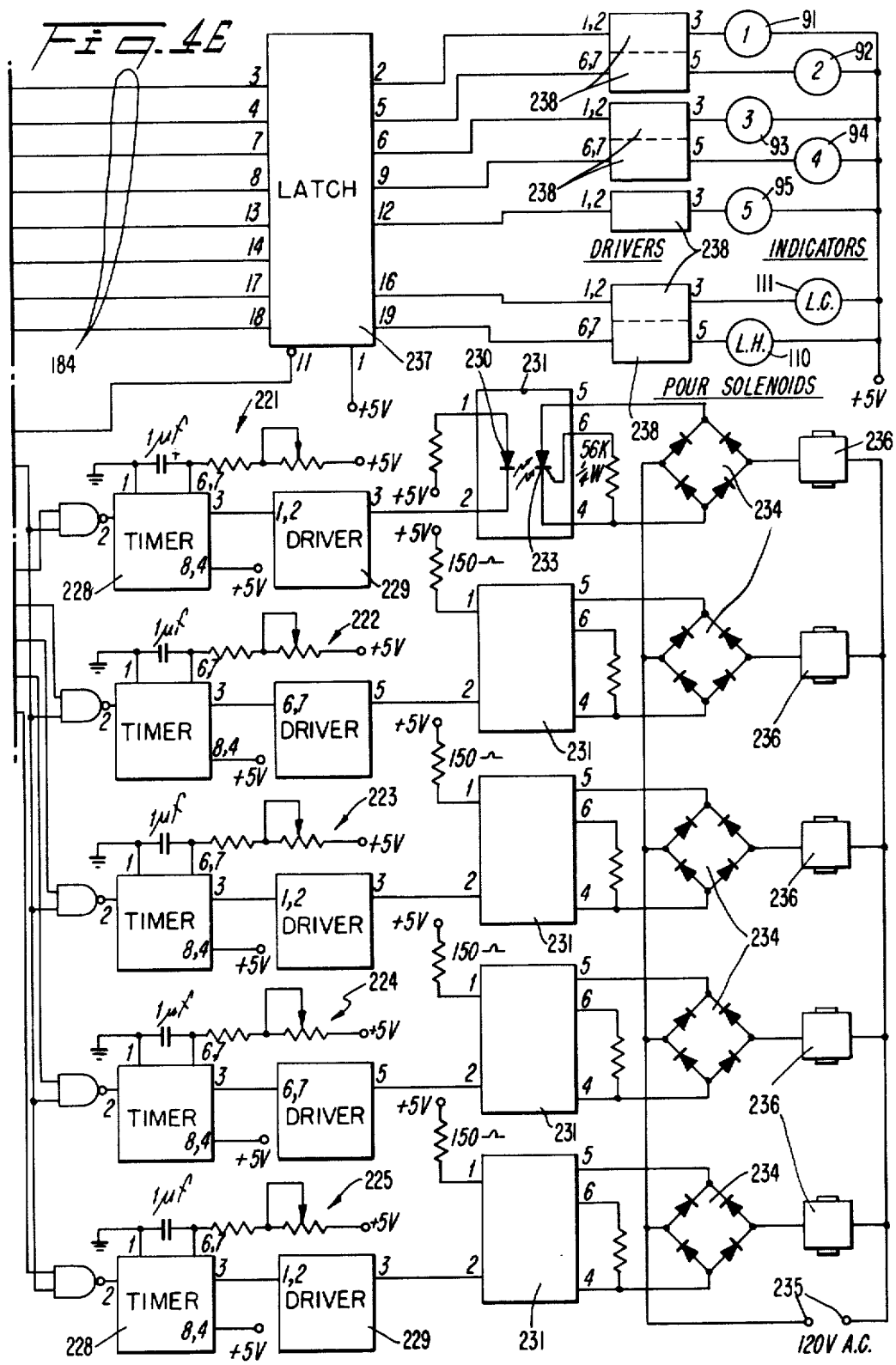

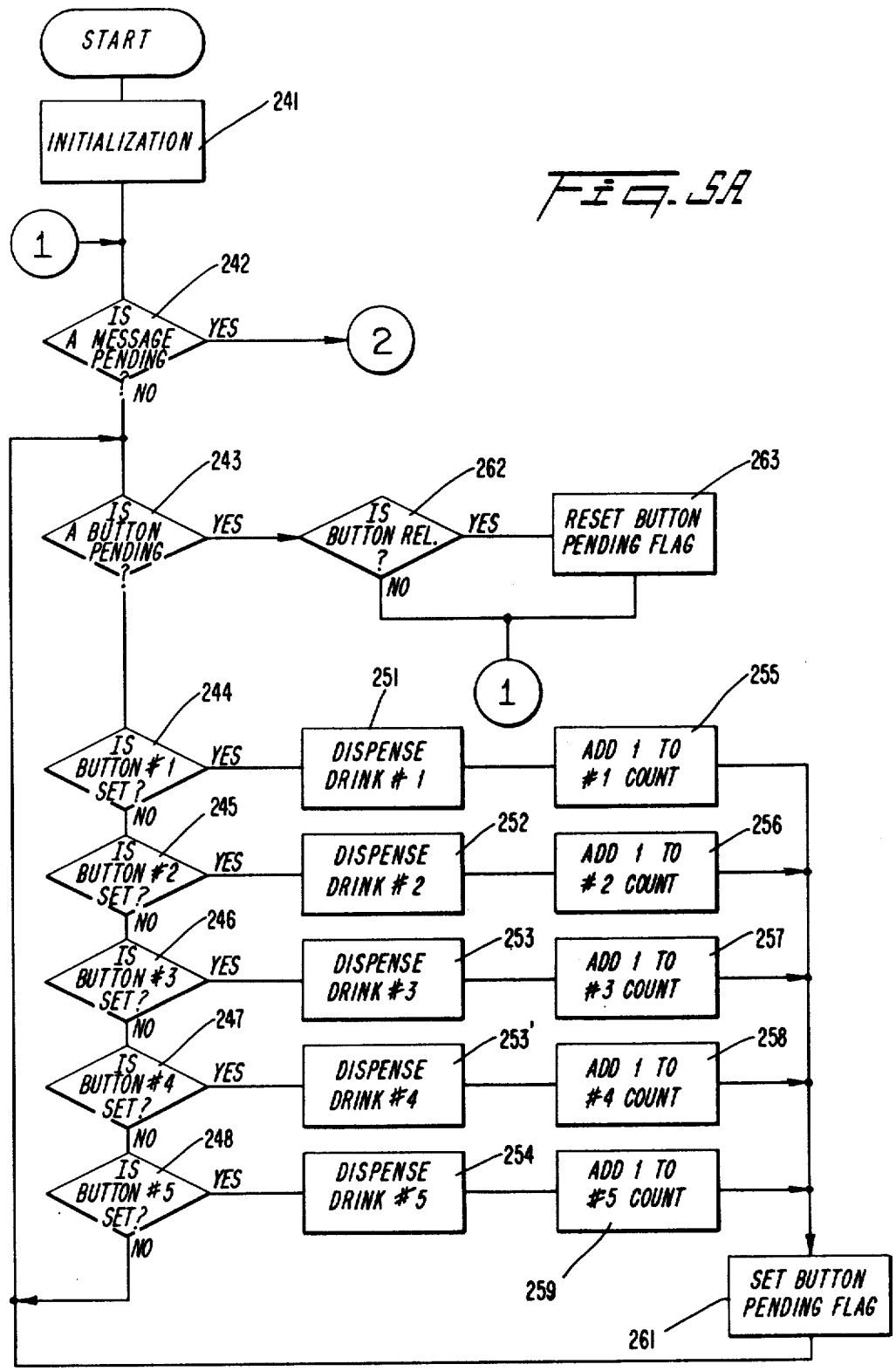

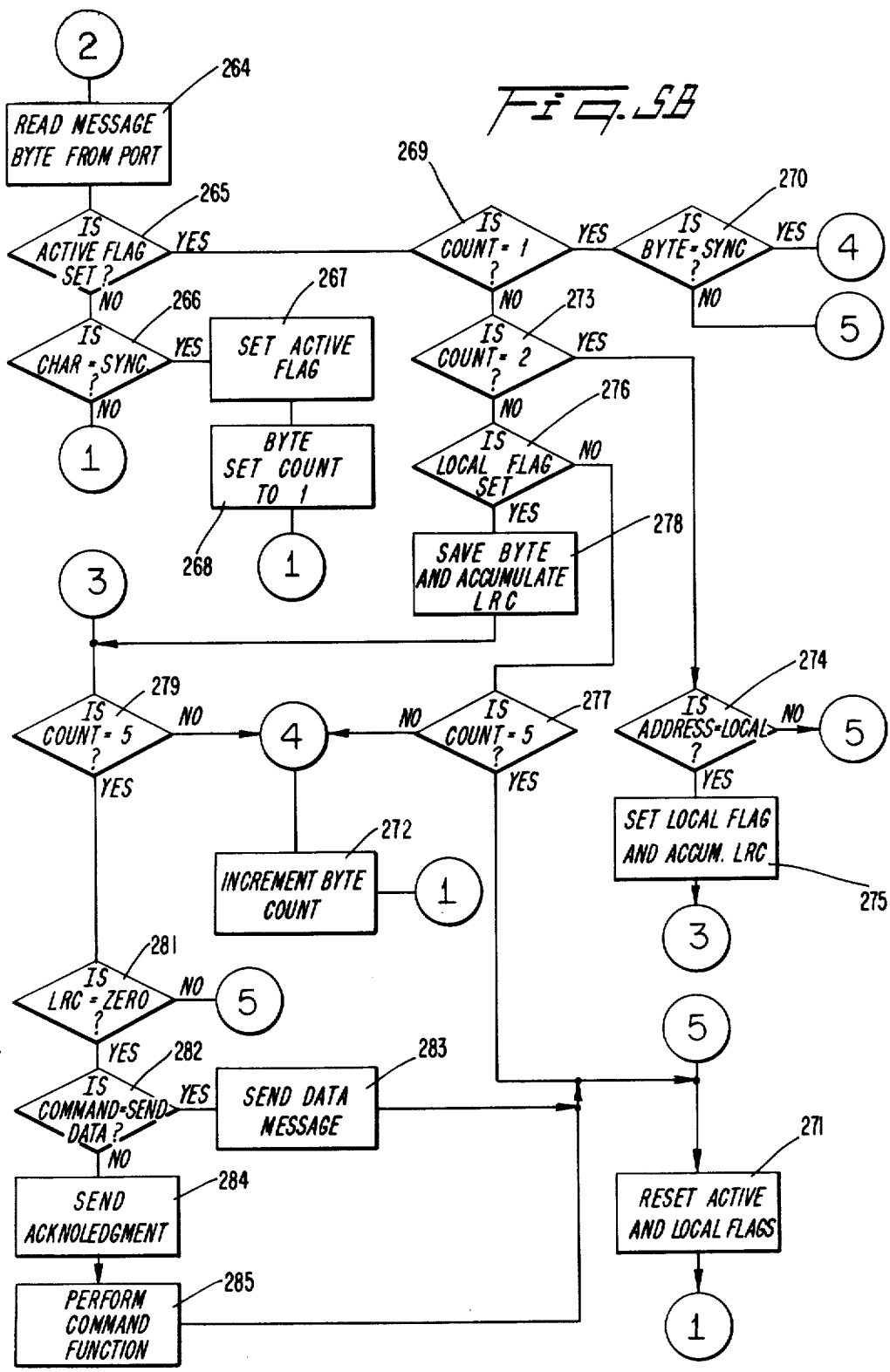

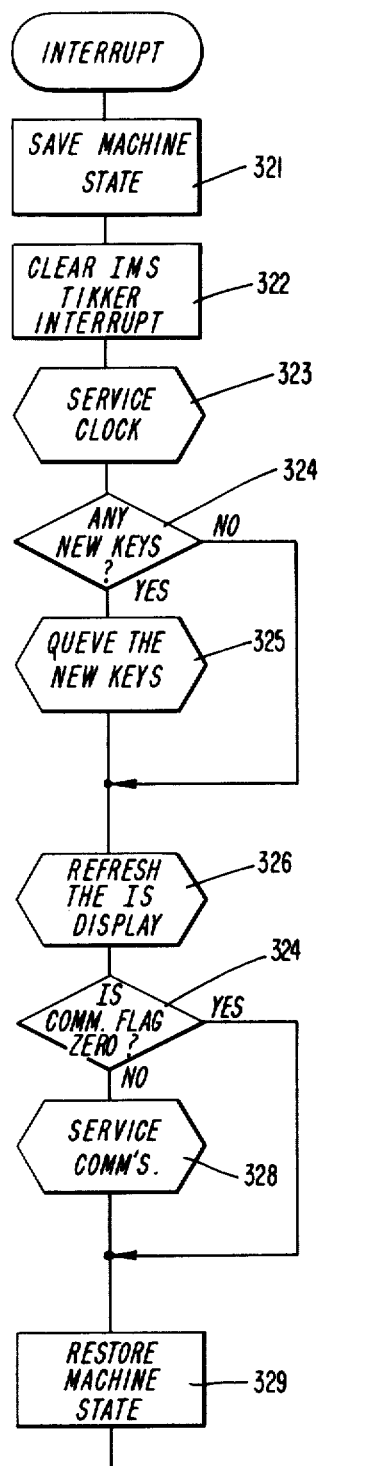
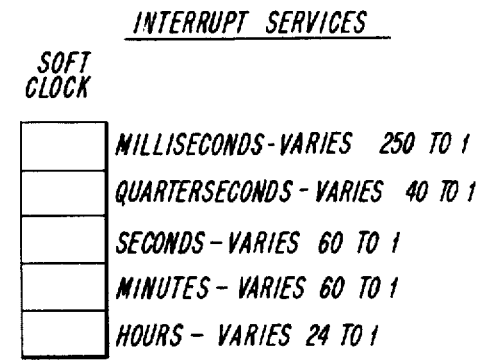
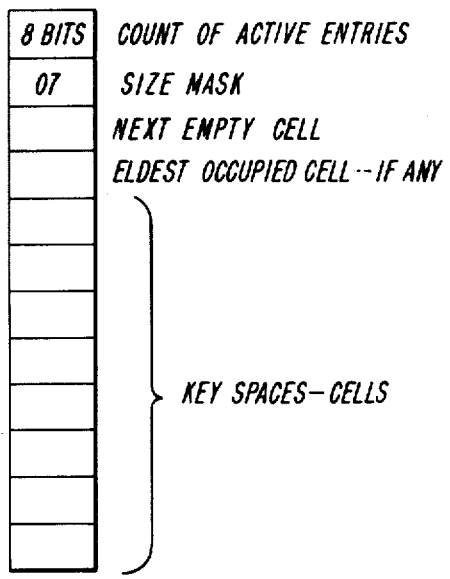
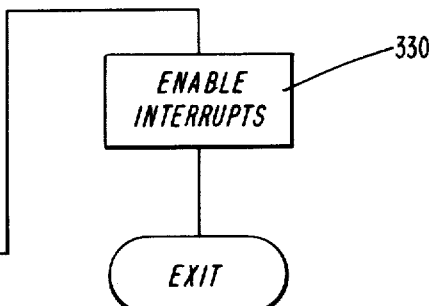
Fig. 6B

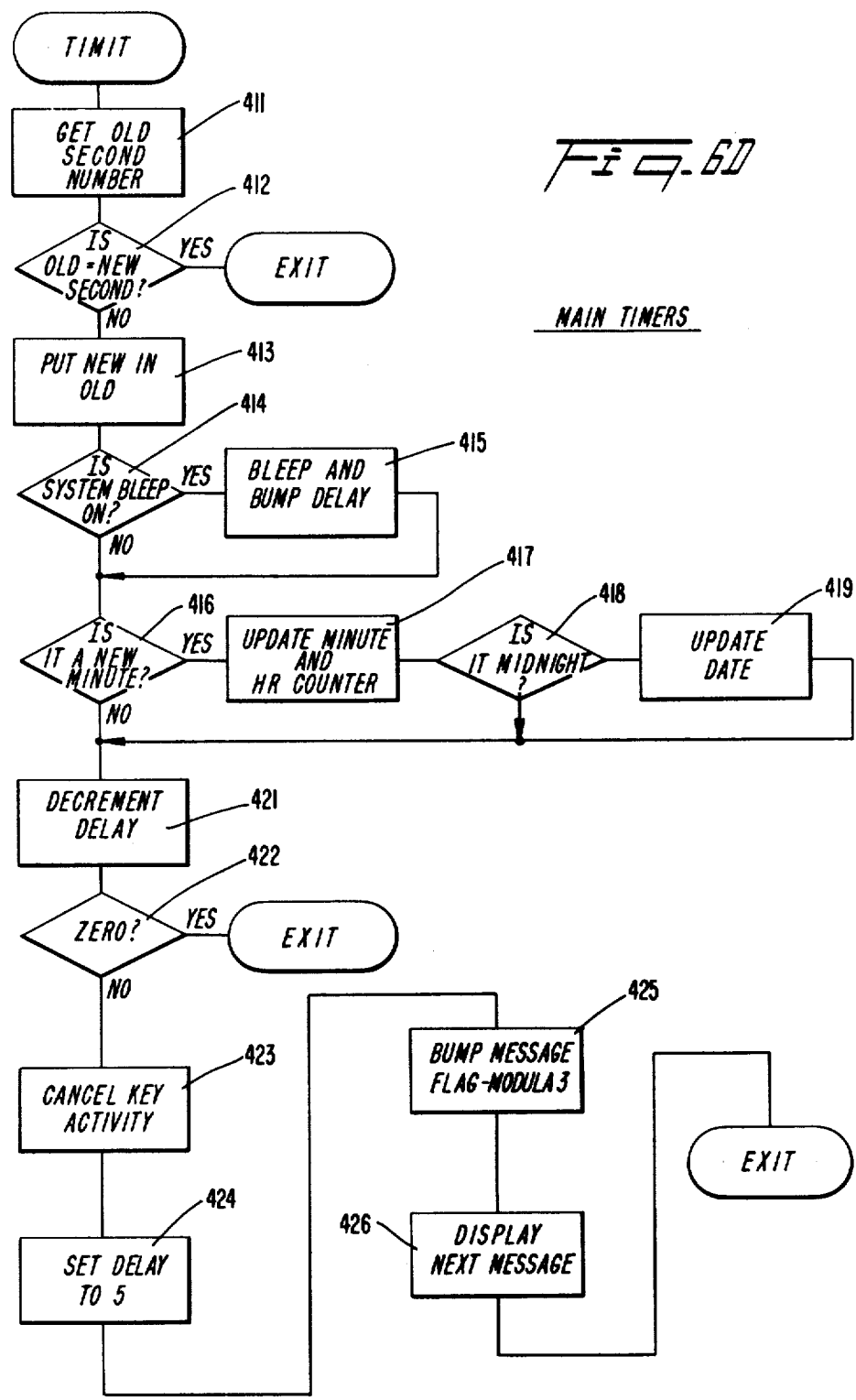

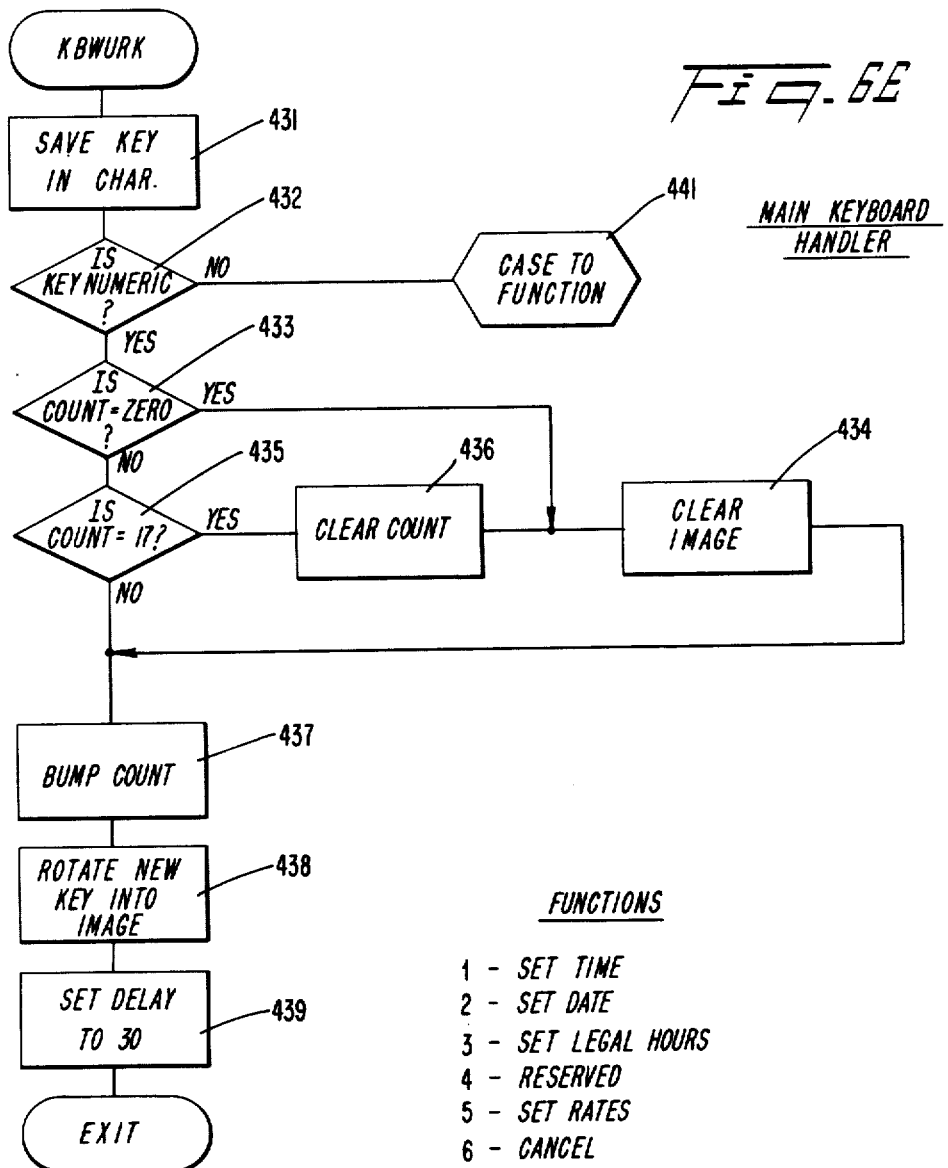

FUNCTION KEYS

FUNCTION KEYS

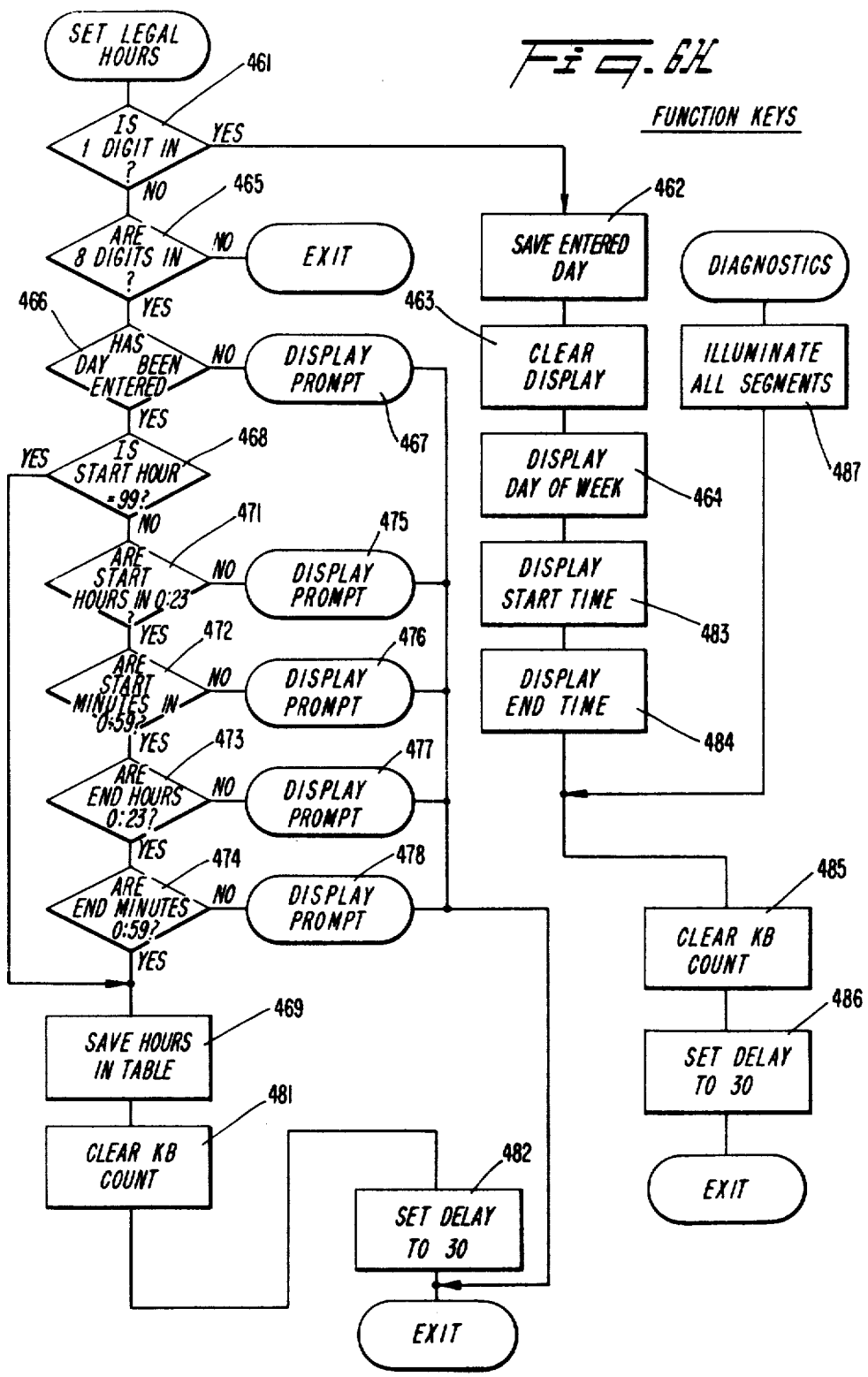

FUNCTION KEYS

FUNCTION KEYS

FUNCTION KEYS

FUNCTION KEYS

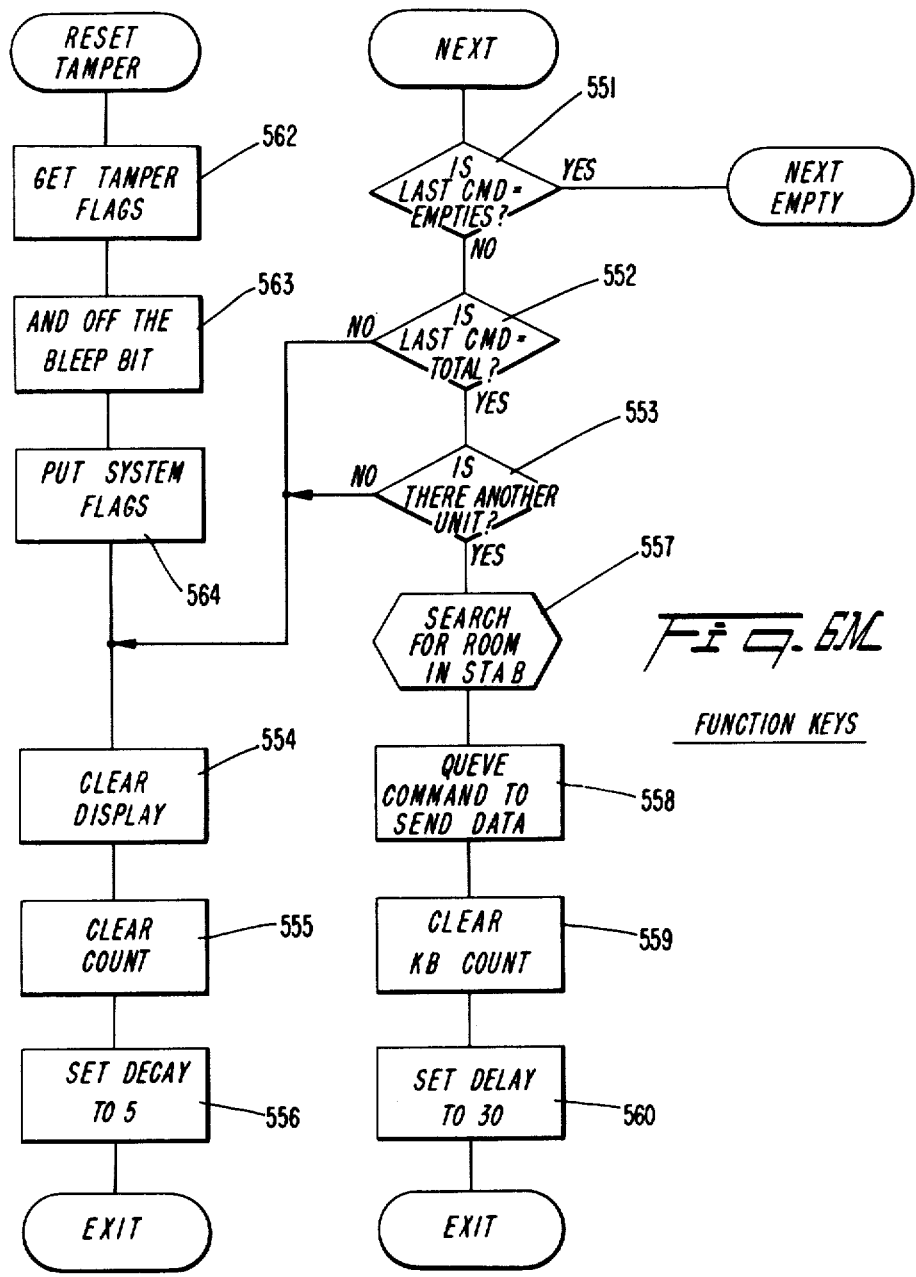

FUNCTION KEYS

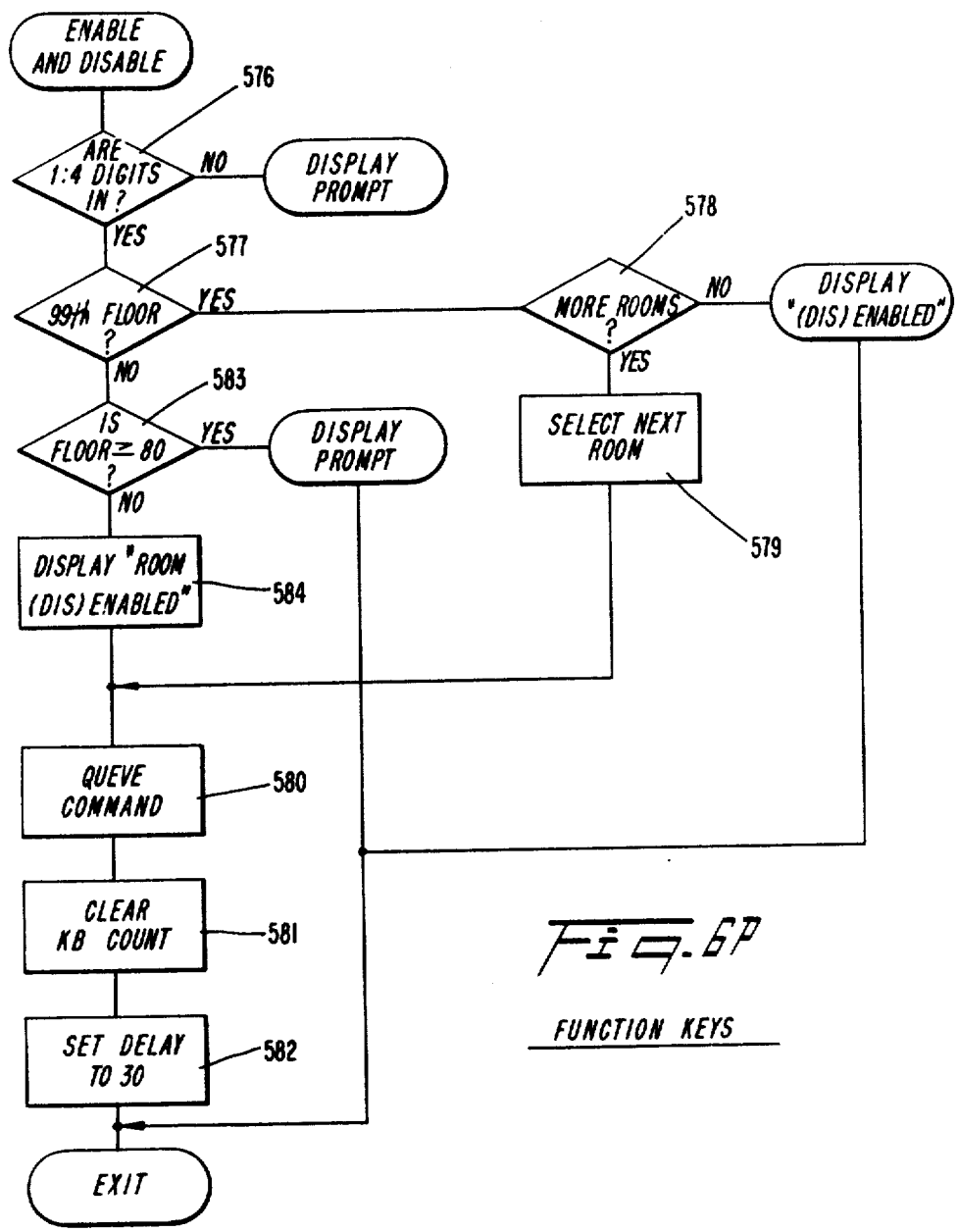

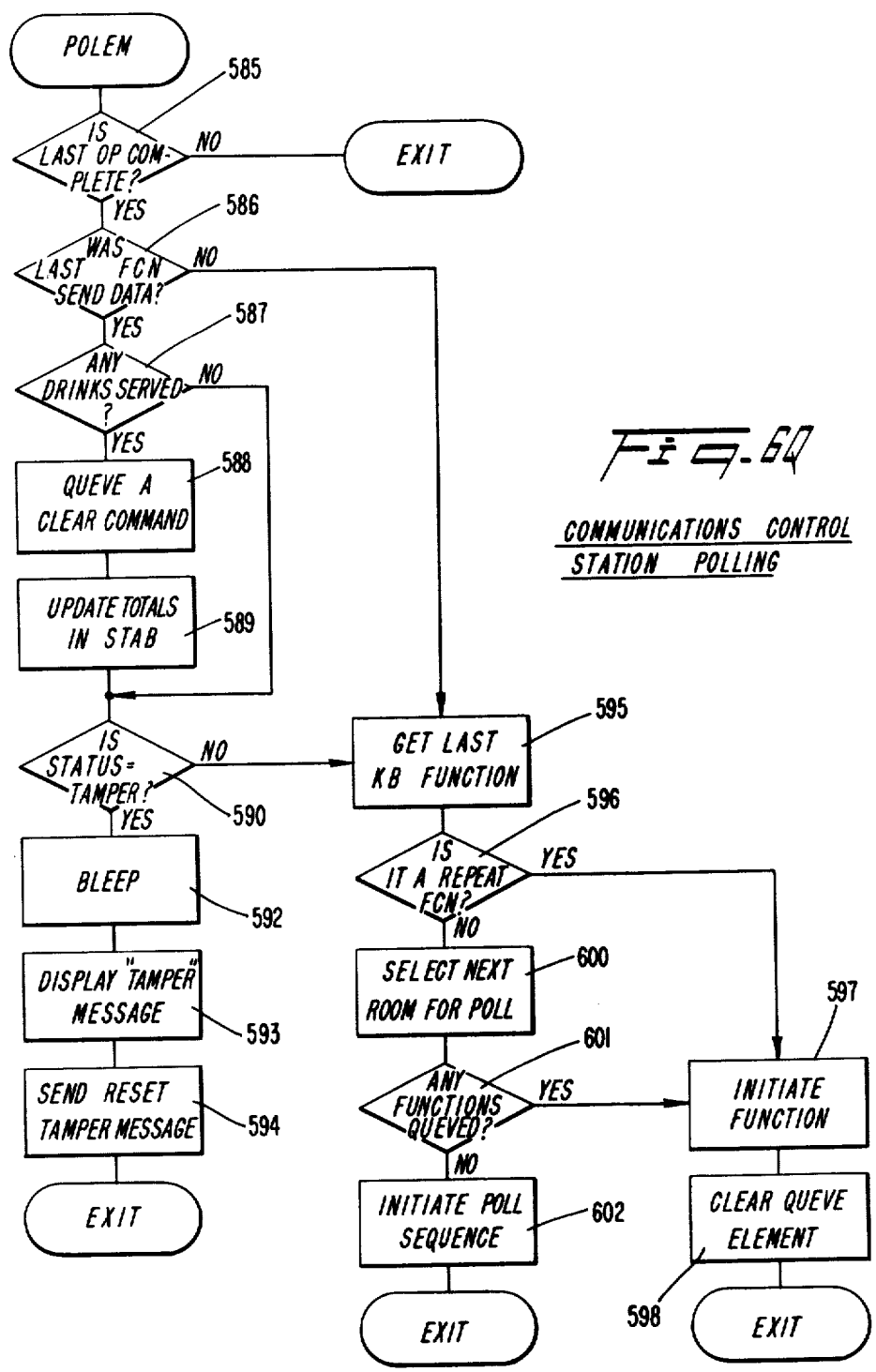

SYSTEM FOR INDICATING AND CONTROLLING DISPENSING OF BEVERAGES

TECHNICAL FIELD

The present invention relates generally to a system for indicating and controlling the dispensing of beverages from a plurality of remote locations, and, more particularly, to a beverage dispensing system wherein a central station includes a data processor and a keyboard, and each of the remote stations includes a data processor that is addressed by signals from the central station.

BACKGROUND ART

A commercial system has been developed whereby beverages are dispensed from a plurality of reservoirs, at each of a plurality of remote locations, such as hotel rooms. In response to each dispensing operation, a signal is transmitted to a central location, such as the front desk of the hotel. At the central location, a counter responds each time a beverage is dispensed from each location, to provide a count indicative of the total number of dispensing operations at each location. Generally, alcoholic beverages are dispensed from the reservoirs whereby the count is indicative of the total number of drinks that are served in a hotel room. When a user of the hotel room checks out, the total number of drinks, as indicated by the counter, is multiplied by a fixed factor, indicative of the cost of each drink, to derive an indication of the amount of money to be added to a room rental bill of an occupant of the room.

The prior art system employs relays at the remote locations and electromechanical counters at the central station. For each remote location, there is a separate lead extending from the central console to the relays. Hence, installation and maintenance of the prior art system are difficult, time consuming and expensive, and become onerous for a system involving more than 20 remote locations. In addition, the space required at the central console for more than 20 units is extensive.

The prior art system also suffers because it is relatively inflexible. If beverages, such as liquor, can be dispensed only during certain times, manual operations must be performed to disable the remote stations. Also, if it is desired to change the location of the dispensing apparatus, for example, from one room to another, or to selectively install more than one dispensing installation in a single room, as may be desirable for receptions, a general rewiring is necessary. Obviously, such a rewiring is generally not feasible. In the prior art system, the use of only one wire between each remote location and the central console, severely limits the amount of data which can be transmitted between the remote locations and the central stations. Thereby the transmission between the remote location and central console of valuable information is limited; exemplary of this information are indications of which reservoirs are empty and which locations are properly operating. It is therefore necessary for an actual inspection to be made of the remote location dispensing installation to determine auxiliary information, such as which reservoirs are empty and which need maintenance. In the prior art system, it is necessary for the charge for each dispensing operation to be the same, regardless of the nature of the liquid being dispensed. This is because there is a summation of the total number of dispensing operations from each remote location, rather than an indication of the number of dispensing operations from individual reservoirs at a particular location.

It is, accordingly, an object of the present invention to provide a new and improved system for indicating and controlling the dispensing of beverages from a plurality of locations in response to communications established between the remote locations and a central station.

Another object of the invention is to provide a new and improved, flexible system that enables only a single pair of leads to communicate information from a central location to each of a plurality of remote locations, at each of which is located a plurality of beverage reservoirs.

Still another object of the invention is to provide a new and improved remote control and indicating system for plural reservoirs at each of several remote locations, wherein for each location there are performed several operations, such as determining which reservoirs are empty, as well as diagnostic procedures.

A further object of the invention is to provide a new and improved communication system for indicating and controlling the dispensing of beverages from a plurality of liquid reservoirs, at each of a plurality of locations remote from a central location, wherein the communication system and circuits associated therewith require a relatively small amount of maintenance, and wherein control and diagnostic procedures for units at the remote locations can be performed exclusively at the central station.

DISCLOSURE OF INVENTION

In accordance with the present invention, a new and improved system for indicating and controlling the dispensing of beverages from plural reservoirs at each of a plurality of remote location units includes a central console for deriving the indications and control signals for the remote units. The remote units also derive command signals in response to dispensing command inputs from customers and transduced signals responsive to reservoir conditions, such as a reservoir being empty. The console includes a keyboard for deriving data and command signals, as well as a data processor responsive to the keyboard signals as well as locally and remotely derived command signals. The data processor responds to these signals to derive addressing signals for the remote units. The console includes an electronic display responsive to the keyboard data and to the command signals.

At each of the units, a plurality of liquid flow controllers are provided, whereby one of the flow controllers is provided for each reservoir. A dispensing command input that can be activated by a room occupant is provided at each unit for each flow controller. A data processor at each remote unit selectively derives control signals for the flow of liquid from the reservoirs in response to the dispensing command input. The data processor at each unit derives signals indicative of the amount of beverage dispensed from each reservoir, i.e., counts the number of dispensed drinks. The data processor at each unit feeds signals indicative of the number of each type of dispensed drink to the central console data processor in response to an address of the unit at the particular location being transmitted to the unit data processor from the console data processor.

By employing an addressing system for the remote unit data processors, information between all of the remote units and the central console can be transmitted via only a pair of leads extending between the central console and all of the remote units. In a preferred configuration, the leads are the AC power leads of the building or buildings where the system is located. Hence, there is no need to install and maintain a multi-wire communication system.

The keyboard and data processor at the central console, and the data processor at each of the remote units, enable the present invention to have great flexibility. For example, remote indications of empties can be derived either in response to a keyboard entry for a particular remote location or in response to an automatic sequencing arrangement wherein indications of only which bottles in which remote units are displayed at the console. In addition, the present invention includes clock circuitry that keeps track of time, as a function of fractions of a second, seconds, minutes, hours, days of the week, and days of the month. The timing feature also enables automatic maintenance of legal hours for different situations, such as different legal hours on different days of the week, as well as an automatic signalling of an indication that only a few minutes remain before the remote station must become inoperative because legal hours are about to expire. In addition, different rates can be charged for drinks dispensed from different reservoirs and different rates can be charged as a function of time (happy hours). The dispensing times automatically established by the clock circuitry can be overriden at the front desk if it is desired to prevent a customer from purchasing any beverages, because, e.g. of election day.

The flexibility of the present invention enables diagnostic testing of the remote units to be performed by the single press of a key on the keyboard. It is also possible to assign multiple dispensing units, each including a plurality of dispensing reservoirs, to a single location, as may be necessary in connection with receptions. Another feature of the invention is that an alarm signal is activated at the console in response to tampering at the remote unit. Also, the flexibility of the electronic system enables features to be easily added by making a slight modification to the data processor at the central console without changing any connections between the central console and the remote locations.

It is, therefore, a further object of the invention to provide a new and improved system for indicating and controlling dispensing of beverages from a plurality of units remote from a central location, wherein the remote units and central location are connected to each other exclusively by power lines of a building or group of buildings where the system is located.

A further object of the invention is to provide a new and improved highly flexible, easily modified system for indicating and controlling the dispensing of liquids from a plurality of remote locations that are interconnected with a central console.

The above and still further objects, features, and advantages of the present invention will become apparent upon consideration of the following detailed description of one specific embodiment thereof, especially when taken in conjunction with the accompanying drawing.

BRIEF DESCRTIPTION OF DRAWINGS

FIG. 1 is an overall system diagram of a preferred embodiment of the present invention;

FIG. 2 is a view of the topological arrangement of a keyboard adapted to be utilized in connection with the system of FIG. 1;

Figure 3C:
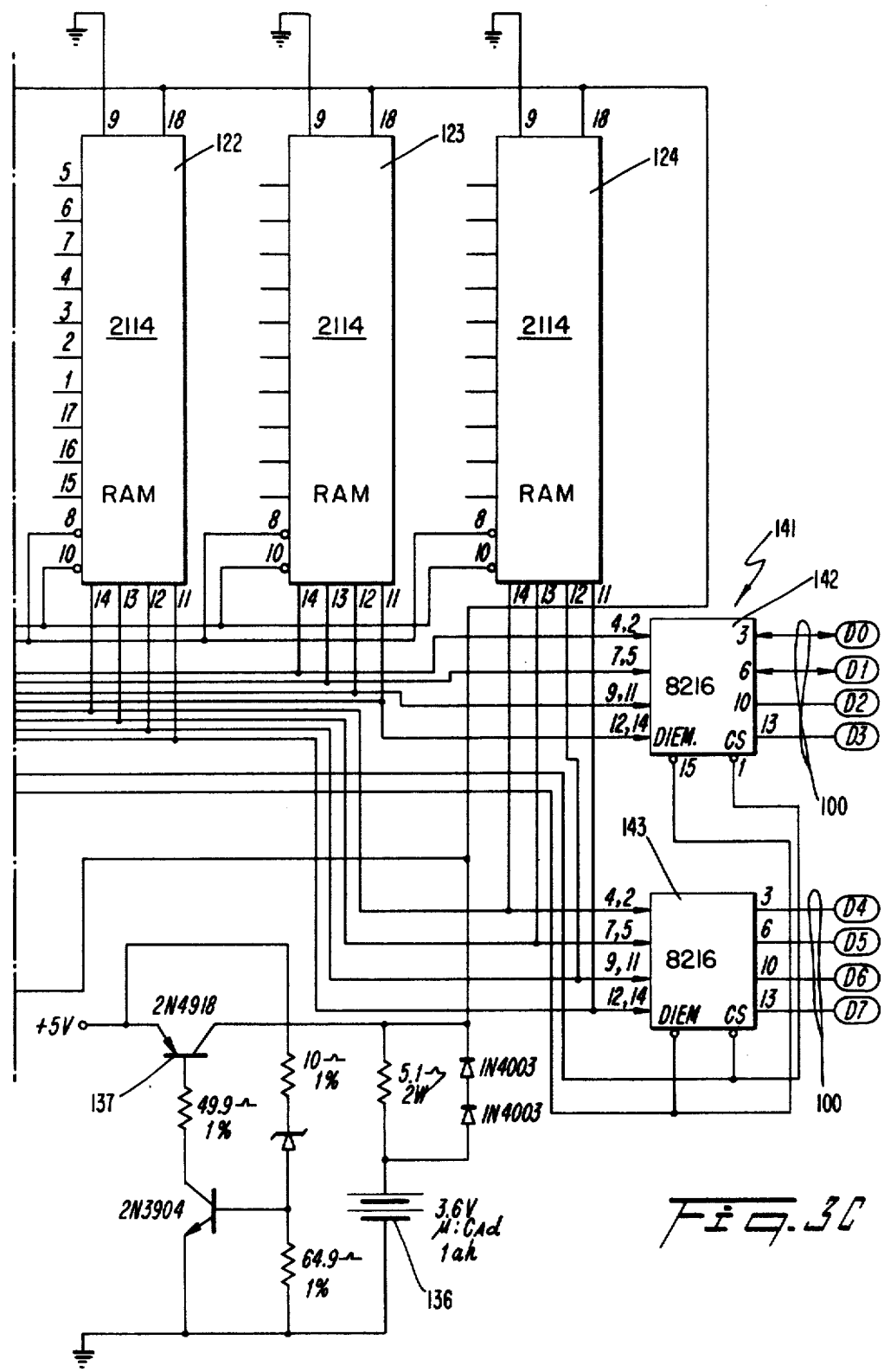
Figure 4B:
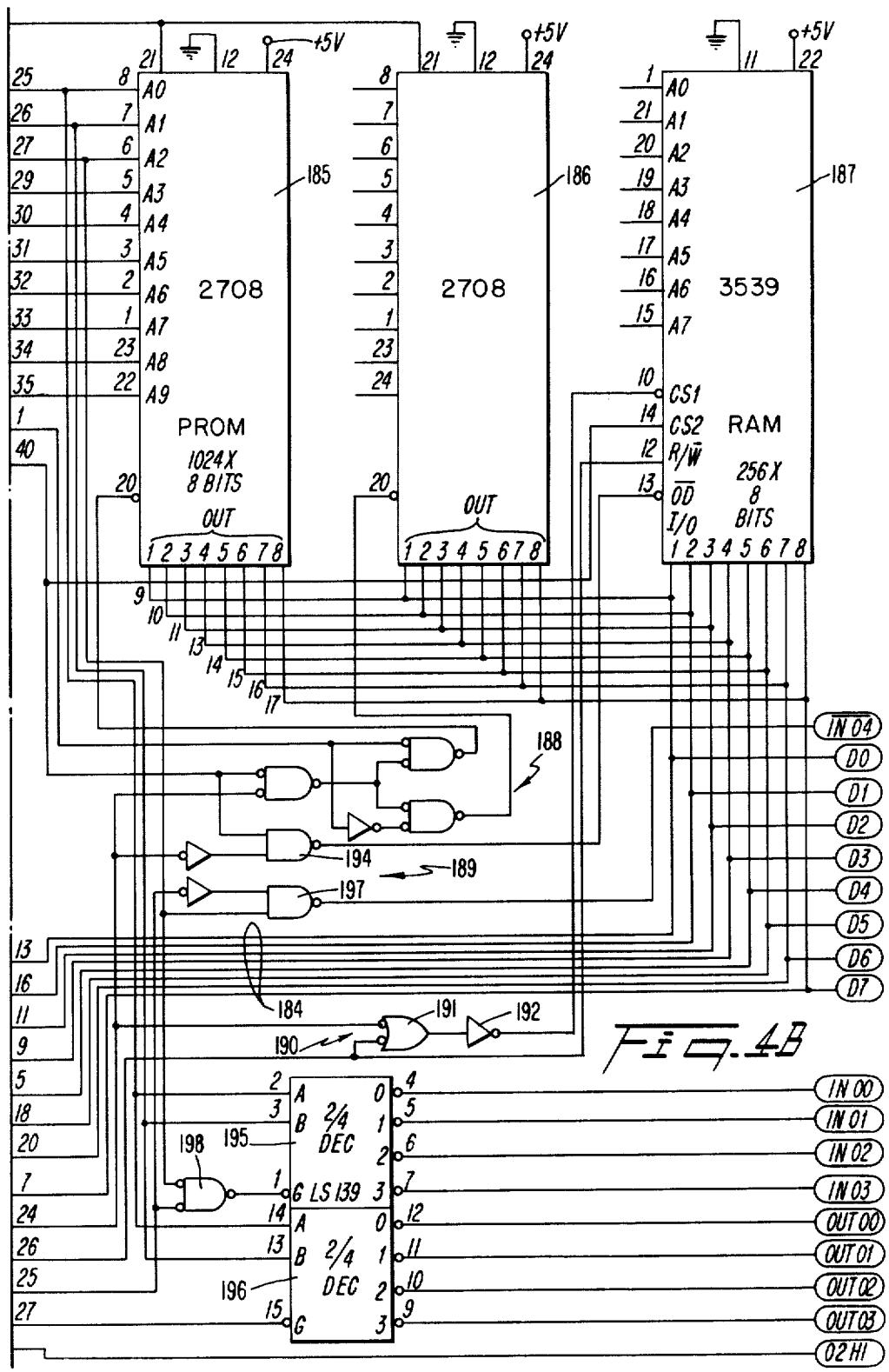
Figure 6A:
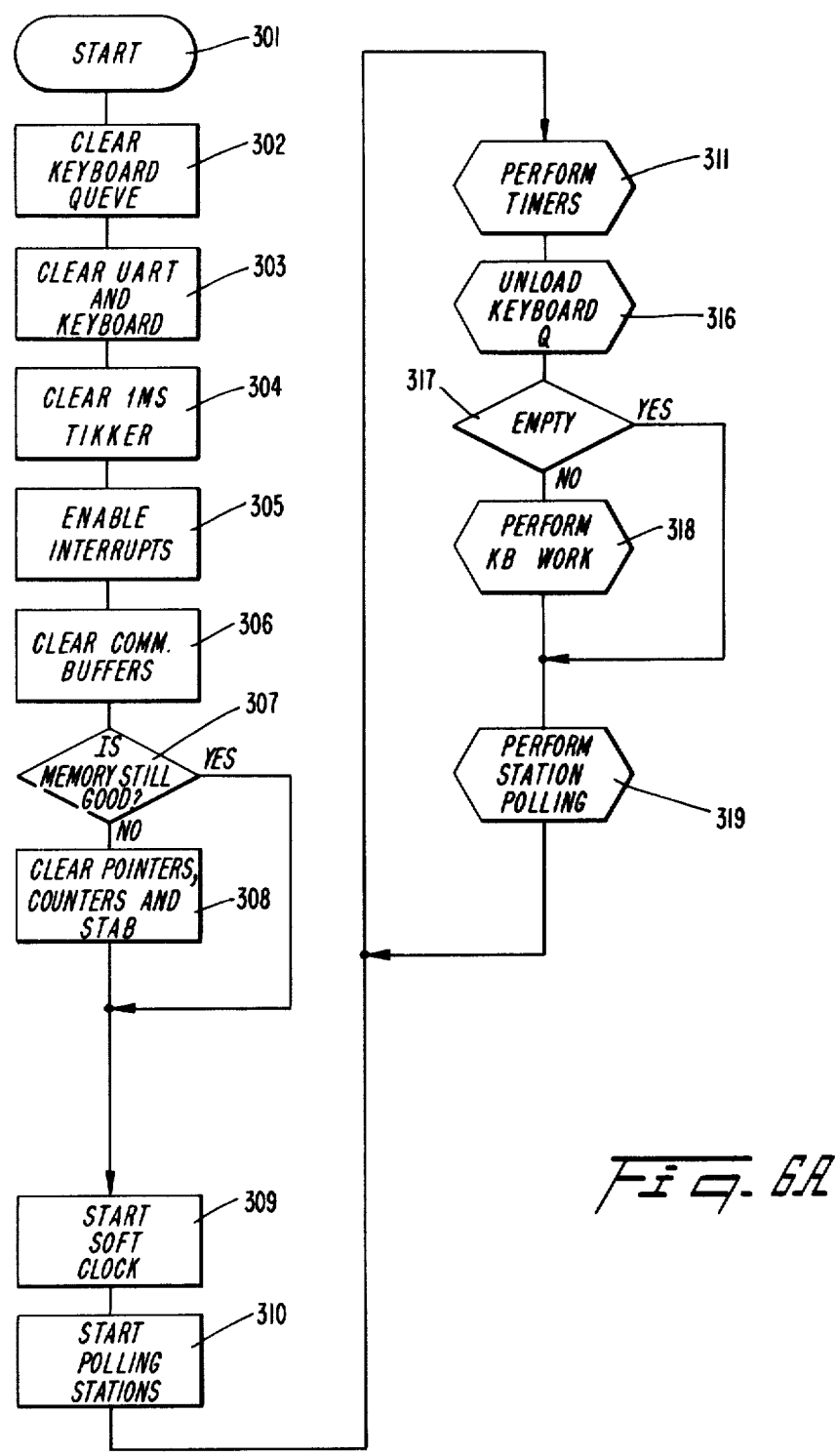

FIGS. 3(A)-(E) are a block diagram of the data processor at the central location of the system of FIG. 1;

FIGS. 4(A)-(E) are a block diagram of the data processor at a remote location in the system of FIG. 1;

FIGS. 5(A)-(B) are a flow diagram of the operations performed at the station data processor; and FIGS. 6(A)-(B) are a flow diagram of the operations performed at the console data processor.

BEST MODE FOR CARRYING OUT THE INVENTION

Reference is now made to FIG. 1 of the drawing wherein there is illustrated a central station or front desk console 11 that is interconnected by a pair of leads 12 of a power wiring system to units 14 at remote locations. Power leads 12 are part of a hotel power distribution system activated by a suitable AC source 15, while console 11 is at the hotel front desk. Each of units 14 is in a different room of the hotel, with the units for rooms 1, 2, . . . , K being shown in the drawing. It is to be understood that more than one unit can be assigned to a particular room or location, as described infra.

Detailed aspects of unit 14 at only room K are illustrated, because the apparatus at each of units 14 can be considered as identical. Conventional 2 to 3 prong outlet connectors 17 at the front desk and in each of the rooms supply power to console 11 and to all of units 14 via power leads 12 which also interconnect the console and units for communication purposes. There is no substantial interference between the AC power on leads 12 and pulse signals transmitted between stations 14 and console 11 on leads 12 because the pulses have a much higher frequency than the AC power. If AC power source 15 includes noise or transients that might appear as pulses transmitted between stations 14 and console 11, the signal communicated between the stations and console has a format that enables errors to be detected. Console 11 includes an AC to DC power converter 21 connected directly to plug 17 and which supplies appropriate DC power levels to each of the electronic devices included in console 11, viz.: keyboard 22, 16-character, 16-segment alphanumeric, electronic display 23 (preferably of the light emitting diode, LED, type), and data processor 24 that includes an oscillator, microprocessor, buffers, memory, drivers, and a universal asynchronous receiver-transmitter, and auxiliary power supply 25. Power supply 25 includes a rechargeable battery so that in the event of a failure of AC source 15, volatile, erasable memory elements of data processor 24 are not adversely affected. Data processor 24 includes a pair of output leads 26, connected to plug 17, which enable serial data bits to be transmitted from data processor 24 to a data processor at each of units 14 via power leads 12. Front desk console 11 also includes a speaker 27 responsive to signals from data processor 24 to activate an audio alarm in the response to certain signals, such as an indication that tampering has occurred at a remote unit 14. Console 11 also includes a key lock switch 28 which can be closed to activate the console only by insertion of an appropriate key into a locking mechanism.

Keyboard 22, display 23, and data processor 24 are interconnected with each other so that signals from the keyboard are supplied to the data processor and signals from the data processor are supplied to the display.

Display 23 responds to signals from data processor 24 to derive alphanumeric indications of signals derived from keyboard 22, as well as signals supplied to data processor 24 by units 14.

Keyboard 22 is connected to data processor 24 by an 11-lead bus 31. Six of the leads in bus 31 are provided for a six parallel bit signal that is derived in response to activation of 22 data keys of keyboard 22. Four of the leads of bus 31 are provided for four function keys of keyboard 22, while the remaining lead of bus 31 is provided for a strobe signal that is derived from keyboard 22, with each key activation of the keyboard.

Keyboard 22, FIG. 2, includes ten numerical keys 32, one of which is provided for each of the numerals 0–9, as well as a "." key 33 for a decimal point. TIME and DATE keys 34 and 35 are respectively activated to change stored indications of local time and date, as is necessary if there is an appreciable error in accumulated local time or a change from daylight time to standard time, or vice versa, as well as to insert a new date at the beginning of each month. Activation of TIME key 34 is accompanied by entries of numerical keys 32 to indicate time in hours (00–23) and minutes (00–59) while activation of DATE key 35 is accompanied by entries of keys 32 to indicate day of the week (1–7), day of the month (1–31), month (1–12) and year of the century (00–99). HOURS key 36 is activated to insert the hours during which alcoholic beverages may be legally dispensed from the equipment at units 14 for different days of the week. Key 36 is activated seven times, one for each day of the week. Each activation of HOURS key 36 is accompanied by a one digit numerical key entry (1–7) for the day of the week and two sets of numerical key entries for hours (0–23) and minutes (0–59); these two sets of entries are for beginning and end of legal hours, respectively. The amount of money charged for beverages dispensed from different reservoirs 51–55 at units 14 is controlled by depressing RATE key 37. Depression of key 37 is accompanied by depression of one numeral key 32 (1–5) to indicate the reservoir number, one numeral key for dollar amount of each drink, "." key 33 and two numeral keys for the number of cents. In response to activation of keys 34, 35, 36 and 37, display 23 is activated to indicate the nature of the activated key and the accompanying numerical values.

If an alarm has been sensed causing speaker 27 to be activated, an alarm flag at data processor 24 is reset by activating ALARM RESET key 38. If the operator realizes he has made a mistake, CANCEL KEYBOARD or CLEAR key 39 is activated. To obtain the total charge for a particular room, e.g., at the time of check out, the operator keys ROOM TOTAL key 41, and keys 32 for the room number. In response to activation of keys 41 and 32, the unit in the keyed room and the room number are indicated by display 23. If a tenant is checking out of his room, and it is desired to clear the room total, CLEAR ROOM TOTAL key 42 is depressed, after the charge information is displayed and before any other key, other than a numerical key 32 is activated.

NEXT key 43 is depressed by the operator of console 11 if the room total display indicates a plurality of units are located in a single room or location. Data processor 24 automatically addresses the plural units in reponse to each activation of key 43, whereby display 23 indicates the total for each of the units at a single location in response to each activation of key 43. In addition, key 43 is activated in combination with EMPTIES key 44 if the operator is making an analysis of units 14 to determine which units have empty dispensing reservoirs. Data processor 24 responds to each such activation of key 44 and then key 43 to address units 14 in sequence and receive signals back from the units having an empty reservoir. Data processor 24 responds to the signals from the units having empty reservoirs to activate display 23 to indicate the number of each room having an empty reservoir and the number assigned to the empty reservoir in the room. After the operator has appropriately noted the displayed information, he again activates key 43, whereupon data processor 24 continues to sequence the different units until the next unit having an empty reservoir is reached. The process is continued for each activation of NEXT key 43 until all of the units have been scanned.

To enable and disable, i.e., turn on and turn off, any of units 14 on a selective basis or the entire system, ENABLE key 45 and DISABLE key 46 are activated together with numerical keys for the room number. The entire system, i.e., all of units 14, can be enabled and disabled by activating key 45 or 46, in combination with two activations of the number NINE key 32 to indicate 99th floor, which is a code for the entire system.

Each of the units is provided is provided with a unit number. To assign a particular unit number to a given room, ASSIGNMENT key 47 is activated. Then, the unit number and room number are entered via keys 32. If it is desired to perform a diagnostic routine on a particular one of stations 14, DIAGNOSTIC key 48 is activated, after which the room number where the station is located is entered via keys 32.

The keys of keyboard 22 are connected with ten lines of bus 31 so that CANCEL key 39, ROOM TOTAL key 41, DIAGNOSTIC key 48 and ASSIGNMENT key 47 are individually connected to the four lines provided for the four function keys. The remaining keys of keyboard 22 are connected to six other leads of bus 32 to form a six-bit parallel binary signal. The manner in which data processor 24 responds to the keys of keyboard 22 to activate display 23 and units 14 and the apparatus of these devices is described in greater detail infra.

At unit 14, in room K, five inverted beverage reservoirs 51–55, preferably liquor bottles or the like, are provided. A beverage is dispensed from each of bottles 51–55 in response to selective activation of valves 61–65, respectively, connected in a separate line for each of the different reservoirs. Connected to a neck of each of reservoirs 51–55 is a resistance type liquid sensor 71–75, each of which derives a binary output signal having high and low levels, respectively, indicative of a conducting liquid being in and out of contact with the sensor. Thereby, sensors 71–75 derive binary signals respectively indicative of whether reservoirs 51–55 are or are not empty. Associated with each of reservoirs 51–55 are manually activated push button switches 81–85, which are activated by an occupant of room K when he desires to have a beverage dispensed from reservoirs 51–55, respectively. To provide a visual indication that reservoirs 51–55 are empty, light emitting diodes 91–95 are respectively provided for reservoirs 51–55.

Valves 61–65, sensors 71–75, switches 81–85, and light emitting diodes 91–95 are interconnected via buses 96, 97, 98, and 99, each having 5 signal leads, to data processor 101. Data processor 101 is supplied with DC operating power by power supply 102, which is connected to outlet 16 in room K by plug connector 17. Power supply 102 supplies appropriate power to data processor 101 and to valves 61–65 so that solenoids within these valves can be activated in response to signals from the data processor. Connector plug 17, in addition to supplying AC current to power supply 102, is connected via a pair of lead wires to a pair of signal terminals of data processor 101.

Data processor 101 is also responsive to a unit number select input signal source 103, which derives a parallel, eight-bit binary signal indicative of the unit number; the eight-bit signal is coupled from source 103 to data processor 101 via eight-lead bus 104. Data processor 101 is also responsive to manually activated switches 105 and 106, as well as switch 107 that is responsive to a forced door sensor 108. Forced door sensor 108 is activated whenever a door (not shown) is opened in a cabinet where reservoirs 51–55 are located. Switch 105 is closed by maintenance personnel when it is desired to calibrate the activation time of the solenoids in valves 61–65, thereby to control the amount of beverage dispensed from reservoirs 51–55 in response to each activation of switch buttons 81–85. Enable switch 106 is activated by the room occupant to assure that minors who may be in the room do not illegally activate buttons 81–85. In many instances, therefore, it is desirable for switch 106 to be controlled by a key.

Data processor 101 includes a timing source, microprocessor, controller chip, a programmable read-only memory (PROM), a random access memory (RAM), decoding circuitry, buffer circuitry, and a universal asynchronous receiver-transmitter, as described in detail infra in connection with FIG. 3. These elements of data processor 101 respond to signals from sensors 71–75, switches 81–85, unit number select source 103, switches 105–107 and signals from console 11 to activate valves 61–65, as well as light emitting diodes 91–95. Each of valves 61–65 is respectively activated for a predetermined interval in response to each manual activation of switches 81–85, unless one of the switches is activated before the open valve has been closed, in which case the switch activation is ignored. In response to sensors 71–75 detecting that reservoirs 51–55 are respectively empty, LEDs 19–95 are deactivated so no light is derived from them.

In response to activation of ROOM TOTAL key 41 and the room number from keys 32 of keyboard 23, data processor 101 is addressed by a unit number signal transmitted to it from console 11 to initiate a communication link. The address is recognized by comparing the unit number derived from source 103 with the address unit number derived from console data processor 24. Data are also transmitted from data processor 101 to data processor 24 to indicate that a door of the cabinet has been opened, as detected by sensor 108. Normally, after unit 14 at room K has been addressed, data processor 101 supplies console 11 with signals indicative of the total number of dispensing operations associated with each of reservoirs 51–55 for a particular occupancy of room K. Data processor 101 supplies, to data processor 24, signals indicative of which of reservoirs 51–55 is empty, in response to activation of EMPTIES key 44 and (1) keys 32 for the room number or (2) NEXT key 43.

Unit 14 includes two additional visual, LED indicators 110 and 111 which are supplied with bilevel signals by data processor 101. Data processor 101 responds to time indicating signals derived from data processor 24 so LED 110 is activated to a light emitting condition during hours while the dispensing of beverages from reservoirs 51–54 is legal. LED 111 is activated by data processor 101 in response to signals from data processor 24, when the console data processor derives an indication that only a predetermined time exists prior to the expiration time of the hours when liquid can be legally dispensed from reservoirs 51–55. This warns the room occupant that legal hours are about to expire so he can activate switches 81–85 multiple times during the interval immediately preceding the expiration of legal hours.

Reference is now made to FIG. 3 of the drawing wherein there is illustrated, in block diagram form, a preferred embodiment of data processor 24 at console 11. Data processor 24 includes a microprocessor 111, preferably an INTEL 8080A microprocessor, as described for example, on pages 256–261 of the book "Microprocessors and Small Digital Computer Systems for Engineers and Scientists", written by Granino A. Korn, published by McGraw-Hill Book Co., 1977 edition. Microprocessor 111 is a monolithic NMOS 8-bit central processing unit chip including an 8-bit arithmetic logic unit/accumulator subsystem, an 8-bit instruction register, an 8-bit processor status word register (only 5 bits are used), and six 8-bit scratchpad registers that can be paired to form three 16-bit stack pointer registers. Each input-output word of microprocessor 111 is a sequential two byte instruction derived as address bits. The second byte is a binary value for any one of 256 memory addresses, while the first byte includes four bits that control the derivation of control signals IN00–IN70 and OUT00–OUT70, as described infra.

Microprocessor 111 includes forty input-output pins, numbered on the drawing with lead lines immediately outside of the rectangle designating the microprocessor. The microprocessor is connected in the present configuration so that it includes a 12 parallel bit address bus for address bits A0–A11, and an 8-bit, bidirectional data bus 100 for data bits D0–D7; data bus 100 can be operated to handle an 8-bit byte or a 16-bit byte including two sequential sets of 8 bits. Microprocessor 111 is responsive to appropriate DC voltage levels applied to its DC power supply pins 2, 20, 11 and 28. In addition, hold pin 13 is connected to a zero volt level, to prevent activation of the hold function of microprocessor 111. Microprocessor 111 includes an interrupt pin (INT) 14 which is selectively responsive to signals from an interrupt source. Microprocessor 111 includes output pins 17, 18, 19 and 21 on which are respectively derived signals indicating that: (1) microprocessor 111 has placed data on data bus 100, (2) microprocessor 111 is ready to read data bits D0–D7, (3) a data bus cycle is to start, and (4) microprocessor 111 is ready to write data bits D0–D7. The first clock signal at pin 22 after the occurrence of a sync signal strobes control bits D0–D7 from data bus 100 into the process status register within microprocessor 111. These bits are latched by the status register to determine bus operations during the remainder of a cycle while data bus 100 is activated.

Address bits A0–A11 at output pins 25–35, 1 and 40 of microprocessor 111, effectively form an address bus. The address bits are fed as an addressing signal to memory circuitry (described infra) via buffers 114 and 115, which are preferably standard 74S241, 8-bit binary buffer chips.

Microprocessor 111 is responsive to signals derived from oscillator and frequency divider 112, preferably an INTEL 8224 chip. Oscillator and frequency divider 112 is responsive to an 18 mHz crystal 113, as well as to DC power supply voltages applied to pins 2, 3, 8, 9 and 16. Oscillator and frequency divider 112 includes a pair of 2 mHz output pins 10 and 11, on which are derived signals that are phase displaced from each other by 180°, and respectively applied to pins 15 and 22 of microprocessor 111. Oscillator and frequency divider 112 includes output pins 1 and 4 on which are derived positive, binary one levels that are respectively applied to reset pin 12 and ready (RDY) pin 23 of microprocessor 111. Oscillator and frequency divider 112 includes an input pin 5 responsive to the signal at sync terminal 19 of microprocessor 111.

Data bits D0–D7 are selectively coupled in either direction through controller chip 116, preferably an INTEL 8238 chip. Controller chip 116 includes, for data bits D0–D7, pins 6, 7, 8, 10, 12, 15, 19 and 21, connected to exchange signals in either direction with pins 3–10 of microprocessor 111. The data bits are selectively coupled in either direction to other circuitry in data processor 24 from controller 116 via pins 5, 9, 11, 13, 16, 17, 18 and 20. Controller 116 includes control output pins 24–27 on which the controller selectively applies enable signals to: (1) command data to be read from the data processor memory into microprocessor 111, (2) command data to be written from microprocessor 111 into data processor memory, (3) input/output read (I/O R) command, and (4) input/output write (I/O W) command. Controller 116 includes a strobe control input pin (STSTB) 1, connected to pin 7 of oscillator and frequency divider 112 to provide a strobe control for bits transmitted between the controller chip data bus pins to the data bus pins of microprocessor 111. Pins 2, 3 and 4 of controller 116 are responsive to the signals at pins 21, 18 and 17 of microprocessor 111. The signals applied to pins 2–4 of controller 116 enable data signals to be coupled between pins 5, 9, 11 etc. of the controller and pins 3–10 of microprocessor 111. The remaining pins of controller 116 are connected to constant DC voltages, for either power supply purposes or to prevent the functions associated with these pins from being enabled.

Ten address bits A0–A9 derived from microprocessor 111 are fed through buffers 114 and 115 on an address bus to parallel input terminals of programmable read-only memories (PROMs) 117 and 118, preferably of the INTEL 2708 type, and which constitute the non-volatile portion of the memory of data processor 24. In the preferred embodiment, each of PROMs 117 and 118 includes 1024 8 bit bytes. Each of PROMs 117 and 118 includes 8 parallel output bits, supplied to pins 9–17 thereof, as well as address input pins 1–8, 22 and 23. Each of PROMs 117 and 118 includes an input pin 20, which when supplied with a binary zero signal, enables the particular PROM to be read out at the address indicated by the bits A0–A9. PROMs 117 and 118 store, in firmware, the program signals of data processor 24, as well as signals to activate display 23 with certain messages in response to signals from console 11 and units 14.

The memory data processor 24 also includes four random access memory (RAM) chips 121–124, each having address input pins 1–7 and 17–15, respectively driven by address bits A0–A9. Each of RAMs 121–124 is capable of storing 1024 4-bit bytes and therefore includes four output pins 11–14, on which are derived a four bit output signal of each RAM. RAM chips 121–124 also include a chip select (CS) input pin 8 and a write enable (WE) input pin 10. In response to only CS pin 8 being supplied with an enabling signal, the signal stored at the address indicated by address bits A0–A9 of the particular RAM is read out on pins 11–14. In response to pin CS and WE pin 8 and 10 both being enabled by input signals, the signal at pins 11–14 is written into the RAM address designated by address bits A0–A9. RAMs 121–124 are arranged so that RAMs 121 and 122, together, actually comprise a single 8-bit RAM because the CS pins of RAMs 121 and 122 are connected in parallel to each other, while RAMs 123 and 124, together, function as a single 8-bit RAM because the CS pins thereof are also connected in parallel, but to a different source.

Selection of which of PROMs 117 or 118 or RAMs 121–124 is activated to be responsive to address bits A0–A9 and the operating mode of the RAMs is in response to address bits A10 and A11, as well as the read from memory (MEMR) and write into memory (MEMW) signals derived from pins 24 and 26 of controller 116. These signals are combined in address decode circuit 125, including an array of inverters, AND gates, NAND gates, and NOR gates, and having output signal leads 126–130; lead 126 is connected to the CS input pin of PROM 117, lead 127 is connected to the CS input pin of PROM 118, lead 128 is connected to the WE input pin of RAMs 121–124, lead 129 is connected to the CS input pins of RAMs 121 and 122, and lead 130 is connected to the CS input pins of RAMs 123 and 124. Address decoder 125 is also responsive to the voltage derived from power supply 21 so that the contents of RAMs 121–124 cannot be changed if there is a power failure.

A power failure is sensed by determining if the power level of supply 21 drops below a minimum value; e.g., a normal 5.0 volt source is sensed to determine if the voltage thereof drops below 4.7 volts. The power supply voltage is sensed by circuit 132, including an operational amplifier 133, a Zener diode 134 and appropriate components and connections to power supply 21 to enable a bi-level DC voltage to be derived on lead 135 to indicate whether the voltage of power supply 21 is above or below the minimum value.

Address bits A10 and A11 are respectively combined with the read from memory and write into memory signals MEMR and MEMW and with the signal on lead 135 to control activation of PROMs 117, 118 and 121–124 in accordance with the following criteria:

TABLE I

|   | A10 | A11 | MEMW | MEMR |   |
|---|-----|-----|------|------|---|
| 1. | 0 | 0 | 1 | 0 | ENABLE PROM 117 |
| 2. | 1 | 0 | 1 | 0 | ENABLE PROM 118 |
| 3. | 1 | 1 | 1 | 0 | READ FROM RAMs 121, 122 |
| 4. | 0 | 1 | 1 | 0 | READ FROM RAMs 123, 124 |
| 5. | 1 | 1 | 0 | 1 | WRITE INTO RAMs 121, 122 |
| 6. | 0 | 1 | 0 | 1 | WRITE INTO RAMs 123, 124 |

These signals are combined by decoder 125 to supply an enabling signal to the CS input pin of PROM 117, to enable the data stored at the address indicated by bits A0–A9 to be read out as a parallel 8-bit byte at pins 9–17. The operations associated with lines 3–6 of Table I are inhibited if the sensed voltage of power supply 21 is less than a predetermined value, in response to the binary zero level on lead 135.

If the voltage of power supply 21 should drop below the predetermined level, a keep alive voltage level is supplied to RAMs 121-124 by re-chargeable battery 136. During normal operation, battery 136 is charged by the output voltage of power supply 21 through PNP transistor 137. In the event of the power supply voltage dropping below the predetermined level in response to a power line failure, battery 136 is isolated from power supply 21 and a keep alive voltage is supplied by the battery to DC power input pins 18 of RAMs 121. Normally, power supply pins 18 of RAMs 121 are supplied with a DC positive voltage that is fed to them through the collector of PNP transistor 137.

PROMs 117 and 118 are pre-loaded with firmware program information necessary to execute the various operations which the apparatus of the present invention performs. RAMs 121-124 are supplied with and store data, such as read/write information, time, the total number of drinks which have been dispensed from all of the reservoirs 51-55 of the various units 14, the price of each drink from each reservoir, which of the reservoirs are empty, etc.

Corresponding output pins of PROMs 117 and 118, as well as corresponding output pins of paired RAMs 121, 122 and 123, 124 are connected in parallel to data bus 100; the common connections of PROMs 117, 118 and RAMs 121-124 to bus 100 are via a buffer 141, including three state, 4 bit buffer chips 142 and 143 that are controlled in parallel to pass signals in either direction or to block signals. Each of buffer chips 142 and 143 includes a pair of input pins 1 and 15, respectively connected to be responsive to the output of address decoder 125 and the read from memory signal MEMR. Chips 142 and 143 respond to the signals applied in parallel to pins 1 thereof by address decoder 125 so that the buffers are normally disabled. With an enabling signal being applied to pins 1 of chips 142 and 143, signals can be read from PROMs 117 or 118 or RAMs 121, 122 or 123, 124 through buffer 141 to data bus 100. If enabling signals are simultaneously supplied to pins 1 and 15 of buffer chips 142 and 143 and to pins 1 of chips 142 and 143, signals can be read in the other direction from data bus 100 through buffer 141 into RAMs 121, 122 or 123, 124.

A further control for coupling signals to various elements of data processor 24 is attained by selectively enabled, three input to eight output decoders 145 and 146, driven in parallel by address bits A4-A7 derived from microprocessor 111. Bits A4-A7 have different combinations of values during different intervals of each one microsecond operating cycle of the program executed by data processor 24. Each of decoders 145,146 includes an enable input pin 5, responsive to address bit A7, as well as three decoding input pins 1, 2 and 3, respectively responsive to address bits A4, A5 and A6. Input pins 4 of decoders 145 and 146 are respectively responsive to I/OR and I/OW signals derived from pins 25 and 27 of controller 116. Thereby, decoder 145 is activated to be responsive to address bits A4-A6 only while it is enabled by address bit A7 and the I/OR signal, while decoder A6 is enabled by address bit A7 and the I/OW signal. Each of decoders 145 and 146 includes eight output pins 7-15, only one of which has a binary one signal at a time; the output pin having the binary one level is dependent upon the values of address bits A4-A6. The output signals of decoders 145 and 146 are respectively denominated IN00-IN70 and OUT0-0-OUT70. As described in detail infra, signals IN0-0-IN40 and OUT00-OUT50 respectively cause data processor 24 to perform certain functions during different times within each 1 μs (microsecond) operating cycle associated with (1) signals being supplied to the data processor, and (2) signals derived from the data processor. Two μs operating cycles form a complete microprocessor cycle time, so that 2-8 bit data outputs of the microprocessor can be multiplied to buffers of the 16 bit display deriving two consecutive cycle times.

Data bus 100 is responsive to the signals on 11-lead keyboard bus 31. Data bits D0-D5 of bus 100 are selectively responsive to the 6 coded bits B1-B6 which carry information from 21 "data" keys of keyboard 22. Data bits D0-D3 of data bus 100 are selectively responsive to the four function bits F1-F4 derived from function keys 39, 41, 47 and 48 of keyboard 22; all of the other keys are the data keys. Data bits D6 and D7 are selectively and respectively responsive to closure of key switch 28 and the strobe signal supplied by keyboard 22 to keyboard bus 31.

Bits B1-B6 and the strobe signal of keyboard bus 31 and a signal from switch 28 are selectively gated to data bus 100 via tri-state buffer 644 and buffer 645, responsive to keyboard function bits F1-F4. Buffers 644 and 645 are controlled by the signals at pins IN20, IN30 and OUT50 so that signals at the input pins of each buffer are gated into the buffer and then read out from the buffer. The strobe signal is coupled to buffer 644 under the control of signal OUT50 that is supplied as an enabling signal to a reset input of D flip-flop 646, having a C input terminal responsive to the signal on the strobe lead of keyboard bus 31. Flip-flop 646 has a Q output terminal on which is derived a signal that is supplied to pin 13 of buffer 644 and is selectively supplied to the buffer output pin 7 and thence to data bit line D7 of bus 100. Each time a key of keyboard 22 is struck, a signal is supplied to the C input terminal of flip-flop 646, causing an enabling level to be supplied by the Q output terminal of flip-flop 646 to input pin 13 of buffer 644. Flip-flop 646 is reset slightly after the leading edge of the strobe signal supplied to the C input terminal of the flip-flop, in response to signal OUT50. Thereby, flip-flop 646 derives a signal having a predetermined duration each time a key of keyboard 22 is activated. Buffers 644 and 645 are respectively enabled by signals IN20 and IN30 to couple the signals at the data input pins thereof to the output pins thereof once, at different times, during each one ms. program cycle of data processor 24. In response to the leading edge of enabling signal IN20, buffer 644 is activated so the six keyboard bits B1-B6 are supplied from buffer input pins 2, 4, 6, 8, 11 and 17 to storage elements in the buffer. In response to the trailing edge of signal IN20, the signals stored in the buffer elements are read out to buffer output pins 3, 9, 12, 14, 16 and 18. Buffer 645 responds similarly to the leading and trailing edges of signal IN30 to gate the signals at pins 2, 4, 6 and 17 to pins 3, 14, 16 and 18.

Signals supplied to data bus 100 are selectively supplied to 16 character, 16 segment LED display 23 under the control of signals OUT20, OUT30, and OUT40 via 8-bit latch chips 151, 152, 4 to 16-bit latch decoder 153, LED driver chips 154, 155, and common cathode driver chips 156, 157. In the preferred embodiment, chips 151 and 152 are 74LS273s, chip 153 is an MC14514B, chips 154 and 155 are 8816s, and chips 156 and 157 are 8863s. Latches 151, 152 and drivers 154, 155 respond to data bits D0-D7 to selectively activate the 16 segments of a single alphanumeric character of display 23, while decoder 153 and drivers 156, 157 control which of the sixteen characters of the display are to be activated with the character supplied to latches 151 and 152, during each 2 μs cycle time of the microprocessor.

Pins 3, 4, 7, 8, 13, 14, 17 and 18 of chips 151 and 152 are respectively driven by D0-D7 bits of data bus 100. Eight bit latch 151 is loaded in response to an enable signal OUT20, during one μs cycle time of data processor 24, while latch 152 is loaded during a subsequent 1 μs operating cycle of the microprocessor, in response to an enable signal OUT30. The signals stored in latches 151 and 152 are fed through LED driver chips 154 and 155 to control illumination of the 16 segments of LED display 23.

Input pins 2, 3, 21 and 22 of latched decoder 153 are responsive to data bits D0-D3 of data bus 100, while load input pin 1 of the decoder is responsive to enable signal OUT40. Decoder 153 responds to data bits D0-D3 to translate these data bits into the 16 possible places where characters can be displayed on display 23. The timing of signals IN20, IN30, OUT20, OUT30, OUT40 and OUT50, as well as the connection of chips 154-157 to data bus 100 in such that alphanumeric controlling bits B1-B7 derived from keyboard 22 are supplied to drivers 154-157 at appropriate times to form displayed messages. The derivation times of these control signals are also such that enabling signals derived from pins 5 and 7 of buffer 144, as well as from pins 3, 14, 16 and 18 of buffer 145 are supplied to pins 7, 9, 11, 13, 16 and 20 of controller 116, to enable certain operations to be performed by microprocessor 111, which then derives signals to control memory chips 117, 118 and 121-124.

Data bits D0-D7 on data bus 100 are selectively supplied to and derived from universal asynchronous receiver transmitter (UART) 161, preferably a National Semi-conductor 5303 chip. UART 161 is selectively a serial to parallel or parallel to serial converter which supplies signals between data bus 100 and lines 26 which are connected to connector 17 at console 11. Eight serial bits, forming a byte, coupled through connector 17 to lines 22, are supplied to serial input (SI) terminal 20 of UART 161 via line receiver 162. When properly enabled, UART 161 responds to the 8 serial bits at pin 20 to form an 8-bit parallel output signal RR1-RR8, that is coupled to the UART output pins 5-12 respectively. The signal at pins 5-12 is selectively fed through buffer 163 to data bits D0-D7 of data bus 100. In contrast, parallel data bits D0-D7 on data bus 100 are supplied to pins 26-33 of UART 161 and are converted by the UART into eight serial bits that form a serial data byte. The 8-bit serial byte (SO) is derived from output pin 25 of UART 161 and applied to line driver 164. In response to each binary one signal at pin 25 of UART 161, one shot 164 derives a binary signal having a predetermined amplitude and duration, which binary signal is fed to leads 20 and connector 17 at console 11.

Clocking of signals between pin 20 and pins 5-12, as well as between pins 26-33 and pin 25 of UART 161, is in response to a 5 kHz signal derived from cascaded frequency dividers 165 and 166. Frequency divider 165 is responsive to a 2 mHz clock signal derived from pin 6 of oscillator and frequency divider 112; the 2 mHz signal at pin 6 of oscillator and frequency divider 112 has the same phase as the phase of the signal derived from pin 10 of the oscillator and frequency divider. The signal derived from pin 6 of oscillator and frequency divider 112 is supplied to a C input terminal of D flip-flop 167, which derives a one mHz output signal that is applied to an input pin of frequency divider 165. An output pin of frequency divider 165 derives a 10 kHz signal that is applied to an input of frequency divider 166, which in turn derives a 5 kHz clock input signal applied to UART 161.

Control of signals coupled between the inputs and outputs of UART 161 is in response to enabling signals IN00, IN10, OUT00 and OUT10. Parallel bits D0-D7 on bus 100 are gated from pins 26-33 into the parallel to serial converter of UART 161 in response to enabling signal OUT00 being derived during each microsecond operating cycle of data processor 24. These eight binary signals are then converter into a signal that can be derived as eight serial bits from pin 25 in response to the OUT10 signal, as coupled through inverter 167 to input pin 21 of UART 161. After signal OUT10 has been supplied to pin 21 of UART 161, the eight parallel bits are read out in sequence in response to the next eight clock pulses supplied by frequency divider 166 to UART 161. Serial data bits coupled to pin 21 are read out as a parallel 8-bit byte from pins 5-12 in response to enabling signal IN00 that is applied to pins 4 and 18 of UART 161. Signal IN00 is also applied through NOR gate 168 to input pin 1 of tri-state buffer 163 (preferably a LS241), and through inverter 169 to input pin 19 of the buffer. Buffer 163 is activated so that the signal at its input pins 2, 4, 6, 8, 11, 13, 15 and 17 is coupled to the buffer storage elements in response to the leading edge of the output NOR gate 168, and the buffer storage and elements are read out in response to the trailing edge of the output of NOR gate 168.

UART 161 includes 4 status bit pins 13, 14, 19 and 22 on which are respectively derived: (1) data available (DA) signal, (2) TBMT signal which indicates that a transmit buffer of UART 161 responsive to data bits D0-D7 is empty so that a new byte can be loaded into the UART input pins 26-33, (3) parity error (PE) error signal which indicates that the serial byte received at UART pin 20 has an incorrect parity, and (4) a framing error (FE) signal which indicates that a stop bit in the received serial signal is incorrectly located. The status bit signals derived at pins 13, 14, 19 and 22 are read out of UART 161 in response to enabling signal IN10 being supplied to input pin 16 of the UART. Signal IN10 is also applied through NOR gate 168 and inverter 169 to input pins 1 and 19 of buffer 163 to enable the four status bits to be coupled to the buffer output pins 3, 5, 7 and 18 of thence to data bits D0, D1, D6 and D7 of data bus line 100.

To activate audio alarm speaker 27, decoder 146 responds to a flag stored at address bits A4-A7 in RAMS 121-124. In response to the flag being set while address bits A5-A7 have a predetermined combination of values, decoder 146 derives output signal OUT70. The OUT70 signal is a short duration pulse that is coupled to an input pin of timer 171, having capacitors 172 connected thereto. Timer 171 derives a one second duration rectangular wave in response to enable signal IN70. The one second rectangular wave output of timer 171 is applied by inverter 173, which is cascaded with amplifier 174, to speaker 27 so an audio alarm is sounded.

The normal 1 μs operating cycle of microprocessor 111 is interrupted when signals are (1) derived from keyboard 22, (2) are to be sent between console 1 and units 14, and (3) are to be supplied to display 23. In response to an interrupt, the normal sequencing of PROMS 117, 118 is terminated at different times depending on the interrupt. After the interrupt, microprocessor 111 includes a pointer to control PROMS 117, 118 so the program is restarted from the interrupted point. Microprocessor 111 is interrupted in response to a signal being derived from keyboard 23 so a binary one signal is fed to data bit D7 while buffer 44 is enabled by IN20 or in response to a signal from unit 14 being received so a binary one signal is fed to data bit D7 while the status word of UART 161 is enabled by IN10. The interrupt flag sets bit A7 while bits A4–A6 have values that enable decoder 146 to derive signal OUT60, i.e., the OUT60 signal is enabled if the interrupt bit flag is set while bits A4–A6 have one set of values during the 1 μs cycle time. Signal OUT60 is coupled to a reset input of D flip-flop 175, having a C input terminal responsive to a 1 kHz output of frequency divider 166, as coupled through inverter 176. Flip-flop 175 has a Q output connected to the interrupt (INT) input pin 14 of microprocessor 111. In response to the interrupt flag being set, signal OUT60 causes flip-flop 175 to interrupt the operation of microprocessor 111 by supplying an enabling signal to terminal 114 of the microprocessor, whereby the microprocessor normal operation is interrupted and an interrupt subroutine, which usually takes about 150 microseconds, is executed. The executed interrupt depends on the nature of the signal from keyboard 23 or unit 14 that caused the interrupt. The leading edge of a 1 kHz output of frequency divider 166, as coupled through inverter 176, causes flip-flop 175 to be set so that the interrupt input to pin 14 of microprocessor 111 is removed and the microprocessor again is operated from the same point as it had when the interrupt occurred.

In summary, control signal: OUT00 indicates the data is to be loaded into UART 161; OUT10 indicates that the UART is cleared; OUT20 indicates that display segments A–H are to be latched; OUT30 indicates that display segments I–P are to be latched; OUT40 indicates that the displayed character position is to be derived; OUT50 indicates that a clear keyboard flat has been set; OUT60 indicates clear interrupt flag from the 1 kHz cycle; OUT70 activates the alarm. IN00 enables readout of UART 161 to data bus 100, IN10 enables the UART status word, IN20 resets flip flop 646, IN30 enables buffer 644 and IN40 enables buffer 645.

Reference is now made to FIG. 4 of the drawing wherein there is illustrated a circuit diagram of the electronic equipment included at unit 14 of room K. Data processor 101 includes microprocessor 181, oscillator and frequency divider 182, and controller chip 183, which are preferably interconnected and operated in the same manner as the corresponding elements of data processor 24. Thereby microprocessor 181 is clocked at a two megahertz rate by oscillator and frequency divider 182 to derive 12 binary bits A0–A11 and is selectively connected to data bits D0–D7 of data bus 184 via controller chip 183. Address bits A0–A9 are coupled in parallel to input pins of PROMS 185 and 186 which store a program to activate unit 14. Address bits A0–A7 of microprocessor 187 are also fed in parallel to address input pins of a static RAM 187. In the preferred embodiment, RAM 187 in a Fairchild 3539 chip and PROMS 185 and 186 are of the same type as PROMS 117 and 118 of data processor 24.

Each of the PROMS 185 and 186, as well as RAM 187, includes eight output bits which are selectively coupled to data bits D0–D7 of data bus 184. Selective activation of PROMS 185, 186 and RAM 187 is in response to address bits A10 and A11 of microprocessor 181, as wall as MEMR, MEMW and I-OR signals derived by a controller chip 183 on leads 24–26. One of PROMS 185 and 186 is selectively enabled in response to chip select (CS) signals respectively supplied by decoder 188 to pins 20 thereof. RAM 187 is selectively enabled in response to chip select signals CS1 and CS2 being respectively applied to terminals 10 and 14 thereof. Data are read out of RAM 187 in response to an enable signal being applied to R/W pin 12 of RAM 187.

Selection of PROMS 185 and 186 is performed with PROM chip select decoder 188 while RAM 187 is enabled to its various states in response to signals from logic networks 189 and 190 and in response to signals derived directly from address bit A11 of microprocessor 181 and the MEMW signal derived at pin 26 of controller chip 183. PROM chip select decoder 188 selects one of PROMS 185 and 186 in response to address bits A10 and A11, as well as signal MEMR. PROMS 185 and 186 can be read out only in response to signal MEMR being enabled, while PROM read out selection is determined by whether address bit A10 or address bit A11 is enabled. To activate RAM 187, either into the read or write state, the MEMR and MEMW output signals of controller chip 183 are combined in logic network 190, including NOR gate 191, having an output which is fed through inverter 192 to CS1 input terminal 10 of the RAM. Thereafter, address bit A11 is applied by microprocessor 181 to CS2 input terminal 14 of RAM 187. To write information into RAM 187 in response to data bits D0–D7 on line 184, the MEMW signal on output pin 26 of controller 183 is enabled, after the CS1 and CS2 terminals have responded to enabling signals. To read signals from RAM 187 to data bits D0–D7 of data line 184, the MEMR signal at pin 24 of chip 183 is enabled simultaneously with enabling of address bit A11, as detected in logic network 189 that includes inverter 193 and NAND gate 194 that derives pin 13 of RAM 187.

Certain functions associated with reading information into and writing information out of RAM 187 are performed by two input to four output decoders 195 and 196, as well as by logic network 197, in response to the status of address bits A0–A3, as well as in response to signals I/OR and I/OW, as derived from pins 25 and 26 of controller chip 183. Decoders 195 and 196 are enabled in response to enabling signals being applied to G input pins 1 and 15, respectively, thereof. Pin 15 of decoder 196 is directly responsive to the I/OW output signal of controller 183, on pin 27, while pin 1 of decoder 195 is responsive to the I/OR output signal at pin 25 of controller 183 and address bit A2, as derived from microprocessor 181; the I/OR signal and bit A2 are combined in NAND gate 198, having an output that drives the G input pin 1 of decoder 195. Both of decoders 195 and 196 include A and B input pins, respectively driven in parallel by bits A0 and A1 of microprocessor 181. Each of decoders 195 and 196 responds to a two-bit parallel input signal to activate one of four output pins having a decoded value of 0–3. The 0–3 output signals of decoder 195, at decoder output pins 4–7, are respectively referred to as signals IN00–IN03, while the 0–3 output signals of decoder 196, at the decoder output pins 2–9 are respectively referred to as signals OUT00–OUT03. Logic network 196 responds to address bit A2 and the I/OR signal at pin 25 of controller 183 to derive signal IN04.

Data bits D0-D7 on data bus 184 are coupled to transmit pins (TR1-TR8) and to receive pins (RR1-RR8) 5-12 of universal asnynchronous receiver transmitter (UART) 201, which is identical to UART 161 at data processor 24 of console 11. Signals coupled into pins TR1-TR8 by data bus 184 are converted into an 8-bit serial signal SO is coupled from pin 25 of the UART to line driver 202, having output pins that are connected to connector plug 17. Serial binary signals received by connector 17 from console 11 are supplied to input pins of line receiver 203, and thence as SI input signals to pin 20 of UART 201. UART 201 is activated to be responsive to the 8-bit serial bytes at pin 21 to derive an 8-bit parallel output signal that is coupled by pins 5-12 to data bus 184, as data bits D0-D7.

The signals on data bus 184 are coupled to (SO) pin 25 of UART 201 and the signal at SI pin 20 of the UART is connected to data bus 184 in a two-step operation. Signals at pins 26-33 are loaded into a buffer register of UART 201 in response to an enable signal being derived at terminal OUT00 by decoder 196, as coupled to DS input pin 23 of the UART. The parallel signals loaded into the buffer and read out in response to clock signals supplied to TRC and RRC pins 17 and 40 of UART 201, at the 5 kHz rate, while an enable signal is being derived by decoder 196 on lead OUT01, and supplied to XR pin 21 of the UART via inverter 204. Data are used into a buffer of UART 201 from SI pin 20 at the 5 kHz rate in response to decoder 195 deriving an IN00 enable signal that is coupled in parallel to RDE and RDA input pins 4 and 18 of UART 201. After the 8 binary bits in the signal at SI pins of UART 201 have been loaded into the UART, the eight bits are read out to data bus 104 in response to signal IN00 enabling the UART via RDA and RDE pins 18 and 4.

Five kHz clock signals are supplied to TRC and RRC pins 17 and 40 of UART 201 via a cascaded arrangement of D flip-flop 205, frequency divider 206, and frequency divider 207. Flip-flop 205 in responsive to clock signals derived from oscillator and frequency divider 182, in the same manner as D flip-flop 167 in responsive to the output of oscillator and frequency divider 112.

UART 201, like UART 161, includes status bits DA, TBMT, PE, and FE, respectively derived on pins 19, 22, 13 and 14, once each 1 μs operating cycle of the unit microprocessor in response to signal IN01 being derived from decoder 195. The FE, PE, TBMT and DA signals derived from UART 201 are respectively applied to data bit lines D0, D1, D6 and D7 of data bus 184. Signal D4, when enabled, is coupled to microprocessor 181 via controller 183, to active the microprocessor to indicate that data to be processed is available at the input of the UART. Microprocessor 181 responds to the DA signal and its next address to activate decoder 195 to enable signal IN00 which is coupled to pins 4 and 18 of UART 201, causing 8 parallel bits to be read out from the UART to data line 184. Enabling of signal TBMT indicates that the transmit buffer of UART 201 is empty and that a new byte can be loaded into the UART for coupling to SO pin 25 and thence to console 11. The enabled TBMT signal is coupled through controller chip 183 to microprocessor 181, to cause the next address output of the microprocessor to activate decoder 196 so that signal OUT00 is derived by the decoder. Signal OUT00 is coupled to DS pin 23 of UART 201, enabling the UART to be laoded with a parallel 8 bit byte from data bus 184. An enabled PE signal on pin 13 indicates that there is a parity error in the signal received by UART 201, which parity error is fed into microprocessor 181 via data bit D1 and controller 183. The parity error signal activates microprocessor 181 to prevent loading of RAM 187 with the byte containing the parity error. An enabled signal FE at pin 14 is coupled via data bit D0 through controller 183 to microprocessor 181 to indicate that a stop bit in the frame is in the incorrect place, and advises the microprocessor to ignore the byte including the framing error.

Data bus 184 is responsive to signals generated by unit 14 in response to activation of push buttons 61-65, resistance sensor 71-75, unit select source 103, calibrate switch 105, enable switch 106, and tamper switch 107.

The selective closure of switches 61-65 is coupled, once each 1 μs operating cycle, to data bits D0-D4 via buffer 208 that is activated in response to an enable signal being coupled to IN04 lead by logic circuit 197. Buffer 208 includes five input pins 4, 8, 11, 15 and 13, respectively connected to contacts 61-65, and five output pins 16, 12, 9, 5 and 7 respectively coupled to data lines D0-D4 of data bus 184. In response to the leading edge of signal IN04, the input pin of buffer 208 are responsive to binary signals indicating closure of contacts 61-65. In response to the trailing edge of signal IN04, the signal stored in buffer 208 is read out from pins 16, 12, 9, 5 and 7 to data lines D0-D4 of data bus 184.

Buffer 209 has eight input pins responsive to an 8-bit binary signal indicative of the number of the unit installed in room K. The 8-bit signal is derived from a source 103 having eight individual switches responsive to three decimal keys for the 128 different units and a further key which sets the most significant bit to a binary one if multiple units are installed at the same location. The 8-bit binary signal coupled to the eight input pins of buffer 209 are fed into the buffer in response to the leading edge of signal IN03 derived from decoder 195 during a particular address of microprocessor 181. The trailing edge of signal IN03 activates buffer 209 to derive the 8-bit parallel signal as an output to bits D0-D7 of data bus 184.

In response to an empty bottle condition being sensed by liquid detectors 71-75, enable signals are supplied to data lines D3-D7 of data bus 184. To this end, liquid detectors 71-75 are respectively connected to input pins of resistance detector circuits 211-215, each of which is enabled in response to the resistance supplied to its input pin being above a predetermined value, associated with no liquid being in contact with electrodes of the particular liquid detector. Enabling signals derived from resistance detectors 211-215 are applied to input pins of buffer 216, having three additional input pins responsive to the condition of switches 105-107. In response to any one of switches 105-107 being closed, an enabling signal is supplied to the input pins of buffer 216 which are connected to these switches. Buffer 216 includes an 8-bit output, whereby enabling signals resulting from the outputs of resistance detectors 211-215 are respectively applied to data bits D0-D4, while the signals resulting from activation of switches 105, 107 and 106 are respectively applied to data bits D5, D6 and D7 of data bus 184. Signals are supplied from input pins of buffer 216 to storage circuits of buffer 216 in response to the leading edge of signal IN02 and are read out of the buffer to data bus 184 in response to the trailing edge of signal IN02.

Signals from data bus 184 are also used to activate: (1) solenoid valves 61-65, (2) empty bottle indicating LEDs 91-95, (3) legal hours LED 110, and (4) last call LED 111.

Valves 61-65 are respectively activated in response to data bits D0-D4 being enabled during the interval while signal OUT03 is derived by decoder 196. Data bits D0-D4 are respectively applied to channels 221-225, each of which is identical, whereby a description of channel 221 suffices for the remaining channels. Channel 221 includes NAND gate 226 responsive to data bit D0 and the signal on lead OUT03, as coupled through inverter 227. The signal coupled through inverter 227 is applied in parallel to all of channels 221-225. NAND gate 226 has an output that is applied to a timer 228 including external circuitry which controls the length of time that a binary one signal is derived from the timer, thereby to vary the length of time valve 61 is opened, and to vary the number of ounces in each drink dispensed by reservoir 51 to a glass beneath the reservoir. Timer 228 includes an output pin that activates LED driver 229, having an output that is connected to light emitting diode 230 of electro-optical isolating element 231. Element 231 includes a light responsive silicon controlled rectifier 233 having an anode and cathode which are connected across diagonal pins of bridge 234. Bridge 234 includes another pair of diagonal pins which selectively connect pins 235 of a 120 volt AC source in series with coil 236 that actuates valve 61 in response to bridge 234 being energized into a conducting state by SCR 233 being responsive to light from LED 230.

During the interval while signal OUT01 is derived by decoder 196, LEDs 91-95, 110 and 111 can be selectively activated into a latched-on condition. To this end, signal OUT01 is applied to a latch input of latch chip 237, having eight input signal pins responsive to data bits D0-D7. Latch chip 237, when activated by signal OUT02, supplies an enabling signal to an output pin corresponding with an input pin having an enabling pulse input supplied to it. The enabling level derived from the eight output pins of latch chip 237 are supplied to LED drivers 238, one of which is provided for each of LEDs 91-95, 110 and 111. The signals supplied to latch 237 cause LEDs 91-95 to be respectively activated in response to enabling signals being derived from resistance detectors 211-215. LED 110 is normally maintained in an energized condition, during legal hours, when alcoholic beverages can be dispensed from reservoirs 51-55, while LED 111 is activated for an interval immediately preceding the termination of legal hours, which interval is typically on the order of 15 minutes.

The timing and arrangement of microprocessor 201 are such that enabling signals derived from buffer 216 are not applied directly to LEDs 91-95, but are coupled from the buffer to RAM 187 and thence are coupled back to the LEDs. Similarly, coils 236 of channels 221-225 are not directly responsive to energization of push buttons 61-65, but are activated in response to signals written into RAM 187, and thence read out of the RAM to channels 221-225.

To summarize, control signal: IN00 indicates that data is to be supplied to UART 201; IN01 indicates that the status of UART 201 is to be determined; IN02 enables the empty status of dispensing reservoirs 61-65 is to be determined; IN-03 enables the addressed unit number to be determined; IN04 enables a determination to be made that a dispensing action has been executed at the addressed unit; OUT00 indicates that the UART is ready to transmit; OUT01 indicates that the UART is cleared; OUT02 enables the indicator lights to be activated; OUT03 indicates that a dispensing action has occurred.

Before considering the detailed operations performed at console 11 and unit 14, consideration will be given to the format of data bytes transmitted in both directions between the console and stations. The signals transmitted from console 11 to units 14 are referred to as polls, each of which include five sequential bytes, each including eight parallel bits. Bytes 1 and 2 of each poll are identical, and are utilized for synchronizing purposes. Byte 3 of each poll is an address byte for the unit 14 being polled by console 11, and thus corresponds with the 8-bit binary signal supplied by unit select source 103 to each unit. The fourth byte in each poll is one of seven different commands which are transmitted from each console to an addressed station. The fifth byte in each poll is basically a parity byte, formed by an exclusive OR combination of all the bytes in the poll, whereby;

(byte 5, bit i) = (byte 1, bit i)⊕(byte 2, bit i)⊕(byte 3, bit i)⊕(byte 4, bit i.

Because synchronizing bytes 1 and 2 are identical in each poll, preferably having the value 00010110, the value of byte 5, bit i can be determined exclusively from:

byte 3, bit i⊕byte 4, bit i.

The eight bits in command byte 4 have values indicative of the functions listed in TABLE II.

TABLE II

| 0100 0000 | LINE TEST |
| --- | --- |
| 0100 0001 | SEND DATA |
| 0100 0010 | CLEAR TOTALS |
| 0100 0011 | ENABLE OPERATION |
| 0100 0100 | DISABLE OPERATION |
| 0100 0101 | SET LAST CALL |
| 0100 1000 | RESET TAMPER |

All of units 14 are simultaneously connected to be responsive to the poll transmitted from console 11. However, only the addressed unit 14 responds to a poll, and such a response occurs only if: the poll contains a valid command byte 4 following address byte 3, and LRC or parity byte 5 is correct. The addressed unit responds to the poll approximately 10 milliseconds after receipt of byte 5 of the poll transmitted from console 11 to the units. However, no response is derived from the addressed unit if command byte 4 indicates that a line test is to be conducted or if data are to be transmitted from the console to the addressed unit.

An addressed unit 14, when responding to a poll signal from console 11, except for the test line and send data polls, initially acknowledges receipt of the poll transmitted from the console by sending back to the console all of the five bytes of the original poll signal. The addressed unit 14 then transmits ten bytes, each including eight bits, back to console 11. Bytes 1 and 2 are identical synch bytes, each having a format of 0010111. Synch bytes 1 and 2 are followed by addresss byte 3, which indicates the address of the polled unit 14.

Byte 4 is a status byte, having eight bits respectively representing eight different monitored parameters at the addressed station. The five least significant bits of status byte 4 respectively indicate whether or not reservoirs 51-55 are empty or not empty. The next three most significant bits of status byte 4 indicate the condition of switches 105-107, whereby the sixth least significant bit indicates whether or not calibrate switch 105 is opened or closed, the seventh least significant bit indicates whether enable switch 106 is opened or closed, while the most significant bit of byte 4 indicates whether tamper switch 107 is open or closed. Bytes 5-9 respectively indicate, in binary code, the number of times beverages were dispensed from each of reservoirs 61-65. Byte 10 is a parity byte, whereby each bit of byte 10 is formed by performing an exclusive OR function on the correspondingly numbered bits of the previous nine bytes forming the data poll signal transmitted from addressed unit 14 to console 11.

In order for console 11 to test the line between it and any one of units 14, a 13-byte test signal is transmitted from the console to the addressed unit. Bytes 1 and 2 of a line test command are identical with the sync bytes normally transmitted from console 11 to units 14, while byte 3 indicates the address of the unit 14 over which the line is being tested. Byte 4 signals a line test command, as indicated by line 1 of Table II. Bytes 5-12 of the line test command are selected in accordance with statistical criteria to enable line testing to be performed. In a preferred embodiment, the sequence of bits for bytes 5-12 is indicated by:

TABLE III

| Byte No. | Bit Values |
|---|---|
| 5 | 00000000 |
| 6 | 11111000 |
| 7 | 00011111 |
| 8 | 10100101 |
| 9 | 01011010 |
| 10 | 10010110 |
| 11 | 01101001 |
| 12 | 11111111 |

After byte 12 has been transmitted from console 11 to the addressed station 14, a parity or LRC byte is supplied by the console to the line, with each bit of the LRC byte being formed as an exclusive OR of the correspondingly numbered bits of the other 12 bytes of the line test. The addressed station responds to the line test command by sending back an identical signal, except that the sync bytes 1 and 2 are 00010111, i.e., the same as the sync normally supplied from the addressed station to the console.

Reference is now made to FIG. 5 of the drawing wherein there is illustrated a functional flow diagram of the operations performed by the appratus of FIG. 4, at unit 14. In general, each of the program operations illustrated in FIG. 5 is performed once during each millisecond program cycle time of data processor 101. However, certain initilization functions 241 are performed only after power is initially applied to unit 14. The initialization functions involve clearing certain portions of RAM 187 wherein there are: (1) counters which store the number of drinks dispensed from each of reservoirs 61-65; (2) flags which indicate the status of: (a) calibrate, (b) enable and (c) tamper switches 105-108, (d) the active state of unit 14, and (e) resistance detectors 211-215. In addition, each of buffers 208, 209, 216 and latch 237 is cleared so binary zeros are derived from the outputs thereof.

To carry out the program at unit 14, certain one bit flags are selectively derived during 1 ms cycle time of data processor 101. These flags, stored at different predetermined bit positions in one byte of RAM 187, indicate if: (1) a message is pending for transmission from or reception at unit 14 (button pending), (2) any of buttons 61-65 is depressed (button pending), (3) unit 14 is active to be responsive to an address byte from console 11 (active), (4) unit 14 is the unit addressed by console 11 (local). The manner in which these flags are set is discussed in connection with FIG. 5.

During execution of the program for unit 14, as well as console 11, many comparison operations are performed. The comparison operations are performed in the usual manner, by supplying two bytes from a portion of memory (either one byte from a designated RAM address and one byte from a designated PROM address, or two bytes from different designed RAM addresses) to exclusive or, comparison circuitry in the arithmetic register of the microprocessor. The arithmetic register responds to its inputs to derive an enable signal that sets a flag in the RAM or directs the stack pointer register of the microprocessor to an address in the PROM of the data processor.

Certain addresses in RAM 187 can be considered as counters for indicating the number of drinks served from each of reservoirs 51-55. These counters of RAM 187 are arranged so that there are actually two redundant sets. One set of counters can be considered as active and directly responsive to signals indicative of the total number of dispensing operations performed for each of reservoirs 61-65. The other set of counters is responsive to output signals from the first set of counters. Counts stored in the second set of counters are added to the count on the first set when the console commands a counter interrogation. The first set of counters is cleared when each of the counters dumps its counters into the second set of counters during interrogation. The second set of counters is cleared only when console 11 acknowledges receipt of the number of drinks stored in each of the counters. This feature assures that the second set of counters stores the correct number of drinks dispensed from each of the reservoirs, regardless of whether a polling operation is performed on unit 14 by console 11 while one of buttons 51-55 is or is not activated.

The first operation 242, except when a start sequence and initialization function 241 are required, involves determining the message pending flag. If operation 242 indicates that a message is not pending, the program stored in PROMS 185 and 186 is advanced to operation 243.

During operation 243, a determination is made by examining the button pending flag to determine whether the status of one of buttons 61-65 is pending, i.e., was one of buttons 61-65 pressed since operation 243 was last performed or if a button is now being pressed. If the button pending flag is not set, operations 244-248 are executed in sequence. Operations 244-248 respectively involve interrogating the addresses of RAM 256 where the status of buttons 61-65 is stored; the status of buttons 61-65 is fed to the RAM under the control of signal IN04. If operations 244-248 indicate that none of buttons 61-65 is set, the program executes a DO loop and operation 243 is again performed to determine if a button is pending.

In response to one of buttons 61-65 being set, RAM 187 supplies an enable signal to data bits D0-D4 during operations 244-248, respectively, whereby coil 236 of the appropriate channel 221-225 is activated during one of operations 251-254, whichever one of these operations is reached during the operating cycle being considered. The sequential performance of operations 244-248, with a possible program branch after each prevents activation of more than one of coils 236 at a time. After one of operations 251-254 has been executed, a count of one is added to one of five counters in RAM 187 that stores the number of dispensing operations associated with reservoirs 51-55 respectively. After any one of operations 255-259 has been executed, the button pending flag is set during operation 261. The flag set during operation 261 is examined during interrogation operation 243.

If operation 243 indicates that the button pending flag is set, interrogation operation 262 is executed. Operation 262 involves determining if the pending button was released within the last 1 ms program cycle time of data processor 101. The operation is performed by feeding the set pending flag (set during operation 261) and the pending button flag status of the immediately preceding cycle from predetermined addresses in RAM 187 to exclusive or (comparison) circuitry in the arithmetic unit of microprocessor 181. In response to operation 262 indicating that the button has been released, the button pending flag is reset during operation 263 so that when operation 243 is next performed there is a no answer. If button released interrogation operation 262 indicates that the button was not released, the program returns to interrogation operation 242, enabling a determination to be made as to whether a message is or is not pending.

In response to interrogation operation 242 indicating that a message is pending, operation 264 is executed. During operation 264 message bytes received by unit 14 from console 11 are read. The first step involved in reading a message byte from console 11 into unit 14 involves determining if the active flag has been set at the unit, interrogation 265. In response to interrogation operation 265 indicating that the active flag has not been set at unit 14, operation 266 determines if the 8-bit byte supplied by UART201 to data line 184 is a synchronization byte. In response to operation 266 indicating that the eight bits received by UART201 do not form a synchronization byte, the program is returned to message pending operation 242. If, however, it is determined that a sync byte is applied to UART201, the active flag of unit 14 is set during operation 267. Following operation 267, a counter in RAM 187, that indicates the number of received bytes, is incremented from zero to a count of 1, during operation 268. Hence, the count of the counter is one less than the number of received bytes. After operation 268, microprocessor 181 activates PROMS 181 and 186 so that the program returns to operation 242.

If operation 265 reveals that the active flag was set during operation 267, the program is advanced to interrogation operation 269, during which the count of the byte counter is examined to determine if it is a one or some other number. If operation 269 determines that the byte count is one, indicating the second received byte, the program proceeds to interrogation operation 270, at which time a determination is made as to whether the second received byte is, in fact, a sync byte. It is to be recalled that the second byte is normally a sync byte, but in certain instances, there may be errors on the line or the byte counter may erroneously be set to a count of one, whereby operation 270 results in a no. A no result from operation 270 causes the active flag for station 14 to be reset during operation 271. After operation 271, the program returns to operation 242.

If interrogation operation 270 determines that the second byte was, in fact, a sync byte, the program is advanced so the byte counter is incremented by a count of 1, during operation 272. After the byte counter has been incremented by a count of one by operation 272, the program returns to message pending interrogation operation 242.

If interrogation operation 269 indicates that the byte counter count is not one, the program is advanced to interrogation operation 273, during which the byte counter is examined to determine whether the count stored therein is two, as occurs in response to the third (address) byte being transmitted from console 11. In response to the byte counter storing a value of two, the program is advanced to interrogation operation 274 during which a determination is made as to whether the address byte now being received at unit 14 is the same as the address of the local or particular unit 14. Hence, all of the foregoing operations are carried out by each of stations 214 in response to bytes 0, 1 and 2 being transmitted from console 11 to all of the units.

In response to operation 274 indicating that the address at the particular unit 14 differs from the address tranmsitted from console 11, the active flag at the particular unit is reset during operation 271 so the particular unit is decoupled during the remainder of the poll being transmitted from console 11. If, however, the address of unit 14 is the same as the address transmitted from console 11 during the third byte, the local flag at the particular station 14 is set during operation 275. During operation 275 the bits in byte 2 are supplied to the exclusive or circuitry in the arithmetic register of microprocessor 181, to initiate accumulation of the LRC signal, which is utilized for parity check purposes.

If interrogation operation 273 indicates that the byte count is not two, the program is advanced to operation 276, during which a determination is made as to whether the local flag is set; the local flag is set only if the first, second and third bytes have been correctly received and the address of the particular station coincides with the address transmitted from the console 11. In response to operation 276 indicating that the local flag is not set, the program advances to interrogation operation 277, during which the byte counter is examined to determine if it has a count of 5, which indicates that the poll from console 11 to the addressed unit 14 has been completed. In response to the byte counter having a count of 5, the program advances to operation 271, during which the active and local flags are reset.

In response to interrogation operation 277 indicating that the byte count is not 5, the program advances to operation 277, during which the byte counter is incremented by a count of 1. Operation 272 is thereby performed in all of units 14, except the addressed unit which responds to the fourth (command) byte and the fifth (LRC) byte in the poll from console 11 to units 14.

In response to interrogation operation 276 indicating that the local flat is set, operation 278 is performed. During operation 278, the received third, fourth or fifth byte from console 11 is fed to a designated address of RAM 187. In addition, the received byte is applied to the exclusive or circuitry in microprocessor 101, and accumulated in a register of the microprocessor arithmetic unit. Of course, operation 278 is performed only at the station 14 having an address that is the same as the address transmitted from console 11.

After operation 278 has been performed, the program is advanced to interrogation operation 279, during which the byte counter is examined to determine if it has a count of five, i.e., all of the five bits of the poll from console 11 have been received. Operation 279 is also reached after operation 275 has been performed. If operation 279 indicates that the byte count is not 5, the program is advanced to operation 272, during which the byte counter is incremented by a count of 1.

If, however, operation 279 indicates that the byte count is 5, operations are performed that are related to determining if the poll signal transmitted to the particular station 14 is correct and certain commands associated with byte 3 are possibly executed. If operation 279 determines that the byte count equals 5, operation 281 is performed. During operation 281, all of the accumulated bits which have been exclusive ored together are examined to determine if each of them has a binary zero value. If each of the accumulated bits does not have a binary zero value, in indication is provided that there has been an incorrect transmission to or reception at unit 14, and the program proceeds to operation 271, whereby the active and local flags at the particular unit 14 are reset.

If, however, operation 281 indicates that the accumulated, exclusive ored bits all have a binary zero value, a correct transmission between console 11 and the addressed unit 14 is assumed, whereby program is advanced to operation 282. During operation 282, a stored indication (01000001) of command byte 3 is compared with the received byte 3 to determine if the addressed unit 14 is to send data back to console 11. If operation 282 indicates that the particular station 14 has been commanded to send data back to console 11, a data message is sent back to the console during operation 283. The data message has the format described supra, including ten bytes, numbered 0-9; bytes 0 and 1 are sync bytes, byte 2 is the address of the addressed unit, byte 3 is a status byte for the addressed unit, bytes 4-8 indicate the number of servings respectively associated with reservoirs 51-55, and byte 9 is the LRC or parity byte. After the data message has been sent from UART 201 at the addressed unit 14 to console 11, the program at unit 14 is advanced to operation 271, during which the active and local flags are reset.

If operation 282 indicates that the command byte transmitted from console 11 to the addressed unit 14 was other than a command to send data back to the console, the program is activated to operation 284. In operation 284, the original five byte poll is transmitted from the addressed unit 14 back to console 11 as an acknowledge message. As previously indicated, however, the sync bytes of the acknowledge messages that are transmitted from the addressed unit 14 back to console 11 are modified to be 00010111.

After the acknowledge signal has been transmitted from unit 14, the program is advanced to operation 285, during which the function commanded during the fourth byte of the poll transmitted from the console 11 to the addressed unit is executed. In other words, during operation 285, one of the following functions is performed at the addressed unit 14: (1) the total of the number of dispensed drinks stored in RAM 256 is cleared or erased (2) the operation of the addressed unit 14 is enabled, (3) the operation of the addressed unit 14 is disabled, (4) last call indicating LED 111 is activated, and (5) a bit in RAM 187 which indicates that tamper switch 107 has been activated, is reset.

After operation 285 has been performed, the program is advanced to operation 271, during which the active and local flags are reset.

A complete operating cycle of station 14 has thus been described for all possible situations at the station, whether it be an addressed or unaddressed station. A detailed program listing of the program stored in PROMS 185 and 186, in the INTEL 1080A assemblers language is enclosed as a part of Appendix I.

Consideration is now given to the program of data processor 24 at console 11, by referring to the flow diagram of FIG. 6.

Before describing the detailed flow diagram of data processor 24, consideration will be given to certain registers of microprocessor 111 and the function of certain addresses in RAMs 121-124 and PROMS 117, 118. Certain of the registers in microprocessor 111 indicate the status of program pointers. In addition, microprocessor 111 includes a millisecond tikker register that is responsive to two MHz clock pulses derived from oscillator and frequency divider 112, and is utilized in connection with interrupt operations. When the tikker register indicates that one millisecond has elapsed, the program of data processor 111 is restarted, to establish a one millisecond program cycle including many of the 1 microsecond microprocessor cycles. The arithmetic register of microprocessor 111 includes exclusive or, comparison circuitry that determines the result of many interrogation operations in the same manner as discussed supra for microprocessor 161. Certain addresses in RAMs 121-124 store information that has been supplied to data processor 124 by keyboard 22; other addresses in the RAMs store information or data from an addressed unit 14; other addresses are utilized as station tables to keep track of: (1) the units 14 connected in the system, (2) the rates associated with the dispensing operations at the units, and (3) the status of each unit; other addresses store the sum of all drinks that have been served at all of units 14 since power has been switched on the system; other addresses store information regarding time in milliseconds, quarter seconds, minutes, hours, days of the week, days of the month, and month; other addresses are utilized in connection with keyboard queuing to keep track of the number of keys that have been activated at keyboard 23, but which have not been processed through the display, the size of a mask, the next memory cell where characters to be displayed can be stored in the queue, the oldest cell in the keyboard queue, and cells for storing the unprocessed keyboard data; other addresses store the beginning and end of legal hours (in minutes and hours) for all seven days of the week. In addition, RAMs 121-124 store signals associated with communicating between console 11 and units 14; these signals are: a state flag, a transmit count, an address for the unit 14 in communication with console 11, a command byte, a parity byte, and a count of the byte numbers in the transmission between console 11 and unit 14. RAMs 121-124 also store other signals relating to alphanumeric displays on dynamic, LED display 23; these signals indicate whether there is a display being generated, and the current character being displayed at each of the 16 display positions. PROMs 117, 118 store the firmware program, as well as signals to activate display 23 in response to certain direct keyboard entries, as well as in response to keyboard entries that are determined by the program to be incorrect. The displayed characters are stored as 16 bit entries, formed as two 8-bit bytes that are sequentially fed to data bus 100.

The main program executed by data processor 24 in response to a program sequence read out of PROM 118 in response to pointers from microprocessor 111 is broadly indicated in the flow diagram of FIG. 6A. After the system has been turned on, operation 301, addresses in RAMs 121-124 for queing keyboard 22 are cleared during operation 302. Immediately thereafter, the program is advanced to operation 303 which involves clearing the registers in UART161 and buffers 644 and 645. Immediately thereafter, the one millisecond tikker is cleared during operation 304.

After all clearing operations 302, 303 and 304 have been performed, the interrupt service is enabled during operation 305, as described in detail in connection with FIG. 6B. Then buffer 163 and the communication buffers in UART 161 are cleared during operation 306.

A test is then made, during operation 307, to determine if there has been a system shut down. Such a test is made by determining if the voltage at lead 135, as supplied to address decoder 125, is above or below a threshold value associated with a binary one value. If the voltage is below the threshold, a power failure is presumed and a test is made to determine whether the contents of RAMs 121-124 can be considered as being reliable. The test involves performing an exclusive or function of the signals stored in RAMs 121-124 which is indicative of the sum of all dispensed drinks with a multi-bit parity byte that is accumulated as the sum of the drinks is stored. If this exclusive or function results in a sum of zero, it is assumed that the power loss caused a change in the memory, whereby it is necessary to clear the scratch pad and station table addresses in RAMs 121-124; such clearing is performed during operation 308. If, however, operation 307 indicates that the power shutdown did not alter the signals stored in RAMs 121-124, the program proceeds to operation 309, during which clock pulses are supplied once every millisecond to designated addresses in RAMs 121-124, which addresses are considered to form a soft clock. The soft clock stores time in milliseconds, quarter-seconds, seconds, minutes and hours and initially has all zeroes in it; and is thereafter incremented as described in connection with FIG. 6B.

After the soft clock has been started, polling of units 14 is initiated during operation 310. Then, timing functions, as illustrated by FIG. 6D, are performed during operation 311. The program is then advanced to operation 316, during which the stored keyboard queue, indicated by FIG. 6E, is unloaded. Then, during interrogation operation 317, a determination is made as to whether the keyboard queue is empty. If the keyboard queue is not empty, the keyboard instructions in the keyboard queue are performed during operation 318, and, as illustrated in FIG. 6E. During operation 318, the various command functions which have been entered into the keyboard are performed in accordance with the flow diagrams on FIGS. 6F-6N. If, however, operation 317 indicates that the keyboard queue is empty, the station polling operations indicated by FIG. 6P are performed during operation 319. Upon completion of operation 319, the main program is recycled back to operation 311. Thus, during the normal operation of data processor 24, (when there is no interrupt) operations 311, 316, 317, possibly operation 318, and operation 319, are sequentially performed, with return from operation 319 to operation 311, without performance of operations 302-310. Interrupt operation 305, however, is performed on demand in response to activation of keys from keyboard 22, in response to the elapse of certain time intervals, and when signals are being transmitted between console 11 and unit 14 in both directions.

The interrupt operations are illustrated in detail in the flow diagram of FIG. 6B. When the interrupt service is initially entered, operation 321 is performed; operation 321 involves saving the state of the program of data processor 24 when the interrupt instruction occurred. This operation involves shifting the signals stored in the various registers of microprocessor 111 into designated memory locations of RAMs 121-124. In particular, the signals stored in each of the registers of microprocessor 111 are fed to designated locations in RAMs 121-124. These registers are: (1) the program status word register, (2) the stack pointer register, (3) the 16-bits stored in the microprocessor BC registers, (4) the 16-bits stored in the microprocessor DE registers; and (5) the 16-bits stored in the microprocessor HL registers. Then the 1 millisecond tikker register in microprocessor 111 is cleared, during operation 322.

If the interrupt is to service the time of the day counter or clock, which occurs once every millisecond, such servicing is performed during operation 323. During operation 323, five bytes of RAMs 121-124 are selectively activated. The five bytes indicate milliseconds, between 0 and 249, quarter seconds between 0 and 3, seconds between 0 and 59, minutes between 9 and 59, and hours within the day, between 0 and 23. The millisecond byte is incremented once every millisecond. In response to the millisecond counter in RAMs 121-124 exceeding a count of 249, the quarter second counter in RAMs 121-124 is incremented by a count of one. Similarly, the second counter in RAMs 121-124 is activated in response to a count of three being exceeded by the quarter second counter, while the minute and hour counters are activated in response to the second and minute counters respectively exceeding counts of 59.

The quarter second, second, minute and hour counters are advanced in response to comparison operations performed in microprocessor 111. To increment the quarter second counter, a signal indicative of 249 milliseconds is supplied from a designated address in PROM 118 to one input of the exclusive OR, comparator circuit of microprocessor 111 immediately before the millisecond counter is incremented. After the millisecond counter has been incremented, the millisecond counter address in RAMs 121-124 is read out to the other input of microprocessor comparator. If the comparison operation indicates that the maximum 249 count of the millisecond counter has been reached, an increment pulse is supplied to the quarter second counter in RAMs 121-124. Similarly, the second, minute and hour counters in the RAMs are advanced.

After the clock counters in RAMs 121-124 have been serviced, operation 324 determines if any new keys of keyboard 22 have been struck during the one millisecond operating cycle under consideration. This determination is made by examining data bit 7 of data bus 100, which has a binary one level in response to an enable signal being supplied to lead IN20 by decoder 145. If operation 324 indicates that a new key has been struck, the new key or keys are queued during operation 325. The keyboard queue includes twelve 8-bit bytes of RAMs 121-124. The first, second, third and fourth bytes respectively indicate: (1) the number of keys that have not been processed, (2) the size of a 7-byte mask indicating the number of key signals that can be stored, (3) the memory cell number where the next character can be stored in the queue, and (4) the cell number of the oldest keyed character, i.e., the key which is next in line to be processed. The remaining 8-byte locations in the keyboard queue indicate the values of the characters that are awaiting processing. The queuing technique is a standard technique, such as described in the book "Queuing Systems," written by Leonard Kleinrock.

After operation 325 has been performed, or if there are no new keys as determined by operation 324, display 23 is refreshed during operation 326. The display refresh operation is well known to those skilled in the art and involves standard light emitting diode display multiplexing techniques. Display refreshing is performed with a modulo 16 position counter in RAMs 121-124 that controls where a particular character is to be displayed. In addition, a display table containing 16-bit entries selects the segments of display 23 which are to be illuminated in response to the code for the character. This table is stored in PROMs 117 and 118 and fed to latches 151 and 152 under the control of an enable signal on lead OUT30, as derived from decoder 146. The position counter of RAMs 121-124 supplies signals to latch decoder 153 in response to an enable signal being supplied to lead OUT40 by decoder 146.

After operation 326 has been performed, operation 327 determines whether the communication flag is set to zero. If the flag is set to zero, there is to be no communication between UART 161 and units 14 in either way; if the flag is not set to zero, there is to be communication to and/or from the UART. The communication flag is set to zero if a parity error (PE) or framing error (FE) is indicated by UART 161 in response to an enabling signal being supplied to lead IN10 by decoder 145. If the data available (DA) signal at terminal 19, or the transmit buffer of UART 161 is enabled, the communication flag is not set to zero and the communication service program 328, illustrated in detail in FIG. 6C, is executed.

After operation 328 has been performed or interrogation operation 327 indicates that the communication flag is set to zero, operation 339 is executed, during which the signals which were transferred from microprocessor 111 to RAMs 121-124 during operation 321, are transferred back to the microprocessor. After operation 329, enable interrupt operation 330 is performed in response to flip-flop 175 supplying a signal to the INT lead which is coupled to INT input terminal 14 of microprocessor 111. Microprocessor 111 and PROMs 117, 118, then continue their 1 ms operating cycle at the same place as when the interrupt occurred. The maximum time required to execute the interrupt cycle is 150 microseconds, a relatively small percentage of the one millisecond total operating cycle time of data processor 24.

Figure 6C:
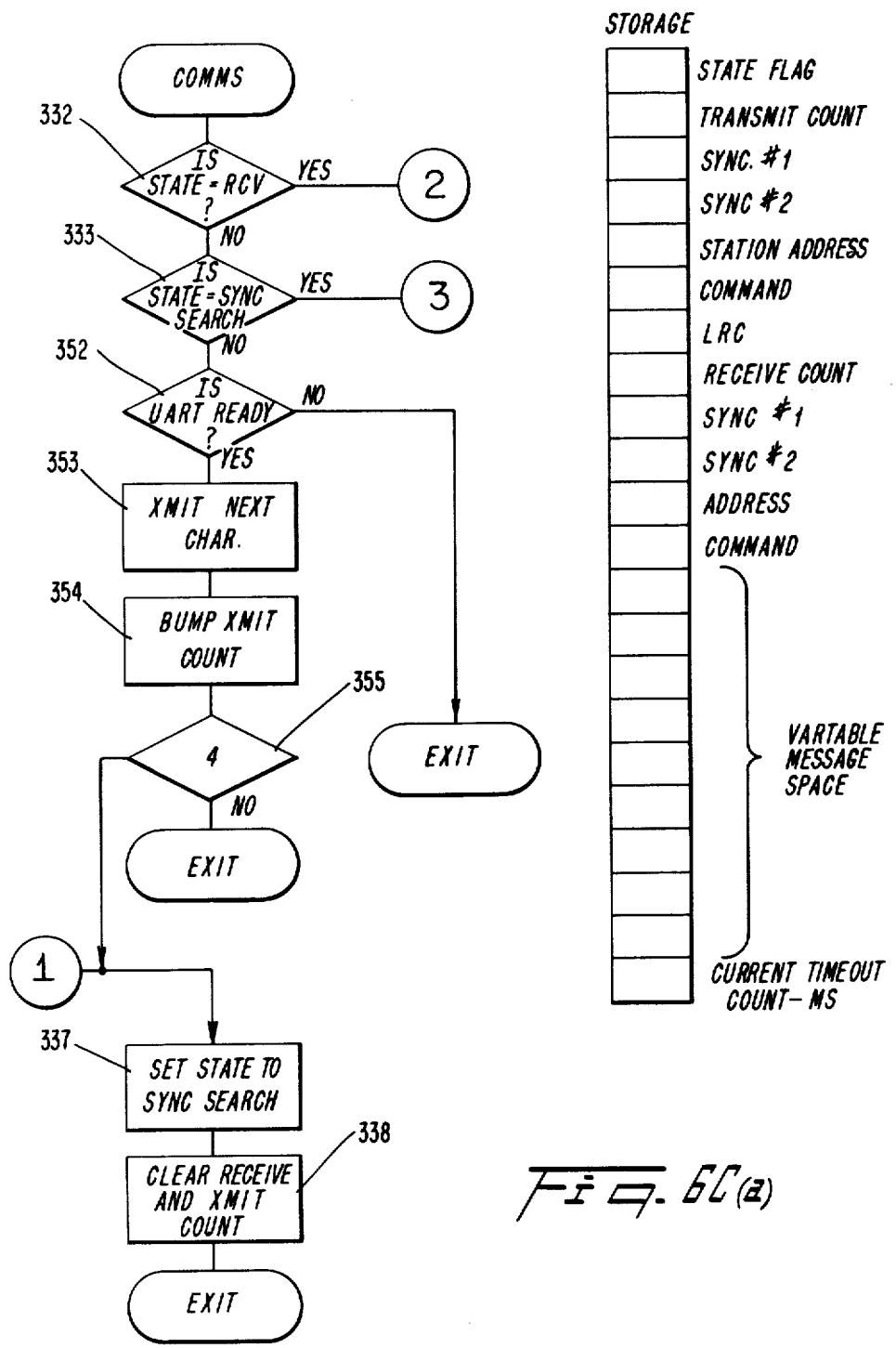
Figure 6C:
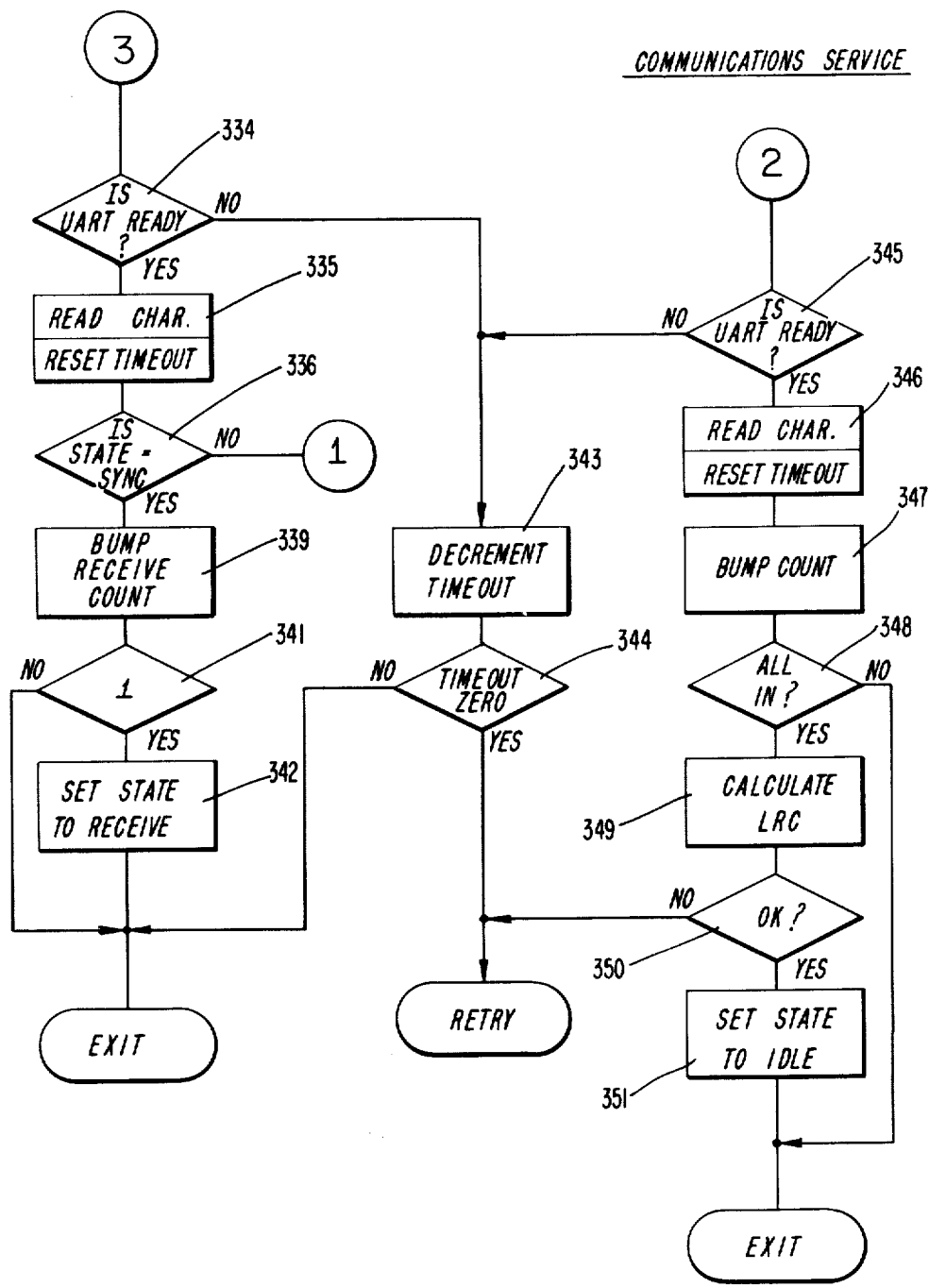

Reference is now made to FIG. 6C of the drawing wherein there is illustrated a flow diagram for the operations involved in servicing the communication cycle, indicated by operation 328, FIG. 6B. Associated with the communications service procedure are addresses in RAMs 121-124 which indicate: (1) the state of the communications flag, (2) a counter for the byte number of the message being transmitted from console 11 to unit 14, (3) the address of unit 14 to which the next message is to be transmitted, (4) a byte 3 command signal for the unit, and (5) an accumulated indication of the parity or LRC bit. In addition, PROMs 117 and 118 store the synchronizating bytes which are always transmitted with a poll from console 11 to units 14. RAMs 121-124 also include storage locations to indicate the byte number of the message being received from unit 14 at console 11, the two sync bytes in the received poll, the address of the unit 14 communicating with console 11, the command to which unit 14 is responsive, nine locations for a variable length message, a cell for indicating when the message was received, and a cell for storing the parity bit transmitted from the station to console 11. Twenty-three, 8-bit bytes addresses are provided in RAMs 121-124 for the communication.

The state flag in RAMs 121-124 for the communication service includes one byte having individual bit locations that indicate: (1) the state (active or idle) of the communication flag, (2) whether the communication service is in a receive state, (3) whether the communication service is in a sync search condition (the normal, idle position of console 11), (4) whether UART 161 is ready, and (5) whether the communication service is in an idle state.

The first step, operation 332, in the service communications subroutine 328 involves determining whether the state flag is set to receive. Normally, the state flag is not set to receive, and the program is advanced to interrogation operation 333, during which the state flag is again examined to determine if it is set to a sync search condition. If no transmission or reception is occurring, the state flag has previously been set to a sync search position, and the program is advanced to interrogation operation 333, which determines whether or not UART 161 is ready, as determined, in response to the TBMT signal at terminal 22 of the UART.

If the UART 161 is ready, the program advances to operation 335, during which the character to be transmitted is read from an address in RAMs 121-124 to data bus 100 and thence to input terminals 26-33 of UART 161. Virtually simultaneously, the present time-out counter is reset to zero. After operation 335 has been performed, operation 336 determines from the state flag if synchronization has been achieved. If operation 336 indicates that synchronization has not been achieved, the program advances to operation 337 and the state flag is set to a sync search condition. Following operation 337, the number of received bytes counter in RAMs 121-124 is cleared to zero. After operation 338, the communications service subroutine is exited.

If, however, operation 336 indicates that the state flag is set to sync, the program proceeds to operation 339, during which the received byte counter is bumped, i.e., incremented, by a count of one. After incrementing operation 339 has been performed, the received byte counter in RAMs 121-124 is examined during operation 341 to determine if the counter has a count of one; a count of one indicates that the second sync byte is being processed. If operation 341 indicates that the second sync byte is not being processed, the communication subroutine is exited. If, however, operation 341 indicates that the second sync byte is being processed, the state flag is set to receive during operation 342 which is followed by an exit of the communication service subroutine.

If interrogation operation 334 indicates that UART 161 is not ready to transmit information, the program proceeds to operation 343, during which a 150 millisecond time-out counter in RAMs 12-124 is decremented by a count of one. Operation 343 is followed by operation 344, during which the time-out counter is examined to determine if it has a zero value. If the time-out counter does not have a zero value, the communications service subroutine is exited. If, however, the time-out counter count is zero, the communications service subroutine returns to operation 327, when the communication flag is again sensed to determine if it is set. If the communication flag is set, i.e., is not zero, the communications service subroutine is again performed, starting again with an examination of the state flag to determine if it is set to receive, as indicated by operation 332.

If operation 332 indicates that the state flag is set to receive, the program proceeds to operation 345, during which the DA signal on terminal 19 of UART 161 is sensed to determine if UART 161 is ready to receive a byte from data bus 100. If operation 345 indicates that UART 161 is not ready, the program advances to operation 343 whereby the time-out counter is decremented and the program then continues as described above. If, however, operation 345 indicates that UART 161 is ready, the program advances to operation 346, during which an 8-bit, received byte is read out from UART 161 terminals 3-12 through buffer 163 to data bus 100 and is appropriately stored in RAMs 121-124. As a character is being read out from UART 161 to RAMS 121-124, the time-out counter is reset to zero.

Upon the completion of operation 346, the number of received byte counter in RAMs 121-124 is incremented by a count of one during operation 347. Then, during operation 348, the count stored in the received byte counter is compared with the number of bytes in a poll from units 14 to console 11. If operation 348 indicates that further bytes are to be received during the poll, the communications subroutine is exited. If, however, operation 348 indicates that the last byte has been received, i.e., the parity of LRC byte has been received, the accumulated exclusive ORed bits of the received poll are calculated during operation 349. The accumulated exclusive ORed signals are sensed during operation 350 to determine if each of the exclusive ORed bits has a correct value. If operation 350 indicates that the exclusive ORed bits do not have a correct value, the communication flag subroutine is again re-entered, as indicated by operation 327. If, however, operation 350 indicates that the exclusive ORed bits have the correct value, the state flag is set to idle, during operation 351.

Previously, consideration has been given to the operations performed if interrogation operations 332 and 333 indicate that the state flag is in a receive condition and the state flag is in a sync search condition. If, however, operation 333 is reached while the state flag is not in a sync search condition, the program advances to operation 352, which involves determining whether UART 161 is ready. If UART 161 is not ready, the communication subroutine is immediately exited. If, however, operation 352 indicates that UART 161 is ready, there is an implication that a byte is to be transmitted from console 11 to the addressed unit 14.

The next character is transmitted during operation 353, which involves feeding a byte from addresses in RAMs 121-124 to data line 100 and UART 161 terminals 26-33. After the byte has been loaded into terminals 26-33, the byte is read out in series from UART 161 SO terminal 25 and transmitted to the addressed unit 14. After operation 353 has been performed, the transmit byte counter in RAMs 121-124 is incremented by a count of one, during operation 354. After the transmit byte counter has been incremented, the transmit byte counter is examined during operation 355 to determine if the last transmitted byte count of 4 has been reached. If the highest transmitted byte count has not been reached, the communications subroutine is exited. If, however, the last transmitted byte count has been reached, the program advances to operation 337 so that the communications service subroutine can again search for sync bytes. The transmit byte counter is then cleared, during operation 338 and the communications service subroutine is exited.

Consideration is now given to the operations involved in timers subroutine 311, as illustrated by the flow diagram of FIG. 6D. The initial operation 411 of subroutine 311 involves reading the previous second of time from a designated memory location of RAMs 121-124. During operation 412, a test is then made to determine if the previous seconds stored in RAMs 121-124 is the same as the presently read second. If the present and previous seconds are the same, the timing subroutine is immediately exited.

If, however, the previous second differs from the present second, the new second is transferred to the location in RAMs 121-124 previously occupied by the previous second, operation 413. After operation 413 has been performed, the program is advanced to operation 414, at which time a flag in the i-bit flag byte of RAMs 121-124 is interrogated to determine if an audio alarm is being sounded by speaker 27; this flag is termed system bleep. If the flag interrogated during operation 414 indicates that the system bleep is on, the program is advanced to operation 415, at which time the bleep flag is again maintained and a display recycle delay counter in RAMs 121-124 is incremented. The display recycle counter indicates a delay time, in seconds, between the last time a key of keyboard 22 was activated and the present time. If 30 seconds are counted by the recycle delay counter, it is assumed that the keyboard is unattended and the program is exited, as described infra.

After operation 415 has been performed, or if operation 414 indicates that the system bleep is not on, a determination is made during operation 416 as to whether a new minute has been reached. The new minute determination is made by examining the second counter and determining if it last had a value of 59. If interrogation operation 416 indicates that a new minute has been reached, the minute counter is incremented. Then, during operation 317, the hour counter is examined to determine if it last had a value of 59; if so, the hour counter is incremented.

If operation 417 indicates the hour counter is incremented, a midnight determination is made during operation 418 by sensing the hours clock to see if it last had a value of 23. Because operation 418 can only be reached if there is a new second, a new minute and a new hour, a prevous hour value of 23 indicates that midnight has been reached. When it is determined that midnight has been reached, the date counter of RAMs 121-124 is incremented during operation 419. It is noted that there is no incrementing between months; instead, the operator is required, at the beginning of each month, to reset the first of the month via a keyboard entry, including pressing date key 18. After operation 419, or if either of operations 417 or 418 determines that midnight has not been reached, the program is advanced to operation 421.

During operation 421, the delay time counter in RAMs 121-124, indicative of how long before display 23 is to be recycled, is decremented. As discussed infra, in connection with FIG. 6E, the delay time counter is set to 30 each time a key of keyboard 22 is struck and indicates if keyboard 22 is being used. The delay time counter is interrogated during operation 422 to determine if it has a zero value. If the delay time counter has a zero value, the timer subroutine is exited because 30 seconds have elapsed since the last time a key was struck. If the delay time counter does not have a zero value, the program is advanced to operation 423, during which a key activity flag is reset to zero in response to the strobe signal from keyboard 22. Because 30 seconds are required to reach operation 423 after the last time a key at keyboard 22 was struck, the key activity flag remains set for 30 seconds.

After operation 423 has been performed, the program is advanced to operation 424, at which time the display recycle delay counter is reset to a count of five, commensurate with an interval of 5 seconds. After operation 424 has been performed, the program is advanced to operation 424, at which time a modulo three-message flag counter is RAMs 121-124 is decremented. The modulo three-message flag counter indicates which of three messages are to be supplied to display 23. One of the messages is an advertisement, for example, for the brand name of the present equipment, the second message indicates the time, in hours, and minutes, while the third message indicates the date during the month. In response to the message flag display counter having counts of zero, one and two, display 23 is respectively supplied with the advertisement, the time during the day, and the date; the display is performed during operation 426.

After timing subroutine 311 has been executed, the keyboard queue subroutine 316 is performed, which is followed by a determination 317 as to whether the queue is empty, which may be followed by operation 318 performance of the keyboard work; details of these operations are in the flow diagram of FIG. 6E. The first operation 431 involved in handling the keyboard is to supply all of the bits of the keyed character to a designated memory space, as described in operation 325, FIG. 6B. Then, during operation 432, a determination is made as to whether the key signal which was just entered into memory represents a numeral or a function. If the key signal represents a function, certain bits in the stored byte have predetermined values which are compared in microprocessor 111 with predetermined values for these bits, as stored in a designated location of PROMs 117 and 118.

In response to operation 432 indicating that the key represents a numerical signal, the program is advanced to operation 433, at which time the counter which stores the number of active entries in the keyboard queue is examined to determine if it has a zero count. If there are zero active entries in the keyboard queue counter, the program is advanced to operation 434, which orders display 23 to be cleared by deactivating each of latches 151, 152 and 153. If, however, operation 433 indicates that there are active entries pending in the keyboard queue counter, the program is advanced to operation 435 during which the active keyboard queue counter is again examined to determine if it has a count of 17, one more than the highest number of characters that can be displayed at one time on display 23. If operation 435 indicates that the character count is 17, the program is advanced to operation 436, during which the character counter is cleared to zero, the desired result because there has been an error in the character counter. After operation 436, the program advances to the clear image operation 434.

If the character counter count is not equal to 17, or after clear operation 434 has been performed, the character counter is incremented by a count of one during operation 437. Thereafter, the signal representing the new key is supplied from the keyboard queue, discussed in connection with FIG. 6B, into a portion of RAMs 121-124 where the next character to be supplied to display 23 is stored; this operation is indicated by rotate new key into image operation 438. After operation 438 has been completed, the delay time counter is set to a count of 30, during operation 439. The delay time counter is utilized in connection with the timer subroutine described in connection with FIG. 6D.

If, however, operation 432 indicates that the struck key is not a numeral, but a function, the program advances to operation 441 and a signal for the function key is compared with stored signals in PROMs 117, 118 for the different functions. Depending upon the particular function, one of 14 different subroutines, described in connection with FIGS. 6F-6P, is executed; (no FIG. 6O exists because of possible confusion). The functions are: (1) set time, (2) set date, (3) set legal hours, (4) set rates, (5) cancel, (6) diagnostics, (7) room total, (8) assigned unit to a room, (9) determined empties, (10) reset tamper, (11) next, (12) clear totals, (13) enable, and (14) disable.

The set time and set date function subroutines are described in connection with the flow diagrams of FIGS. 6F and 6G. After the operator activates key 34 to indicate that time is to be changed, he enters one or two digits to indicate the current hour (between 0 and 23), which is followed by activation of dot key 33 and then by two digit entries to indicate the current minute (between 0 and 59). After the hour has been entered, the operator activates date key 35, that is followed by a one digit entry to indicate the day of the week (between 1 and 7). After the day of the week has been displayed, the operator enters the day of the month as digits from 1 to 31, the month as digits 01-12, and the year of the century as digits from 00-99.

Figure 6F:
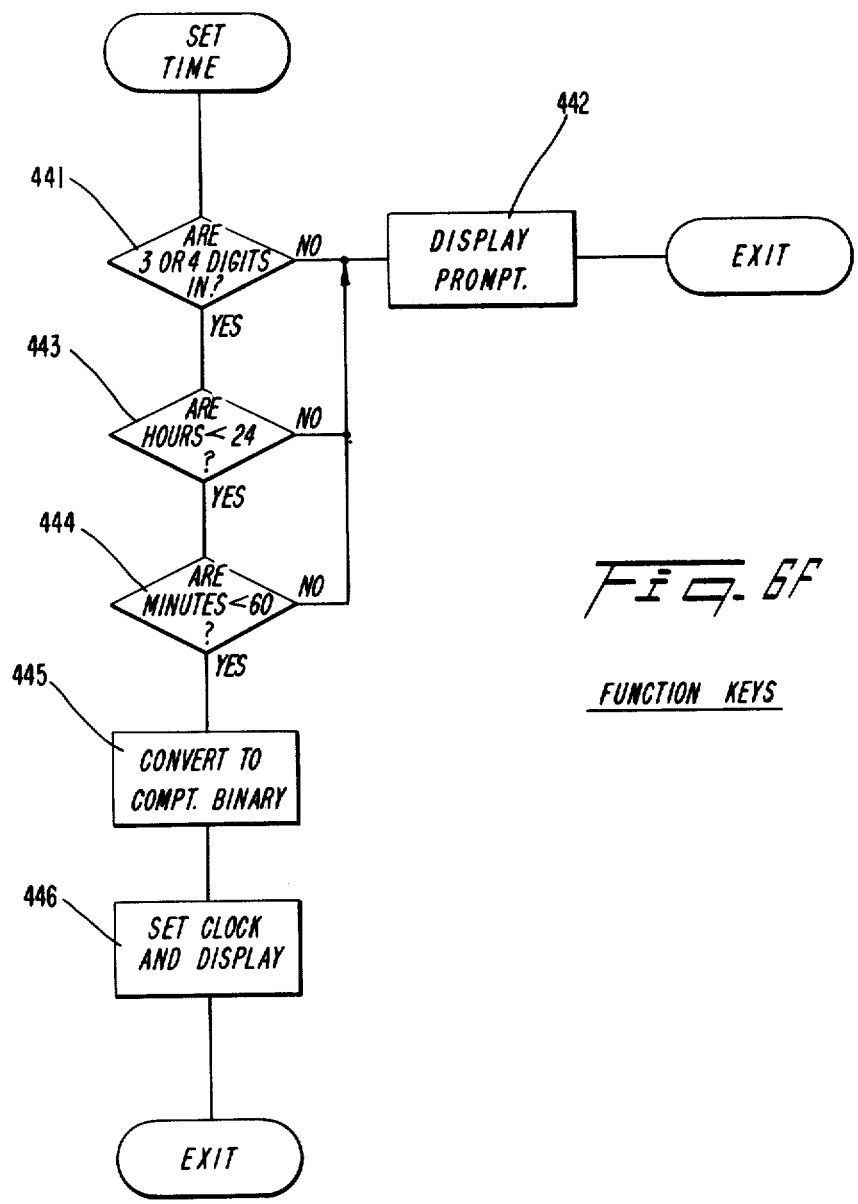

In response to the set time function key 34 being activated, data processor 24 is activated to perform the functions illustrated by the flow chart of FIG. 6F. Initially, data processor 24 determines, during operation 441, if less than 3 numerical keys have been struck within a 30 second interval of the delay time counter. If less than three numeral keys are struck, the operator entered an incorrect time of day into the keyboard, and the program is advanced to prompt operation 442, during which PROMs 117 and 118 are activated to supply display 23 with prompting characters advising the operator that he has made a mistake in entering the new time. After the prompting characters have been displayed, data change and numerical key signals are erased from RAMs 121-124 and the set time function subroutine is exited.

If, however, three or four digits were entered, the program is advanced to operation 443, during which a determination is made as to whether the number of entered hours is less than 24, i.e., the value of the digits entered prior to the dot are examined to determine if they have a value of less than 24. If the number of entered hours is less than 24, the program advances to operation 444, during which the numerical entries subsequent to the dot are examined to determine if the number of minutes is less than 60. If either of operations 443 or 444 indicates that there was an incorrect entry because the number of entered hours was greater than 23 or the number of entered minutes was greater than 59, the program is advanced to prompting operation 442 during which display 23 provides the operator with a visual message that the time was incorrectly entered.

If operation 444 indicates that there was a minute entry less than 60, the program advances to operation 445, during which the numerical minute and hour entries are converted to complementary binary code by microprocessor 111 which responds to converting signals from PROMs 117, 118. The code is supplied to decoders 151 and 152, to drive display 23. Upon completion of operation 445, the clock, minute and hour counters in RAMs 121-124 are set; the values in these memories are displayed during operation 446. After operation 446, the set time function subroutine is exited.

Figure 6G:
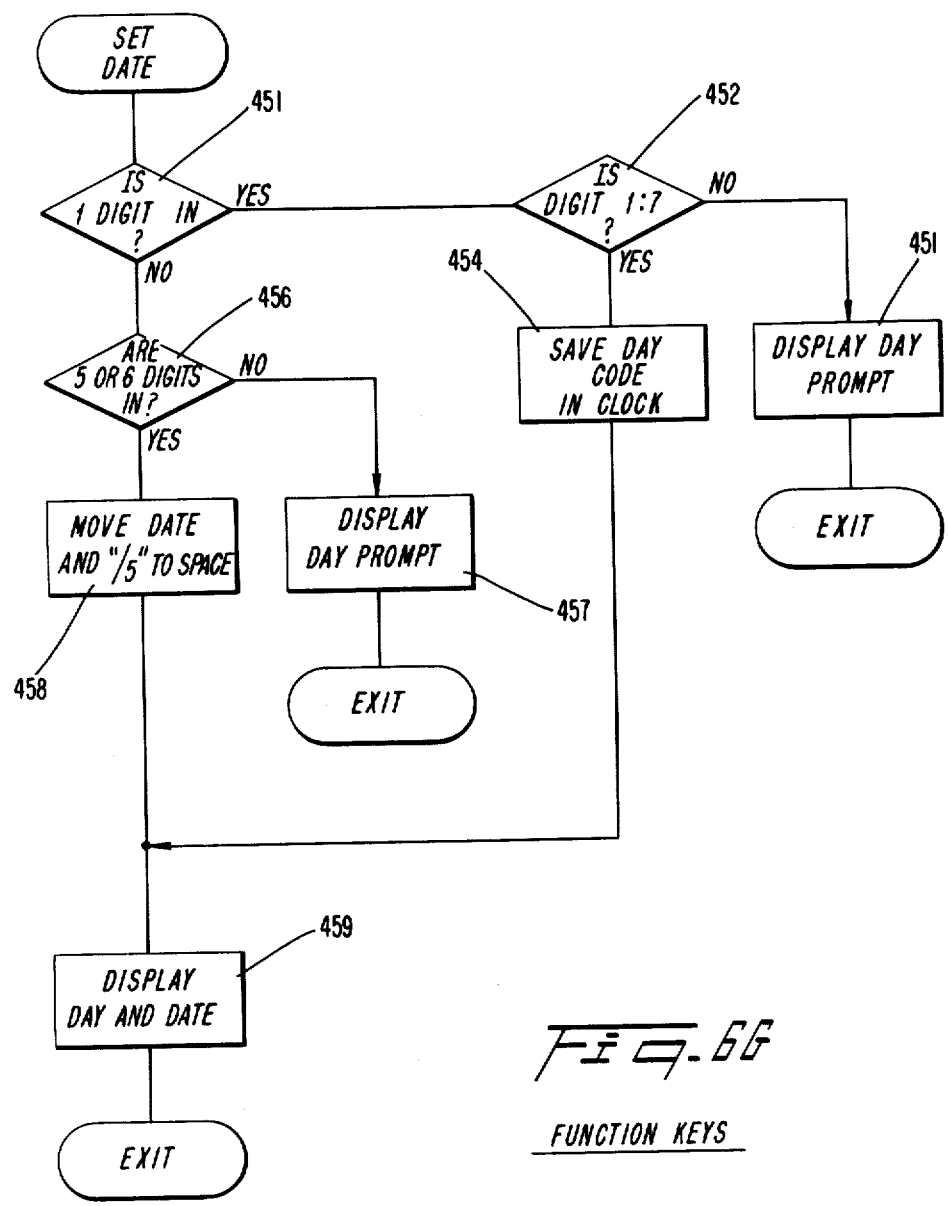
Figure 61:
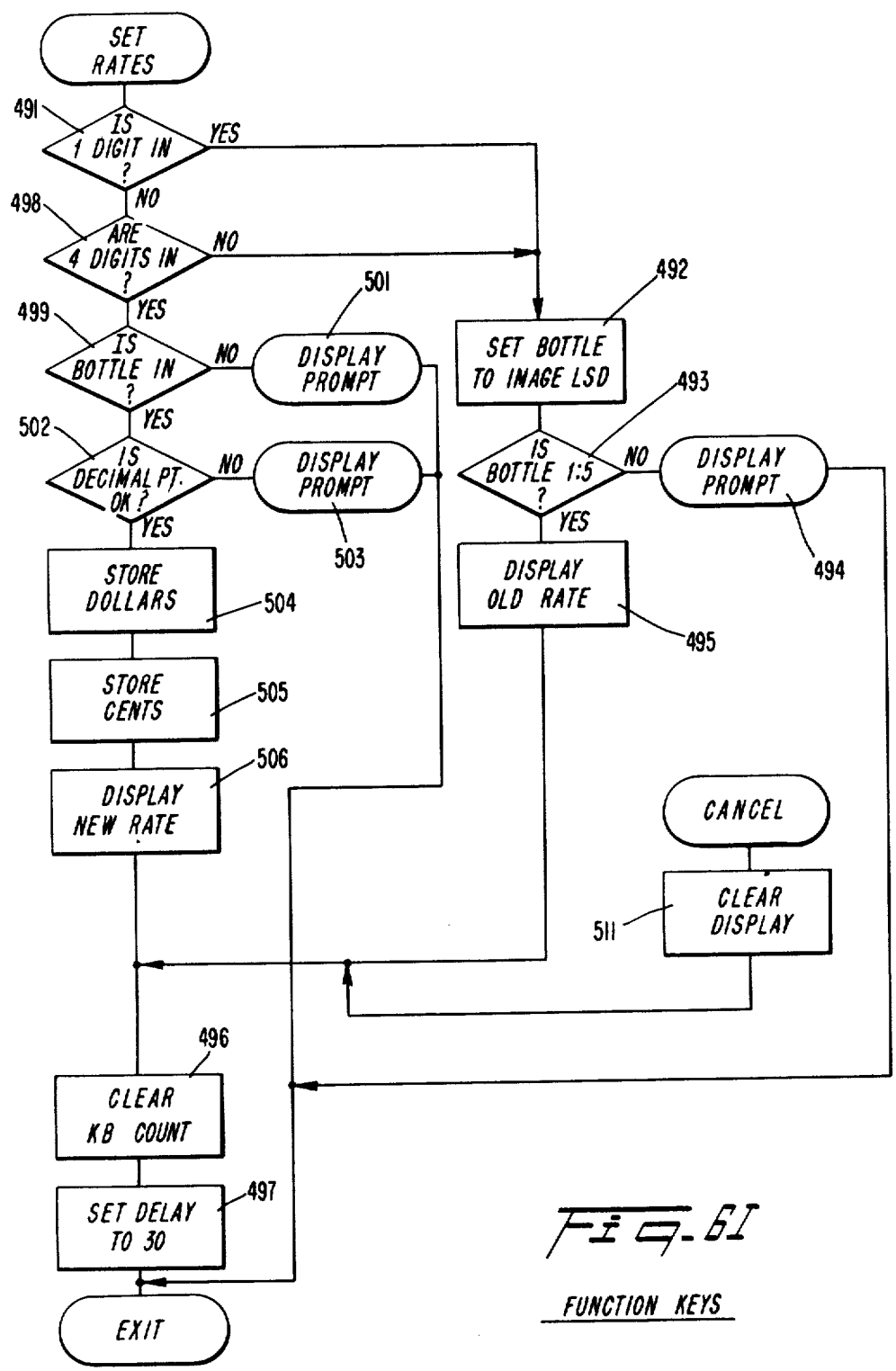

If set date function key 35 is activated, the subroutine indicated by the flowchart of FIG. 6G is performed. The first operation 451 in the set date subroutine involves determining whether only one digit, coded from 1 to 7 for the days Sunday through Saturday, has been entered by numerical keys 32 after date key 35 was activated. If operation 451 indicates that only one digit has been keyed, the program advances to operation 452, during which a determination is made as to whether the keyed single digit can represent a day of the week, i.e., has a value from 1 to 7. In response to operation 452 indicating that the initially keyed digit is 0, 8 or 9, the program is advanced to prompting display operation 453, during which signals are read from PROMs 117 and 118 to display 23, to inform the operator that he incorrectly entered the day of the week. The initially entered digit is then removed from RAMs 121-124 and the set date subroutine is exited. If, however, operation 452 indicates that one of the digits 1 to 7 has been entered, the entered value is translated into character representing signals for the day of the week, which signals are supplied, during operation 454, to designated addresses in RAMs 121-124. Operation 454 is followed by operation 349 during which the day of the week is displayed. After operation 349, the program is exited.

After the first digit key for the day of the week has been activated, the program advances from operation 451 to operation 455, during which a determination is made as to whether or not the operator correctly keyed 5 or 6 digits, to represent the day of the month, month, and year of the century. If the number of keyed digits has been other than 5 or 6, the operator has made a mistake, and the program advances to prompting operation 457, during which the display is activated to inform the operator that he incorrectly entered the new date; after operation 457, the set date subroutine is exited. If it has been determined that 5 or 6 digits have been correctly keyed by the operator, the program advances to operation 458, during which the entered date is entered into designated addresses of RAMs 121 and 124. After operation 458, the day of the month, month and year are fed to appropriate character locations in display 23 during operation 459. The display includes, from left to right, a three character indication of the day of the week, a two digit indication of the number of the month, a two digit indication of the day of the month, and a two digit indication of the year of the century; the numerical indications are spaced by dashes inserted by PROMs 117, 118.

To set legal hours during which beverages may be dispensed from units 14, the operator initially activates hours key 36 and then keys the day of the week as one of numeral keys 1-7. The operator then keys the legal starting time in hours (0-23) and minutes (00-59) for the day of the week. These operations are followed by the operator keying in the end of legal serving time in hours (0-23) and minutes (00-59), for the particular day of the week. These operations are performed for each of the seven days of the week, as required.

The legal hours subroutine, illustrated by the flow diagram of FIG. 6H, initially involves determining, during operation 451, whether only one digit, to represent the day of the week, has been keyed. If only one digit has been keyed, a flag is set in RAMs 121-124 and the numerical value associated with the day is stored in the RAMs, as indicated by operation 462. After operation 462 has been performed, the program is advanced to operation during which PROMs 117 and 118 feed signals to latches 151-153 to clear display 23. Then, during operation 464, the keyed day of the week is fed from the location in RAMs 121-124 to latches 151 and 152 and these characters are supplied to display 23 under the control of latched decoder 153. By the time operation 464 has been completed, numerous operating cycle times of data processor 22 have been completed, several legal hour keys have been activated, and the program has been executed several times so that it proceeds from operation 461 to operation 465.

During operation 465, a determination is made as to whether eight digits have been keyed within a 30 second time interval since the first digit was keyed for legal hours. Operation 465 involves determining whether 8 digits have been entered on keys 32 before the count in the recycle delay counter of RAMs 121-124 has returned to zero from its initially set value of 30. The recycle delay counter is decremented by a count of one each second. If the eight digit keys 32 are not activated within the 30 second interval, the legal hours subroutine is exited. If, however, eight digits were keyed within the 30 second interval, the program advances to operation 466, during which the address of RAMs 121-124 which was loaded during operation 462 is read to determine if the day for legal hours was entered. If the day was not entered, display 23 is supplied during operation 467 with prompting characters for the operator and the subroutine is exited after the legal hours entries have been removed from RAMs 121-124.

If the day is correctly entered, the program advances to operation 468, which involves determining whether or not the entered starting hour equals 99. An entered starting hour of 99 is a code indicating that the start and end of legal hours for the particular day are to be manually entered by activation of enable key 45 and an entry on keys 32 of the ending time; such manual entries are desirable for special days, e.g., election days. If the entered starting hour is 99, the program advances immediately to operation 469, during which 99 is entered into the station table addresses of RAMs 121-124 as the starting time and the keyed end time is stored in the station table. Of course, units 14 are not enabled in response to the starting hour of 99 because the hour counter never reaches such a value. Units 14 are disabled in response to the hour and minute counters reaching the end time set into the station table during operation 469.

If the starting hour is not 99, the program advances to operations 471-474 during which determinations are made as to correct entries of the legal hours, starting and ending hours and minutes. Operations 471-474 basically involve determining if the starting and ending hours are in the range from zero to 23 and if the starting minutes are in the range from zero to 59. Operations 471-474 are normally sequentially performed and involve the following interrogations: (1) are starting hours between zero and 23?; (2) are starting minutes between zero and 59?; (3) are ending hours between zero and 23?; and (4) are ending minutes between zero and 59?. If any of operations 471-474 indicates an incorrect keyboard entry, the program is advanced so prompt operations 475-478 are respectively performed to advise the operation of an incorrect keyboard entry; each of operations 475-478 is followed by erasing of the entries following activation of the day key and then exiting of the legal hours subroutine.

If all of the starting and ending entries of the legal hours subroutine are correctly made, the program proceeds from operation 474 to operation 469 during which the starting and ending hours and minutes are stored in the station table portion of RAMs 121-124. The values stored in the station table during operation 469 are compared once a minute with the values in the clock counters of RAMs 121-124 for the day of the week, hour and minute to determine if signals are to be sent from console 11 to units 14, to cause activation and deactivation of the units. In addition, the entered end of legal hours signal for each day is decremented by 15 minutes by the arithmetic unit of microprocessor 111 and the decremented value is stored in the station table. The decremented end of legal hours value is compared once a minute with the clock counters for the day of the week, hour and minute to determine if a signal is to be transmitted from console 11 to units 14 to activate last call visual indicator 111. After operation 469 has been completed, the program is advanced to operation 481, during which the keyboard counter in RAMs 121-124 is cleared. Thereafter, during operation 482, the recycle delay counter is set to 30; it is to be recalled that this counter is decremented once every second and is used to determine if eight digits have been entered within 30 seconds, as determined during operation 465. Upon completion of operation 482, the legal hour subroutine is exited.

Display of the entered legal starting and ending hours requires several one ms. program cycles and therefore is much slower than the determinations of whether the correct keys are activated, during operations 466 and 471-474. Therefore, the start and end times for legal hours are stored in the station table of RAMs 121-124, during operation 469, considerably before the day of the week is displayed during operation 464. By the time of the day of the week has been completely displayed during operation 464, the program has advanced to operation 483 during which the legal hours starting time is displayed by reading out the starting hour and minute stored in RAMs 121-124 during operation 469. After the start time has been displayed, the program advances to operation 484, during which the end time is displayed in hours and minutes. In response to activation of key 36 and the numeral keys for each day of the week and the start and end hours and minutes, display 23 is activated to display, from left to right, the day of the week as three characters, the starting time as two digit hour and two digit minute indications and the ending time as two digit hour and two digit minute indications; the starting and ending times are separated by the characters "TO", as read to the display from designated addresses of PROMs 117, 118 under the control of start time display operation 483.

Upon the completion of display and time operations 484, the program is advanced to clear keyboard count operation 485, during which the keyboard display counter is reset to zero. Then, during operation 486, the display recycle delay counter is set to 30, after which the set legal hours subroutine is exited.

The diagnostic procedure involves determining whether all character segments on display 23 are illuminated. Therefore, in response to the operator activating diagnostic key 48, addresses in PROMs 117 and 118 are read out during operation 487 to enable all segments of display 23 to be illuminated. After all of the segments have been illuminated for thirty seconds, as indicated by the display recycle delay counter, the program is advanced to clear the keyboard counter of RAMs 121-124, operation 485. Operation 485 is followed by setting the display recycle delay counter to 30, operation 486, the last operation in the diagnostic subroutine.

When the operator depresses rate key 37, the program is branched to the subroutine having the flow diagram illustrated in FIG. 6I. After activating key 37, the operator sets the rate for each of reservoirs 51-55 of all of units 14 by activating one of keys 32 for one of the numerals 1 to 5; the entered numeral key indicates the rate for the particular reservoir 51-55 that is to be entered. After the reservoir number is keyed, the price per drink for the reservoir is entered as a first digit for the dollar value, followed by activation of decimal point key 33 and then activation of two digit keys 32 for the number of cents to be charged for each dispensing action. Data processor 22 responds to these operations by storing the rate for each drink of each reservoir in the station table of RAMs 121-124 and activating display 23 so that for each reservoir there are displayed, from left to right, the characters "BOTTLE", the number of reservoir (1-5) as entered on keys 32, the rate for the reservoir, and the characters "EA". When a room occupant checks out, the operator activates room total key 41 and the occupied room number whereby the number of dispensed drinks for each bottle at the room is transmitted from unit 14 to console 11. The arithmetic unit of microprocessor 111 multiplies the stored rate for each reservoir and the number of dispensed drinks for each reservoir of the room being checked. The arithmetic unit of microprocessor 111 accumulates these products to enable display 23 to indicate the total amount the room occupant is to be charged for the dispensed drinks.

After the rate subroutine is initially entered, the first operation 491 determines if the bottle number and not the rate has been entered on keys 32. Operation 491 involves determining whether only one digit has been entered, with the assumption that if more than one digit was entered, the multiple digits are for the rate. In response to only one digit being entered, the program advances to operation 492, during which the first entered digit is stored in RAMs 121-124 as a pointer for the station table. The stored pointer is fed to display 23 to indicate the bottle number for which the rate is being set. A determination is then made, during operation 493, as to whether the first digit entered, and the selected bottle number, is in the range of 1 to 5. If operation 493 indicates that the selected bottle number was not within the range of 1 to 5, character representing signals are read, during operation 494, from PROMs 117 and 118 to display 23 to advise the operator that there was an incorrect bottle entry. If, however, the bottle number was in the range of 1 to 5, the program is stepped to operation 495, during which the old rate for the particular bottle is retrieved from RAMs 121-124 and fed to display 123.

Upon completion of operation 495, the program is advanced to operation 496, during which the keyboard entry counter of RAMs 121-124 is cleared to zero. Then, during operation 497, the character recycle delay counter is set to 30 seconds, which is followed by an exit of the set rate subroutine.

If the operator has activated more than one key during the preceding 30 second interval, the program is advanced from operation 491 to operation 498, during which a determination is made as to whether four digits were entered during the 30 second interval. If four digits have not been entered, the program proceeds to operation 492, described supra. If operation 489 indicates that four digits have been entered, the bottle number at the pointer address of RAMs 121-124 which has written into during operation 492 is compared in the arithmetic unit of microprocessor 111 with the values 1-5 to assure that a bottle entry number has been entered by the operator. If operation 499 indicates that the bottle number key was not struck, the program advances to prompt operation 501, which advises the operator to make an appropriate change in his keying procedure.

If operation 499 indicates that the bottle key is properly activated, the program advances to operation 502, at which time a determination is made as to whether the decimal point was properly inserted between the second and third digits, i.e., between the dollar digit and the most significant cents digit. The determination of operation 499 involves a comparison by microprocessor 111 of the fourth key activated after activation of rate key 23 with a signal stored in a designated address of PROMs 117, 118 for the code of dot key 33. If operation 502 indicates that dot key 33 was not correctly activated, the program advances to operation 503, during which the operator is prompted by display 23 that he incorrectly entered the rate; after operations 501 and 503, the key entries are erased and the set rate subroutine is exited. If the decimal point was properly inserted, the program proceeds from operation 502 to operations 504, 505 and 506, during which the keyed amount to the left of the decimal point is stored as the number of dollars for each dispensing operation for the particular bottle, and the value to the right of the decimal point is stored, as the number of cents for each drink. These values are stored in the station table of RAMs 121-124 at the address indicated by the bottle pointer, set during operation 492. After the dollar and cents values have been stored, they are displayed, during operation 506. After operation 506, the program is activated so that the keyboard counter is cleared and the keyboard recycle delay counter is set to 30, during operation 497.

In response to the operator activating the cancel or clear key 39, the program is advanced to operation 511, which commands display 23 to be cleared. Operation 511 is followed by operation 496, clearing of the keyboard counter, and operation 497 during which the recycle delay counter is set to 30.

To assign a particular one of units 14 to a given room, the operator activates assign key 47. He then inserts a four digit number with keys 32 to indicate the unit number, then dot or decimal point key 33 is activated; and then activates four keys for the room number. For each additional unit 14 assigned to a room with multiple units, the operator again activates assign key 47, a different entry for the unit number, and the same room number. If multiple units are assigned to a single room, the addresses of RAMs 121-124 where the room number for each unit are stored have a binary one in the most significant room number bit position. In response to the most significant bit of the room number having a binary one value, display 23 is activated to indicate multiple units in response to activation of room total key 41. Room numbers are stored in RAMs 121-124 as two, 8-bit hexi-decimal bytes; one byte indicates the floor number, while the other byte indicates the number on the floor of a particular room. To provide adequate storage space for the 8 bits of the number of floor bytes, the number of floors is limited to 79.

Figure 6J:
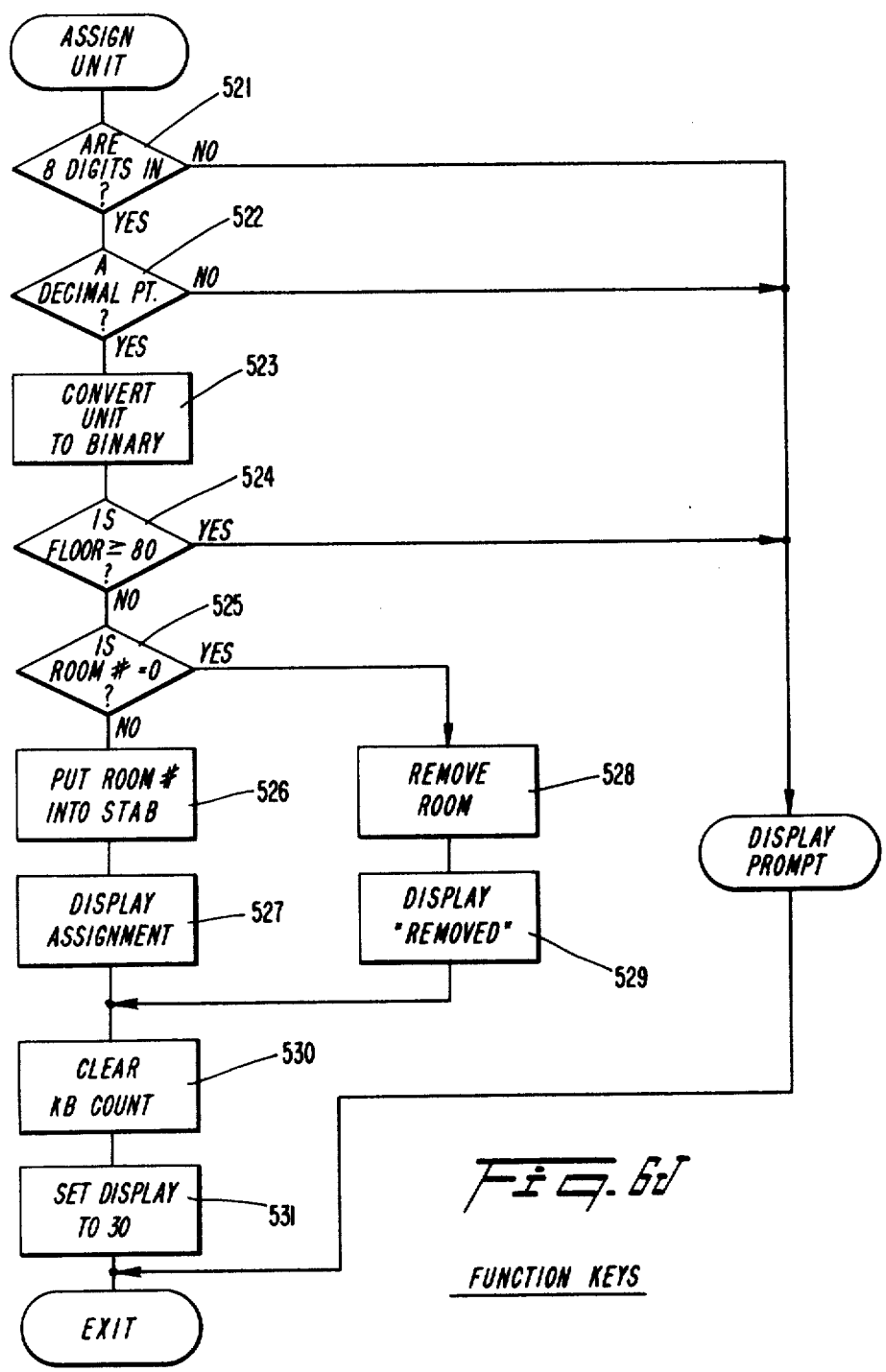

A flow diagram for the operations performed by data processor 24 in response to the operator activating assign key 47 and the eight numerical keys following activation of the assign key is illustrated in FIG. 6J. Initially, a determination is made, during operation of 521, as to whether eight digits were keyed in by the operator within a 30-second recycle character delay time. If eight digits were entered, the program advances to operation 522, during which a determination is made as to whether a decimal point was entered between the four digits for the unit number and the four digits for the room number. In response to operation 522 indicating that such a decimal point was entered, the program advances to operation 523, during which the entry for the unit number (the four first digits entered before the decimal point) are converted to a binary code. After conversion of the unit number to binary, the program advances to opration 524, during which a determination is made as to whether the two most significant digits (for the room floor number) after the decimal point have a value equal to or in excess of 80. If operation 524 indicates that the floor number is less than 80, the program advances to operation 525. If, however, any of operations 521, 522 or 524 indicates that eight digits were not entered, or that a decimal was not entered between the first four digits and the second four digits, or that the floor entered was equal to or less than 80, the program is advanced to operation 526, during which a message is supplied to display 23 to advise the operator to re-enter the unit and room numbers. After operation 526, the previously entered unit and room numbers are removed from RAMs 121-124 and the subroutine is exited.

During operation 525, a determination is made as to whether four zeros were entered for the room number. If four zeros were entered for the room number, the unit is no longer assigned to the particular room. If, however, the unit is being assigned to a particular room, the program advances to operation 526 upon completion of operation 525. During operation 526, the room number is loaded into the station table portion of RAMs 121-124 at a memory location that is correlated with the particular unit number. Upon completion of operation 526, the program advances to operation 527, during which the keyed room and unit numbers are displayed so that the operator can be sure that a correct assignment has been made. If, however, the unit is being removed from the room, so the operator activates the zero key four times after activation of the unit number and decimal point, the program advances to remove room operation 528. During operation 528, the station table is entered for the location of the particular unit and all zeros are inserted for the room number assignment. After operation 528, the program is advanced to operation 529, during which the unit number is displayed together with "REMOVED".

Upon completion of either operation 527 or operation 529, the program is advanced to operation 531, to clear keyboard counter operation 530, which is followed by the display recycle delay counter being set to thirty.

When it is desired to determine the total amount that has been spent for beverages at a particular room, the operator activates disable key 46 and the room number so that the mechanism in the room is deactivated and the room occupant cannot obtain additional beverages from the reservoirs. The room number is entered as a four digit number so that the first two significant digits indicate the floor and the last two digits represent the room on the floor; if the floor number is less than 10, a zero is entered as the first digit. After disable key 46 and the room number have been activated, room total key 41 and the room number are depressed.

Figure 6K:
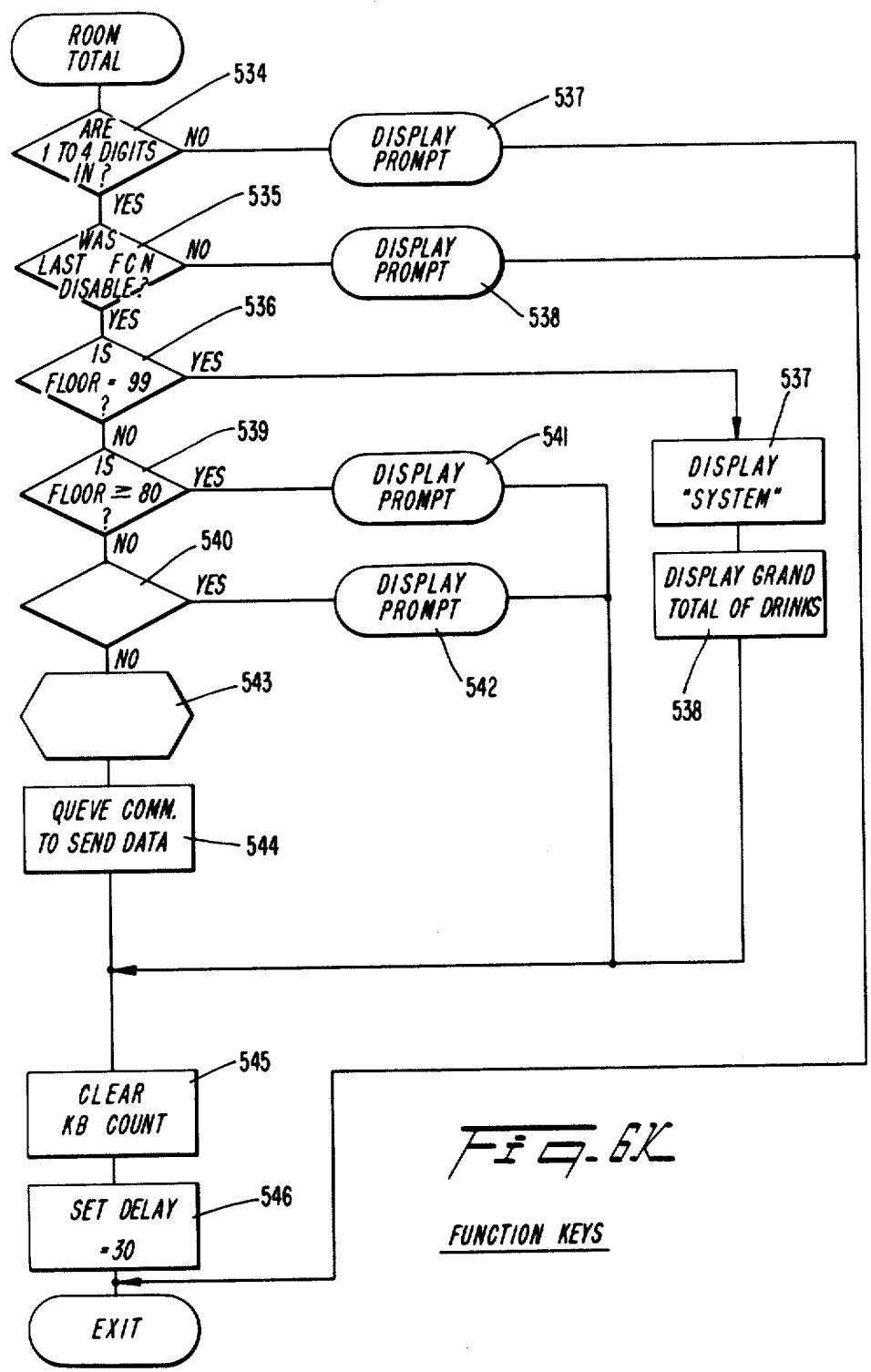

The operations performed at console 11 in response to activation of assign key 41 and some of the operations in response to activation of disable key 47, as well as the numerical keys for the room numbers are indicated in the flow diagram of FIG. 6K. After key 41 has been activated, a determination is made during operation 534, as to whether more than four digits are entered by the operator within the thirty second recycle display time. In response to fewer than four digits being entered, the program proceeds to operation 535, during which a suitable location in RAMs 121-124 is examined to determine whether the disable key 46 was the function key activated immediately before activation of key 41. In response to the previously entered function key being disable key 46, the program advances to operation 536. If, however, either of operations 534, 535 indicates that more than four digits were entered or that the last function key was not disable key 46, display 23 is activated during operations 537 and 538 to indicate that the incorrect number of digits was entered or that disable key 46 was not correctly activated. After either of operations 537 or 538, the entries are cleared and the subroutine exited.

Operation 536 involves determining whether the digit key for the numeral nine was pressed twice immediately after the room total key 41 was activated; if 99 was keyed, a "floor=99" flag is set to enable the total number of drinks dispensed by the system to be displayed during operation 538, which is preceded by operation 537, during which the characters "system" are supplied to display 23. Operation 538 is performed by interrogating a location in RAMs 121-124 where the total number of drinks from the rooms which have been disabled by key 46 are accumulated. The grand total of drinks displayed during operation 538 indicates only the drinks which have been charged and does not indicate the drinks which are dispensed from the rooms which are presently occupied and continuing in use. The primary purpose of displaying the grand total number of drinks is for information purposes, for example, relating to determining the charge of a user of the equipment to a supplier thereof.

If the operator did not enter floor 99, the program proceeds from operation 536 to operation 539, during which a determination is made as to whether the two most significant digits entered by the operator are less than 80. If the floor number was correctly entered as being less than 80, the program advances to operation 540, during which a determination is made as to whether the operator activated the zero key four times for the room number. If operation 539 or operation 540 indicates that the operator made an incorrect keyboard entry, with a floor number greater than 79 or a room temperature of zero, the program is advanced to operations 541 or 542, respectively, during which display 23 is activated to advise the operator of the nature of his mistake. Operations 541 and 542 are followed by clearing of the keyboard entries and then exiting of the subroutine.

If, however, the room and floor numbers were correctly entered, the program is advanced to operation 543, during which the station table of RAMs 121-124 is searched to locate the room number and correlate the room number with the unit number. After the unit number has been determined, the program proceeds to operation 544 and a signal is supplied to a queue in RAMs 121-124 that controls communications with the various units 14. When a communication link is established to the unit, the unit sends data back from the room where it is installed to designated locations in RAMs 121-124. In the RAMS, the number of drinks dispensed for each of the reservoirs at the unit is stored and multiplied in the arithmetic unit of microprocessor 111 with the price set for the particular type of reservoir. The resulting product for each reservoir of the particular unit 14 is supplied to an accumulator in the arithmetic unit of microprocessor 111 to provide an indication of the total amount of money to be charged to the room occupant for dispensing of beverages from reservoirs 51-55. If multiple units are in a particular room, each of the multiple units is addressed in sequence in response to the operator activating next key 43. The operator is advised to operate next key 43 because display 23 responds to the operator key inputs and the signals from the addressed station to display, from left to right, the room, the total cost of the dispensed beverages, as a three digit number for dollars, and a two digit number for cents. If there are units in the room which have not been processed, the character "+" appears to the right of the two cents digits in response to the most significant bit of the room number stored in the station table of RAMs 121-124 being a binary one.

These operations are described in greater detail in connection with FIG. 6Q. The signals read out during operation 544 indicating the number of drinks dispensed from reservoirs 51-55 are supplied to the counter in RAMs 121-124 which enables the grand total number of drinks to be determined during operation 538. Upon completion of operation 538 or operation 544, the program advances to clear keyboard counter operation 545, which is followed by setting the RAM delay recycle counter to thirty, during operation 546.

To determine which reservoirs are empty, the operator presses empties key 44 and the room number which is to be interrogated for empties or the nine keys twice or next key 43. In response to any of the sequences, there is displayed from left to right on display 23 the room number, the characters EMPTY, and the bottle number, as a one digit number from 1-5. If a room number is keyed after activation of empties key 44, that room number is displayed. If the nine key is activated twice, data processor 22 is activated so a sequential addressing of units 14 is begun to determine one of the units having an empty reservoir. If the nine key is activated twice or next key 43 is activated after empties key 44 has been activated, the displayed room number is the number of one of the rooms having empties. After the operator has written the displayed information into a ledger, he again presses next key 43 and another room number having empties is displayed. The operator continues to sequentially activate next key 43 in this manner until all of units 14 have been addressed and the room number for each unit having empties is displayed.

Figure 6L:
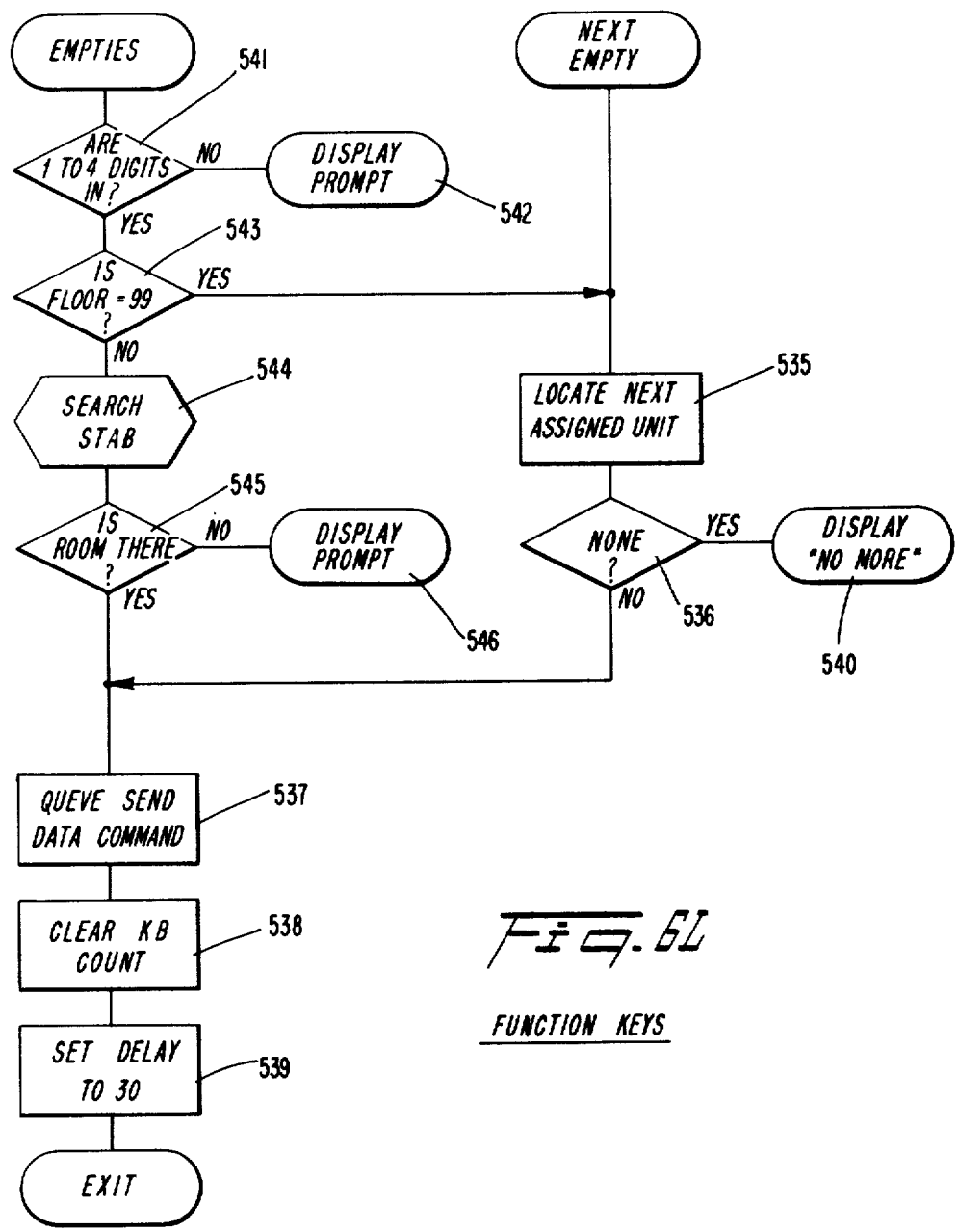

The program flow chart in response to activation of empties key 44 and next key 43 is illustrated in FIG. 6L. During the first operation 535 all of units 14 are sequentially addressed, and a determination is made as to whether any empties exist at the addressed unit. As indicated in connection with FIG. 5, each addressed unit, when it receives a signal requesting empties to be transmitted to console 11, derives a signal for the empty reservoir numbers. This number is stored in RAMs 121-124 and read out, with the number for the room, to display 23 each time next key 43 is activated. RAMs 121-124 are read out in this manner, in response to each activation of next key 43, until the data for all of units 14 having empties therein have been read out and displayed. Operation 536, after operation 535, determines if RAMs 121-124 store any additional empty indications. If no additional empty unit indications are stored in RAMs 121-124, the program advances to operation 540 during which designated addresses in PROMs 117, 118 cause display 23 to be supplied with the characters "NO MORE".

If all of the addressed units have not been interrogated for empties, operation 536 is followed by queue and data command operation 537, discussed in detail in connection with FIG. 6Q. Upon completion of queue and data command operation 537, the keyboard counter is cleared, during operation 538 and then, the display recycle delay counter is set to 30 during operation 539. Following operation 539 the next empty subroutine is exited.

When it is desired to determine whether empties exist at a particular room, the operator activates empties key 44 and the room number as a four digit number. During operation 541, a determination is made as to whether one to four keys have been entered within the last 30 seconds as indicated by the recycle delay counter. In response to no digits or more than four digits being entered within a thirty second delay recycle time, the program is advanced from operation 541 to operation 542, during which characters are displayed to advise the operator that he had an incorrect key entry. If the correct number of digits has been entered, a test is made during operation 543 to determine if the two most significant digits of the room number have a value of 99, which initiates the sequential addressing of units 14 and serves the same purpose as activating next key 43. If operation 43 determines that the two most significant digits were 99, the program is advanced to operation 535 and data for the first unit 14 having empty reservoirs are read out from RAMs 121-124 to display 23.

If operation 543 indicates that the two most significant room number digits are not 99, the station table of RAMs 121-124 is searched, i.e., sequentially scanned, during operation 545 so that the room numbers where units are in use are read out to the arithmetic unit of microprocessor 111. The arithmetic unit compares each of the room numbers supplied to it from the station table with the keyed room number during operation 545.

If searching and comparison operations 544 and 545 indicate that the keyed room does not have a unit therein, display 23 is activated during operation 546 by PROMs 117, 118 with characters to advise the operator with a visual indication of such a fact. If, however, the keyed room has been assigned a unit, an address signal is sent to the keyed room during queue and data command operation 537 and the addressed room sends a reply to console 11, which reply is supplied to display 23.

Consideration will now be given in greater detail to operations performed in response to activation of next key 43 by referring to the flow diagram of FIG. 6M. Activation of next key 43 is preceded by activation of either empties key 44 or room total key 41, in connection with a room having multiple units. As seen in FIG. 6M, the first operation 551 performed after activation of the next key is to determine if activation of empties key 44 was the previous command to data processor 22. If the last command was activation of empties key 44, the program is activated to operation 535, FIG. 6L, so that the next assigned unit number is located in the station table of RAMs 121-124.

If, however, operation 555 indicates that the last command was not activation of empties key 44, the program is advanced to operation 532, during which time a determination is made as to whether the last command was activation of room total key 41. If operation 552 indicates that the last command was activation of room total key 41, the program is stepped to operation 553, during which a determination is made by reading out the station table of RAMs 121-124 to determine if all of the multiple units in the room have been interrogated for the total amount therein. The operator is advised to press next key 43 because the display has a "+" sign after the two digit cent indication for the total for the previously addressed unit. During operation 553 the most significant bit in the room number is examined to determine if it has a binary 1 value, to indicate there are data for additional units in a room to be supplied to display 23. In response to either of operations 552 or 553 determining that the last command is not activation of room total key 41, or that there is not another unit in the system to be examined for the total, the program is advanced to operation 554, during which time display 23 is cleared. Operation 554 is followed by the keyboard counter of RAMs 121-124 being cleared during operation 555, in turn followed by setting the display recycle delay counter to a count of five seconds during operation 556. Upon completion of operation 556, the subroutine is exited.

If, however, operation 553 indicates that there is another unit to be considered in the room total, the program advances to operation 557, at which time the station table portion of RAMs 121-124 is searched to determine the number of the next unit to be interrogated for total purposes. During operation 555 this unit number is supplied to a communication gueue of RAMs 121-124 so that the unit can be addressed to respond in order to signals from console 11. Upon completion of operation 558, the keyboard counter is cleared during operation 559, which is followed by setting the recycle delay display counter to 30, operation 560. Upon completion of operation 560, the program is exited, to await the following depression of next key 43.

If speaker 27 is being activated in response to one of tamper switches 107 being closed, and operator believes that the tampering problem has been rectified, the operator activates alarm reset key 38. In response to alarm reset key 38 being activated, the program reaches step 562, FIG. 6M, during which the eight bits of the flag byte are retrieved from RAMs 121-124 and supplied to microprocessor 111 where the bit assigned to the tamper flag is changed to status so that it no longer indicates that the tamper flag has been set. After operation 562, the program advances to operation 563, during which the activating bit for speaker 27 is reset to command turn off of the speaker. Then, during operation 564 the system flag byte is returned from microprocessor 111 to the designated address for the byte in RAMs 121-124. Upon completion of operation 564, the program advances to clear display operation 554, clear keyboard counter operation 555, and to set the recycle display delay counter to 30, operation 556, which is followed by an exit.

After the operator has read the total amount to be charged to a checking out occupant of a room, he activates clear room total key 42 so that the totals stored in the station table of RAMs 121-124 for the unit(s) at the checked out room are erased. Activation of key 42 should be preceded by activation of room total key 41 and the keys for the four digit number of the room.

Figure 6N:
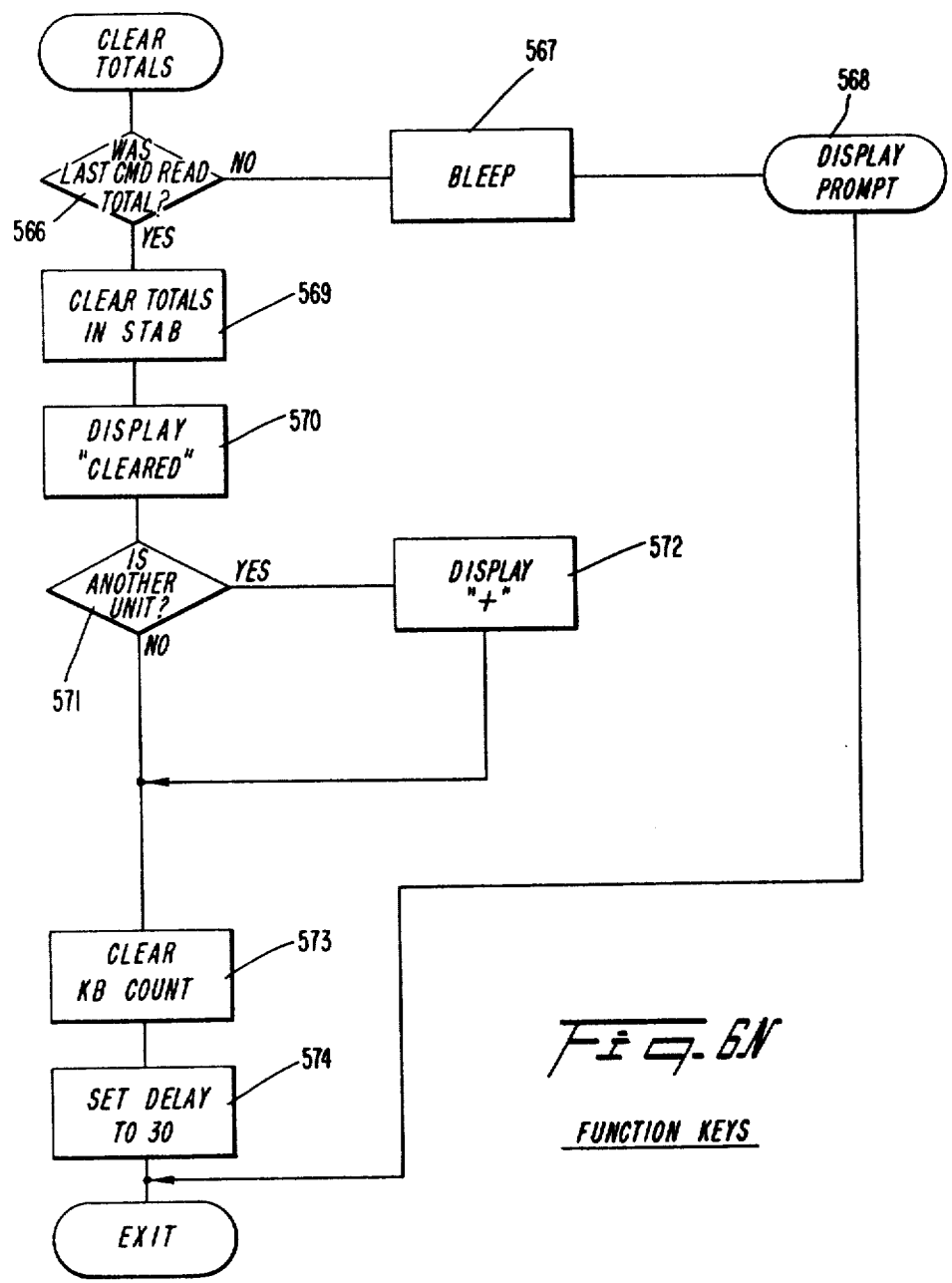

In response to activation of clear room total key 42, the program is energized so that the clear total subroutine of FIG. 6N is executed. The first operation 566 involved in the clear total subroutine is determining whether room total key 41 was the function key which was activated immediately prior to activation of clear room total key 42. If the last command was not in response to read total key 41, clear room total key 42 was erroneously energized because the room total should not be cleared unless the operator has determined the total amount spent by the room occupant, at the time of checkout. In response to operation 566 indicating that the last command was not a read total, a "BLEEP" flag is set during operation 567, whereby speaker 27 is activated and the operator is provided with an audio alarm that he has performed a serious error. After the audio alarm flag has been set, a visual display is activated during operation 568 to indicate that the clear total key was erroneously activated and that this key is only to be activated after the room total key has been activated. After operation 568, the signal stored in response to activation of key 42 is erased from RAMs 121-124 and the clear subroutine is then exited.

If, however, operation 566 indicates that the previous command was activation of room total key 41, the program is advanced to operation 569, during which the data stored in the station table of RAMs 121-124 for the unit read out in response to activation of room total key 41 is cleared. Upon completion of operation 569, the program is advanced to operation 570, during which the letters "CLEARED" are supplied to display 23 so that the operator is apprised of the fact that the data for the particular unit has been cleared. After operation 570, the program advances to operation 571, during which a determination is made as to whether there is another unit in the room being checked out. The determination of operation 571 is made by examining the most significant bit of the code indicating the room number. In response to another unit being in the room, display 23 is activated during operation 574 so that a "+" sign is displayed. The "+" indicates to the operator that he should press next key 43 so that the total of an added unit at the room being checked out can be processed as indicated supra in connection with FIG. 6M. If operation 571 indicates that there are no additional units in the room, or upon completion of operation 572, the program advances to clear keyboard counter operation 573, which is followed by operation 574, which involves setting the display recycle delay counter to 30; operation 574 is followed by exiting of the clear total subroutine.

In response to activation of able and disable keys 45 and 46, the operations illustrated by the flow diagram of FIG. 6P are performed. Activation of enable and disable keys 45 and 46 is followed by entry of the room number which is to be enabled or disabled. Therefore, the first operation 576 involved in the enable and disable subroutines involves determining if one to four digits have been entered within the 30 second interval of the recycle display delay counter. If operation 576 indicates that one to four digits were not timely entered, display 23 is activated so that the operator is advised that he is to re-enter the correct room number; after activation of the display the entries are cleared and the subroutine exited. If, however, operation 576 indicates that one to four digits were entered, the program advances to operation 577, during which a determination is made as to whether the two most significant digits, normally representing a floor number for the room being enabled or disabled, are 99. If the two most significant digits are both 9's and either enable or disable key 45 or 46 is activated, all of the units in the system are to be activated or deactivated. There are very infrequent activations of the nine key twice, as the two most significant digits, in combination with enable and disable keys 45 and 46. However, the feature of enabling and disabling the entire system automatically is inserted into the system because of the problems that would be associated with manual activation and deactivation of all of the system units.

If operation 577 indicates that 99 floor was entered, the program proceeds to operation 578, which determines from the station table, whether more units are in the system to be disabled. Operation 578 is never reached during an enabling operation because there are no active units in the station table prior to enabling of the system. If no more units 14 are in the system, display 23 is supplied with the characters DISABLED if key 46 is depressed. If, however, operation 578 determines that there are more units 14 in the station table, the next room unit 14 which has not been disabled is read from the station table during operation 579. After operation 579, the program proceeds to operation 580, during which the next unit in the station table is put in the queue command. Upon completion of queue command operation 580, during which the selected room number is put in a queue to be processed for communication purposes, the keyboard counter in RAMs 121-124 is cleared during operation 581, which is followed by setting the recycle display delay counter to 30, during operation 582, which is followed by an exiting of the enable or disable subroutine.

If operation 577 determines that the system is not to be enabled or disabled, the program is advanced to operation 583 during which a determination is made as to whether the two most significant key entries indicate a floor number equal to or greater than 80; floor 79 is the highest allowable floor number. In response to operation 583 indicating that the keyed floor is equal to or greater than 80, display 23 is activated so that the operator is advised that he has incorrectly entered the floor number. If the floor which has been keyed is less than 80, the program is advanced to operation 584, during which the room number is displayed together with the characters "ENABLED", in response to activation of key 45, or the room number is displayed together with the characters "DISABLED", in response to activation of key 46. Upon completion of operation 584, the program is advanced to queue command operation 580, during which the unit number for the keyed room number is entered into the queue for polling of units 14.

To call units 14 at the various rooms, data processor 22 is activated in accordance with the POLEM flow diagram illustrated in FIG. 6Q. Initially, a determination is made during operation 585 to determine if the last operation which was being performed by the data processor has been completed. If a last operation complete flag is not set, the subroutine immediately exits and polling cannot be conducted until the last operation has been completed. If the last operation has been completed, the program advances to operation 586, during which a last function command register of microprocessor 111 is interrogated to determine whether the last command ordered UART 161 to receive data from units 14, i.e., to command an addressed unit to send data. In response to operation 586 determining that send data from unit 14 was the last command function, the program is advanced to operation 587, during which time signals transmitted from the addressed unit 14 back to UART 161 and thence to the station table of RAMs 121-124 are sensed to determine if any of the five reservoirs 51-55 at the addressed unit have had any drinks dispensed from them. If operation 587 reveals that drinks have been served from the addressed unit 14, the program advances to operation 588, whereby a clear signal is supplied as a command byte for the communication polling queue to remove the addressed unit from the queue. Upon completion of operation 588, the program is advanced to operation 589, during which time the number of drinks which were received by data processor 22 from the addressed unit 14 is updated in the station table.

Upon completion of operation 589, or if operation 587 indicates that no drinks were served by the addressed unit 14, the program advances to operation 591, during which the tamper status flag is examined to determine if the unit 14 which sent a message to console 11 signalled that tampering occurred at the unit. In response to the tampering flag being set, the program proceeds to operation 592, at which time speaker 27 is activated to provide an audio alarm. Then operation 593 is performed whereby display 23 is supplied with a visual indication of tampering through the display of the characters "TAMPER". Upon completion of operation 593, the program is advanced to operation 594, during which a reset tamper message is sent from console 11 to the addressed unit 14.

If operation 586 indicates that the last command signal transmitted from console 11 to the addressed unit 14 is not a send data command or if operation 590 indicates that the sending unit 14 did not set the tamper flag, the program advances to operation 595, during which the signal indicating last activated function key of keyboard 23 is retrieved. Then, during operation 596, microprocessor 111 determines whether this function indication signal is the same as the previous keyboard function. If operation 596 indicates that the same function key was activated twice in a row, the function indicated by the function key is performed during operation 597. Upon completion of operation 597, the program is advanced to operation 598, during which the previously queued functions to be executed by data processor 22 are cleared.

If operation 596 indicates that the keyboard function which was retrieved during operation 595 is not the same as the most previously activated keyboard function, the program advances to operation 600, during which the next addressed unit to polled is selected, as stored in the communications queue. Upon completion of operation 600, the program advances to operation 601, during which time a determination is made as to whether there are any function indication signals in the function queue. If operation 601 indicates that there are queued functions, the program advances to operation 597 and the next function in the queue is initiated. If operation 601, however, indicates that there are no queued functions, the program advances to operation 602, during which the queue to control signalling to the units 14 is interrogated and the next unit in the queue is addressed. Upon completion of operation 602, the subroutine is exited.

The program described in connection with the flow diagram of FIG. 6 is written in detail in the INTEL 8080A assembly language in accompanying Appendix I.

While there has been described and illustrated one specific embodiment of the invention, it will be clear that variations in the details of the embodiment specifically illustrated and described may be made without departing from the true spirit and scope of the invention as defined in the appended claims.

```
                ;    CONSOLE OPERATING SYSTEM
                ;
                ;
                ;
                ;
                ;    INPUT PORTS
                ;
    0000        DATAI   EQU     0       ;UART DATA IN
    0010        SUART   EQU     10H     ;UART STATUS
    0020        KEYEN   EQU     20H     ;ENCODED KEY DATA
    0030        KEYFN   EQU     30H     ;KEYBOARD FCN KEYS
                ;
                ;
                ;    OUTPUT PORTS
                ;
    0000        UXMIT   EQU     0       ;UART DATA OUT
    0010        UCLR    EQU     10H     ;UART CLEAR
    0020        DISPU   EQU     20H     ;DISPLAY LATCHES A THRU H
    0030        DISPL   EQU     30H     ;DISPLAY LATCHES I THRU P
```

```
0040            CHRPS     EQU       40H           ;DISPLAY CHAR POSITION
0050            KBFLG     EQU       50H           ;CLEAR KEYBOARD FLAG
0060            TKOFF     EQU       60H           ;CLEAR TIKKER
0070            BLEPE     EQU       70H           ;AUDIBLE ALARM
                ;
                ;
                ;         WORKING STORAGE
                ;
                ;
2000            RAM       EQU       2000H
                ;
2000                      ORG       RAM           ;THE BASE
                ;
2000            GRTOT:    DS        5             ;4 SYSTOTAL DRINKS & 1 LRC
                ;
2005            SYS:      DS        1             ;SYSTEM-STATUS AS FOLLOWS:
                                                  ; 00 = POWER ON
                                                  ; BIT 01 - HAVE TIME
                                                  ; BIT 02 - HAVE DAY-OF-WEEK
                                                  ; BIT 04
                                                  ; BIT 08 - TAMPER START
                                                  ; BIT 10 - TAMPER BEEPER
                                                  ; BIT 20 - COMM TROUBLE
                                                  ; BIT 40
                                                  ; BIT 80 - SYSTEM ENABLED
2006            KBQUE:    DS        12

2012            MONTH:    DS        1
2013            DAY:      DS        1
2014            YEAR:     DS        1

2015            HOUR:     DS        1
2016            MIN:      DS        1
2017            SEC:      DS        1
2018            QTRS:     DS        1
2019            MS:       DS        1
                                                  ;NEXT CLOCK MUST FOLLOW IMMEDIATELY
201A            LSEC:     DS        1             ;CURRENT SECOND
201B            LMIN:     DS        1             ;CURRENT MINUTE
201C            DOW:      DS        1             ;DAY OF WEEK (1-7)
201D            DAYSK:    DS        1             ;DAY AS SCHEDULED
                ;
201E            DAYCD:    DS        1
201F            HTABL:    DS        28            ;LEGAL-HOURS TABLE
                ;
203B            FCNS:     DS        1
                ;
203C            KFLAG:    DS        1             ;KEYBOARD FLAGS
203D            SFLAG:    DS        1             ;STATION-ACCESS FLAGS
203E            TFLAG:    DS        1             ;TIMER FLAGS
203F            DCNT:     DS        1             ;DISPLAY TIMER
                ;
2040            TADR:     DS        1             ;TEMP STATION ADDRESS
2041            STADR:    DS        1             ;REAL STATION ADDRESS
2042            ROOM:     DS        2             ;ROOM NUMBER (FLOOR & ROOM)

2044            RATBL:    DS        2             ;DRINK RATE - DDCC (BCD)
                ;
2046            TM:       DS        16            ;TIME DISPLAY
2056            SM:       DS        16            ;STATUS DISPLAY
2066            DM:       DS        16            ;DAY/DATE DISPLAY
2076                      DS        16            ;BARTENDER DISPLAY

2086            STAT:     DS        1
2087            FUNC:     DS        1             ;CURRENT COMM FUNCTION CONTROLLER
2088            ADDR:     DS        1             ;CURRENT COMM ADDRESS CONTROLLER
2089            FUNQ1:    DS        2             ;COMM FUNCTION QUEUE
208B                      DS        2
208D                      DS        2
208F                      DS        2
2091                      DS        2
2093                      DS        2             ;YOU KNEW THERE WOULD BE SIX
```

```
209E        PCS:    DS      1       ;MUST PRECEDE IMAGE
2096        IMAGE:  DS      16
20A6        CHAR:   DS      1       ;MUST FOLLOW IMAGE
            ;
20A7        Q1:     DS      3       ;TIMED-TASK QUEUE
20AA                DS      3
20AD                DS      3
20B0                DS      3
            ;
            ;       COMMUNICATIONS STORAGE
            ;
20B3        FLAG:   DS      1                       ;00 => IDLE
                                            ;01 => XMIT
                                            ;02 => SYNC SEARCH
                                            ;04 => RECEIVE
20B4                DS      3       ;XMIT COUNT, TWO SYNCS
20B7        TADDR:  DS      1               ;ADDRESS
20B8        TCOMM:  DS      1               ;COMMAND
20B9                DS      1       ;LONGITUDINAL REDUNDANCY CHEQUE
20BA        RCVCT:  DS      3       ;RCV COUNT, TWO SYNCS
20BD        RADDR:  DS      1               ;RCV ADDRESS
20BE        RSTAT:  DS      1               ;STATUS
20BF        RBOT1:  DS      1               ;COUNT OF SERVINGS FROM BOTTLE #

20C0                DS      1                       ;#2
20C1                DS      1
20C2                DS      1
20C3                DS      1
20C4                DS      4       ;LRC
20C8        CTO:    DS      1               ;COMMON TIME OUT COUNTER
20C9        RTRY:   DS      1               ;RETRY COUNT - THIS TRANSMISSION
            ;
008C        TIMOT   EQU     140     ;MILLISECONDS BEFORE WE GIVE UP
                                    ;ON RECEPTION
            ;
            ;
20CA        ANSWR:  DS      5       ;THIS SPACE FOR ROOM TOTAL CALCULATION
            ;
2100                ORG     RAM+256 ;THE REST IS BIG TABLE

2100        STAB:   DS      1280    ;STATION TABLE (5 X 256)
                                    ;THE STAB TABLE IS COMPOSED OF
                                    ;256 ENTRIES OF 5 BYTES EACH:
                                    ;
                                    ; NN NN SS DD DD
                                    ;N IS THE ROOM NUMBER (BCD)
                                    ;S IS THE UNIT STATUS (SEE BELOW)
                                    ;D IS THE DRINK COUNT (HEX)

;BITS IN THE STATUS BYTE:
0080        DIS     EQU     80H     ;MANUAL DISABLE FLAG
0040        ALARM   EQU     40H     ;TAMPERED - NOT ALARMED
0020        NOR     EQU     20H     ;NO RESPONSE - DO NOT POLL
            ;
            ;       END OF DECLS
```

```
0000                    ORG     0
0000 F3                 DI
0001 310021             LXI     SP,RAM+256      ;AT TOP OF SCRATCHPAD
0004 210007             LXI     H,0700H
0007 220620             SHLD    KBQUE           ;SET KB QUEUE
000A 2600               MVI     H,0
000C 220820             SHLD    KBQUE+2
000F AF                 XRA     A
0010 32B320             ST      FLAG            ;ENSURE NO COMM ACTIVITY
0013 D310               OUT     UCLR            ;CLEAR UART
0015 D350               OUT     KBFLG           ;CLEAR KEYBOARD DATA FLAG
0017 D360               OUT     TKOFF           ;CLEAR TIKKER
0019 DB00               IN      DATAI           ;CLEAR DATA BUFFERS
001B DB00               IN      DATAI
001D D370               OUT     BLEPE           ;SING
001F FB                 EI
0020 C33F04             JMP     APPI            ;TO REAL PROGRAM
0023 10153C    CLPAR:   DB      10H,15H,60      ;CLOCK INITIAL VALUES
0026 04FA               DB      4,250
0028 3C15               DB      60,15H

0030                    ORG     30H             ;RESTART 6

0030 C5                 PUSH    B
0031 D5                 PUSH    D
0032 E5                 PUS     H
0033 C35000             JMP     DSPEM           ;TO DISPLAY CANNED MESSAGE

;        INTERRUPT SERVICE

0038                    ORG     38H

0038 F5                 PUSH    PSW
0039 C5                 PUSH    B
003A D5                 PUSH    D
003B E5                 PUS     H
003C D360               OUT     TKOFF           ;TURN OFF TIKKER
003E CD7200             CALL    CLOCK           ;31 CLOCKS
0041 CDDC00             CAL     KEYS            ;84 CLOCKS
0044 CD2401             CAL     DISPY           ;169 CLOCKS
0047 CD5402             CAL     COMMS           ;32 CLOCKS
004A E1                 POP     H
004B D1                 POP     D
004C C1                 POP     B
004D F1                 POP     PSW
004E FB                 EI
004F C9                 RET

;RESTART 6 PROCESSING - CANNED MESSAGE DISPLAY
               DSPEM:
0050 21FA02             LXI     H,MSGS          ;START OF MESSAGES
0053 111000             LXI     D,16
0056 3C                 INR     A               ;A HAS MESSAGE INDEX
               DSP1:
0057 3D                 DCR     A
0058 CA5F00             JZ      DSP2
005B 19                 DAD     D
005C C35700             JMP     DSP1
               DSP2:
005F CD0E02             CALL    DSPLA
0062 E1                 POP     H
0063 D1                 POP     D
0064 C1                 POP     B
0065 C9                 RET 0066 31283130 MONTB:    DB      31H,28H,31H,30H ;DAYS-IN-A-MONTH
006A 31303131           DB      31H,30H,31H,31H
006E 30313031           DB      30H,31H,30H,31H
```

```
        CLOCK:
0072 211920         LXI     H,MS      ;POINT TO CLOCK COUNTERS
0075 35             DCR     M
0076 C0             RNZ
0077 36FA           MVI     M,250     ;MILLISECONDS
0079 2B             DCX     H
007A 35             DCR     M
007B C0             RNZ
007C 3604           MVI     M,4       ;QUARTER SECONDS
007E 2B             DCX     H
007F 35             DCR     M
0080 C0             RNZ
0081 363C           MVI     M,60      ;SECONDS
0083 2B             DCX     H
0084 7E             MOV     A,M
0085 B7             ORA     A
0086 3C             INR     A
0087 27             DAA
0088 77             MOV     M,A
0089 FE60           CPI     60H
008B C0             RNZ
008C 3600           MVI     M,0
008E 2B             DCX     H
008F 7E             MOV     A,M
0090 3C             INR     A
0091 27             DAA
0092 77             MOV     M,A
0093 FE24           CPI     24H
0095 C0             RNZ
0096 3600           MVI     M,0
0098 3A1C20         LDA     DOW       ;UP DAY-OF-WEEK
009B 3C             INR     A
009C FE08           CPI     8
009E DAA300         JC      CL1
00A1 3E01           MVI     A,1       ;HAPPY SUNDAY
        CL1:
00A3 321C20         STA     DOW
00A6 2B             DCX     H
00A7 2B             DCX     H         ;BACK UP TO DAY
00A8 7E             MOV     A,M
00A9 B7             ORA     A
00AA 3C             INR     A
00AB 27             DAA
00AC 77             MOV     M,A
00AD 2B             DCX     H         ;TO MONTH
00AE 7E             MOV     A,M
00AF 5F             MOV     E,A
00B0 FE10           CPI     10H
00B2 DABA00         JC      CLOK1
00B5 E602           ANI     2
00B7 C60A           ADI     10
00B9 5F             MOV     E,A
        CLOK1:
00BA 1D             DCR     E
00BB 1600           MVI     D,0
00BD 216600         LXI     H,MONTB
00C0 19             DAD     D
00C1 77             MOV     M,A       ;PULL MONTH LIMIT FROM TABLE
00C2 211320         LXI     H,DAY
00C5 BE             CMP     M
00C6 D0             RNC
00C7 3601           MVI     M,1
00C9 2B             DCX     H
00CA 7E             MOV     A,M       ;PULL MONTH
00CB B7             ORA     A
00CC 3C             INR     A
00CD 27             DAA
00CE 77             MOV     M,A
00CF FE13           CPI     13H
00D1 D8             RC
```

```
00D2 3601              MVI     M,1        ;HAPPY NEW YEAR
00D4 23                INX     H
00D5 23                INX     H
00D6 7E                MOV     A,M
00D7 B7                ORA     A
00D8 3C                INR     A
00D9 27                DAA
00DA 77                MOV     M,A
00DB C9                RET
              KEYS:
00DC DB20              IN      KEYEN      ;READ ENCODED KEYS
00DE B7                ORA     A          ;ARE THERE ANY?
00DF F2F000            JP      NOENK
00E2 D350              OUT     KBFLG      ;YES => CLEAR KEYBOARD FLAG
00E4 E63F              ANI     63
00E6 FE33              CPI     33H        ;TEST FOR STRANGE KEY
00E8 C2ED00            JNZ     KEYSX
00EB 3E1A              MVI     A,1AH
00ED CD4D01   KEYSX:   CALL    KQLOD      ;QUEUE KEY
00F0 213B20   NOENK:   LXI     H,FCNS     ;GET FUNCTION KEY MASK
00F3 46                MOV     B,M
00F4 DB30              IN      KEYFN      ;READ FUNCTION KEYS
00F6 E60F              ANI     0FH        ;MASK OFF UNDEFINED JUNK
00F8 77                MOV     M,A
00F9 2F                CMA                ;REVERSE NEGATIVE LOGIC
00FA A0                ANA     B          ;MASK OFF UNINTERESTING KEYS
00FB C8                RZ                 ;NO FUNCTION KEYS
00FC 0F                RRC
00FD D20701            JNC     KFCN2      ;IS FCN KEY #1 NEW?
0100 47                MOV     B,A
0101 3E16              MVI     A,16H      ;FCN #1
0103 CD4D01            CALL    KQLOD
0106 78                MOV     A,B
0107 0F       KFCN2:   RRC
0108 D21201            JNC     KFCN3      ;IS FCN #2 NEW?
010B 47                MOV     B,A
010C 3E17              MVI     A,17H      ;FCN #2
010E CD4D01            CALL    KQLOD
0111 78                MOV     A,B
0112 0F       KFCN3:   RRC
0113 D21D01            JNC     KFCN4      ;IS FCN #3 NEW?
0116 47                MOV     B,A
0117 3E18              MVI     A,18H      ;FCN #3
0119 CD4D01            CALL    KQLOD
011C 78                MOV     A,B
011D 0F       KFCN4:   RRC
011E D0                RNC                ;IS FCN #4 NEW?
011F 3E19              MVI     A,19H      ;FCN #4
0121 C34D01            JMP     KQLOD      ;RETURN FROM THERE
0124 219520   DISPY:   LXI     H,POS      ;GET NEXT POSITION
0127 7E                MOV     A,M
0128 57                MOV     D,A
0129 4F                MOV     C,A        ;SAVE IT
012A 3C                INR     A
012B E60F              ANI     0FH        ;BUMP MODULO 16
012D 77                MOV     M,A
012E 23                INX     H
012F 0600              MVI     B,0
0131 09                DAD     B
0132 4E                MOV     C,M        ;GET NEXT DISPLAY CHAR
0133 219E01            LXI     H,DISTB    ;BASE OF DISPLAY TABLE
0136 09                DAD     B          ;TWICE FOR 2-BYTE TABLE
0137 09                DAD     B
0138 7A                MOV     A,D        ;GET POSITION BACK
0139 D340              OUT     CHRPS      ;NOW O.K. TO OUT IT
013B 7E                MOV     A,M        ;GET MSBYTE OF REFRESH BITS
013C D320              OUT     DISPU      ;DISPLAY THEM
013E 23                INX     H
013F 7E                MOV     A,M        ;LSBYTE
0140 D330              OU      DISPL
0142 C9                RET
```

```
                    ;PUT A INTO KBQUE
0143 201B   TRTAB:  DB      20H,1BH   ;FOR TRANSLATING TROUBLESOME KEYS
0145 231C           DB      23H,1CH
0147 271D           DB      27H,1DH
0149 2A1E           DB      2AH,1EH
014B 2F1F           DB      2FH,1FH
            KQLOD:
014D FE20           CPI     20H       ;VALUE LESS THAN 20H?
014F DA6001         JC      KQL3      ;IF SO, NO NEED TO XLATE
0152 214301         LXI     H,TRTAB
            KQL1:
0155 BE             CMP     M         ;DOES CHAR MATCH 1ST OF PAIR?
0156 CA5E01         JZ      KQL2      ;IF SO, GO LOAD 2ND
0159 23             INX     H         ;IF NOT, BUMP TO NEXT
015A 23             INX     H
015B C35501         JMP     KQL1
            KQL2:
015E 23             IN      H
015F 7E             MOV     A,M       ;SUBSTITUTE FROM TABLE
            KQL3:
0160 210620         LXI     H,KBQUE   ;BASE
0163 34             INR     M         ;BUMP COUNT
0164 56             MOV     D,M       ;GET NEW COUNT
0165 23             INX     H         ;POINT TO SIZE MASK
0166 4F             MOV     C,A       ;SAVE KEY
0167 7E             MOV     A,M
0168 BA             CMP     D
0169 DA7801         JC      KQFUL     ;IF NOT FULL, CONTINUE
016C 23             INX     H
016D 23             INX     H         ;POINT TO NEXT
016E 5E             MOV     E,M
016F 34             INR     M         ;BUMP NEXT
0170 A6             ANA     M         ;WRAP IT AROUND
0171 77             MOV     M,A
0172 1600   KBQ:    MVI     D,0
0174 23             INX     H         ;TO BASE OF Q
0175 19             DAD     D         ;DISPLACEMENT
0176 71             MOV     M,C
0177 C9             RET
0178 2B     KQFUL:  DCX     H
0179 35             DCR     M         ;UNDO INCREMENT
017A 23             INX     H
017B 23             INX     H
017C 23             INX     H         ;POINT TH NEXT
017D 4E             MOV     C,M
017E 0D             DCR     C         ;DECREMENT YOUNGEST
017F A1             ANA     C         ;WRAP IT AROUND
0180 5F             MOV     E,A
0181 0EFF           MVI     C,255     ;SMEAR INDICATOR
0183 C37201         JMP     KBQ
                    ;GET ELDEST KEY IB KBQUE
                    ;   Z = 1  => EMPTY
0186 210620 KBQUN:  LXI     H,KBQUE
0189 7E             MOV     A,M
018A A7             AN      A
018B C8             RZ                ;ZERO => EMPTY
018C 35             DCR     M         ;ELSE DEBUMP COUNT
018D 23             INX     H
018E 46             MOV     B,M       ;GET SIZE MASK
018F 23             INX     H
0190 7E             MOV     A,M       ;GET ELDEST
0191 4F             MOV     C,A
0192 3C             INR     A         ;INCREMENT ELDEST
0193 A0             ANA     B         ;WRAP IT AROUND
0194 77             MOV     M,A
0195 23             INX     H
0196 23             INX     H
0197 0600           MVI     B,0
0199 09             DAD     B
019A F6FF           ORI     255       ;RESET Z
019C 7E             MOV     A,M       ;GET BYTE
019D C9             RET
```

```
               ;       DISPLAY TABLE
               ;                 PORT    PORT    CHAR       GRAPHIC
               ;                 DISPU   DISPL   NUMBER
019E  DABA     DISTB:     DB     0DAH,0BAH       ;0         0
01A0  0404                DB     4,4             ;1         1
01A2  4B1B                DB     4BH,1BH         ;2         2
01A4  C233                DB     0C2H,33H        ;3         3
01A6  0585                DB     5,85H           ;4         4
01A8  43B3                DB     43H,0B3H        ;5         5
01AA  4BA1                DB     4BH,0A1H        ;6         6
01AC  9012                DB     90H,12H         ;7         7
01AE  4BBB                DB     4BH,0BBH        ;8         8
01B0  41BB                DB     41H,0BBH        ;9         9
01B2  1600                DB     16H,0           ;A         DECIMAL POINT
01B4  8000                DB     80H,0           ;B         ACCENT
01B6  0101                DB     1,1             ;C         --
01B8  47B7                DB     47H,0B7H        ;D         $
01BA  A001                DB     0A0H,1          ;E         ->
01BC  0113                DB     1,13H           ;F         ==
01BE  049B                DB     4,9BH           ;10        ?
01C0  09BB                DB     9,0BBH          ;11        A
01C2  463F                DB     46H,3FH         ;12        B
01C4  4A92                DB     4AH,92H         ;13        C
01C6  463E                DB     46H,3EH         ;14        D
01C8  4B92                DB     4BH,92H         ;15        E
01CA  0992                DB     9,92H           ;16        F
01CC  4AB3                DB     4AH,0B3H        ;17        G
01CE  09A9                DB     9,0A9H          ;18        H
01D0  4616                DB     46H,16H         ;19        I
01D2  0E16                DB     0EH,16H         ;1A        J
01D4  A980                DB     0A9H,80H        ;1B        K
01D6  4A80                DB     4AH,80H         ;1C        L
01D8  88E8                DB     88H,0E8H        ;1D        M
01DA  28E8                DB     28H,0E8H        ;1E        N
01DC  4ABA                DB     4AH,0BAH        ;1F        O
01DE  099B                DB     9,9BH           ;20        P
01E0  6ABA                DB     6AH,0BAH        ;21        Q
01E2  299B                DB     29H,9BH         ;22        R
01E4  43B3                DB     43H,0B3H        ;23        S
01E6  0416                DB     4,16H           ;24        T
01E8  4AA8                DB     4AH,0A8H        ;25        U
01EA  9880                DB     98H,80H         ;26        V
01EC  38A8                DB     38H,0A8H        ;27        W
01EE  B040                DB     0B0H,40H        ;28        X
01F0  8440                DB     84H,40H         ;29        Y
01F2  D212                DB     0D2H,12H        ;2A        Z
01F4  FFFF                DB     0FFH,0FFH       ;2B        SMEAR
01F6  7200                DB     72H,00          ;2C        TRIANGLE
01F8  0000                DB     0,0             ;2D        SPACE
01FA  0505                DB     5,5             ;2E        +
01FC  9000                DB     90H,0           ;2F        /
               LEFT:                             ;DISPLAY 8 BYTES FROM HL ON LEFT
01FE  119620              LXI    D,IMAGE
0201  0E08                MVI    C,8
0203  C31302              JMP    MOVIT
               RIGHT:                            ;DISPLAY 8 BYTES FROM HL ON RIGHT
0206  119E20              LXI    D,IMAGE+8
0209  0E08                MVI    C,8
020B  C31302              JMP    MOVIT
               DSPLA:                            ;DISPLAY 16 BYTES FROM HL
020E  119620              LXI    D,IMAGE
0211  0E10                MVI    C,16
               MOVIT:
0213  C5                  PUSH   B
               MOVLP:                            ;MOVES C BYTES FROM HL TO DE
0214  7E                  MOV    A,M
0215  12                  STAX   D
0216  23                  INX    H
0217  13                  INX    D
0218  0D                  DCR    C
0219  C21402              JNZ    MOVLP
021C  C1                  PO     B
```

```
021D C9              RET
                ;    XMT SET UP TO SEND COMMAND IN TCOMM TO STATION
                ;    IN TADDR. FLAG WILL BE ZERO WHEN RESPONSE IS
                ;    RECEIVED.
021E F3         XMIT:  DI
021F 3E0A              MVI    A,10
0221 32C920            STA    RTRY      ;CLEAR RETRY COUNTER
0224 CD2902            CALL   XMITR
0227 FB                EI
0228 C9                RET
0229 21C920     XMITR: LXI    H,RTRY    ;REENTRANCE FOR RETRIES
022C 34                INR    M
022D CA4702            JZ     XFAIL
0230 21B320            LXI    H,FLAG
0233 3601              MVI    M,1       ;SET FLAG TO XMIT
0235 23                INX    H
0236 3600              MVI    M,0       ;SET COUNT TO ZERO
0238 23                INX    H
0239 3616              MVI    M,16H     ;FIRST SYNC
023B 23                INX    H
023C 3616              MVI    M,16H
023E 23                INX    H
023F 7E                MOV    A,M       ;GET ADDRESS
0240 23                INX    H
0241 AE                XRA    M         ;CALCULATE LRC
0242 23                INX    H
0243 77                MOV    M,A
0244 D310              OUT    UCLR      ;CLEAR UART
0246 C9                RET
0247 AF         XFAIL: XRA    A
0248 32B320            STA    FLAG
024B 3A0520            LDA    SYS
024E F620              ORI    20H
0250 320520            STA    SYS
0253 C9                RET
0254 21B320     COMMS: LXI    H,FLAG    ;COMMUNICATIONS SERVICE
                                        ;00 => IDLE
                                        ;01 => XMIT
                                        ;02 => SYNCH SEARCH
                                        ;04 => RCV
0257 7E                MOV    A,M
0258 B7                ORA    A         ;QUICK OUT IF IDLE
0259 C8                RZ
025A FE02              CPI    2
025C CAD702            JZ     SSYNC
025F D28B02            JNC    RCV
0262 DB10              IN     SUART     ;READ UART STATUS
0264 47                MOV    B,A       ;SAVE STATUS
0265 07                RLC
0266 D26D02            JNC    COMXX
0269 DB00              IN     DATAI     ;DATA IN WHERE NONE SHOULD BE
026B 78                MOV    A,B
026C 07                RLC
026D 07         COMXX: RLC
026E D0                RNC              ;NO BUFFER EMPTY => DON'T
026F 23                INX    H
0270 34                INR    M         ;BUMP COUNT
0271 4E                MOV    C,M       ;GET COUNT
0272 0600              MVI    B,0
0274 09                DAD    B         ;SELECT NEXT BYTE
0275 7E                MOV    A,M
0276 D300              OUT    UXMIT     ;TRANSMIT BYTE
0278 79                MOV    A,C
0279 FE05              CPI    5         ;IS ENTIRE MESSAGE SENT?
027B C0                RNZ
027C 21B320     CSSET: LXI    H,FLAG
027F 3602              MVI    M,2       ;SET FLAG TO SYNC SEARCH
0281 3E8C              MVI    A,TIMOT
0283 32C820            STA    CTO
0286 AF                XRA    A
0287 32BA20            STA    RCVCT
028A C9                RET
```

```
028B DB10      RCV:    IN      SUART   ;READ STATU
028D B7                ORA     A
028E F2CF02            JP      RTIME   ;NO DATA => TEST TIMEOUT
0291 57                MOV     D,A     ;SAVE STATUS
0292 3E8C              MV      A,TIMOT
0294 32C820            STA     CTO     ;RESTORE TIMEOUT FOR NEXT CHAR
0297 21BA20            LXI     E,RCVCT ;POINT TO COUNT
029A 34                INR     M       ;BUMP COUNT
029B 4E                MOV     C,M
029C 0600              MV      B,0
029E 09                DAD     B       ;SELECT NEXT BYTE
029F DB00              IN      DATAI
02A1 77                MOV     M,A     ;PUT BYTE INTO MESSAGE SPACE
02A2 3AB820            LD      TCOMM   ;GET COMMAND
02A5 FE41              CPI     41H     ;TEST FOR LENGTH OF REPLY
02A7 CAC502            JZ      RCV10
02AA DACA02            JC      RCV13
02AD 3E05              MVI     A,5     ;LENGTH OF NORMAL MESSAGES
02AF 47        RCVCM:  MOV     B,A
02B0 B9                CMP     C       ;IS MESSAGE ALL IN?
02B1 C0                RNZ             ;RETURN IF NOT
02B2 05                DCR     B       ;COUNT 1ST BYTE
02B3 21BB20            LXI     H,RCVCT+1 ;POINT TO 1ST SYNC
02B6 7E                MOV     A,M
02B7 23        RCVLP:  INX     H       ;POINT TO NEXT BYTE
02B8 AE                XRA     M
02B9 05                DCR     B
02BA C2B702            JNZ     RCVLP
02BD B7                ORA     A
02BE C22902            JN      XMITR   ;BAD LRC => RETRY
02C1 32B320            STA     FLAG    ;ELSE CLEAR FLAG
02C4 C9                RET
02C5 3E0A      RCV10:  MVI     A,10
02C7 C3AF02            JMP     RCVCM
02CA 3E0D      RCV13:  MVI     A,13
02CC C3AF02            JMP     RCVCM
02CF 21C820    RTIME:  LX      H,CTO
02D2 35                DCR     M
02D3 C0                RNZ             ;NO TIMEOUT => RETURN
02D4 C32902            JMP     XMITR   ;ELSE RETRY
02D7 DB10      SSYNC:  IN      SUART   ;READ STATUS
02D9 B7                ORA     A
02DA F2CF02            JP      RTIME   ;CHAR NOT IN => TEST FOR TIMEOUT
02DD DB00              IN      DATAI   ;READ CHAR
02DF FE17              CPI     17H     ;IS IT PROPER SYNC?
02E1 C27C02            JNZ     CSSET   ;NO => SET UP ALL OVER
02E4 21C820            LX      H,CTO
02E7 368C              MVI     M,TIMOT ;RESET TIMEOUT COUNT
02E9 21BA20            LXI     H,RCVCT
02EC 34                INR     M       ;BUMP COUNT
02ED 4E                MOV     C,M     ;COUNT
02EE 0600              MV      B,0
02F0 09                DAD     B       ;CALCULATE ADDRESS
02F1 77                MOV     M,A     ;PUT SYNC AWAY
02F2 0D                DCR     C
02F3 C8                RZ              ;RETURN IF THAT WAS 1ST SYNC
02F4 3E04              MVI     A,4
02F6 32B320            STA     FLAG    ;SET FLAG TO RCV
02F9 C9                RET
                ;END OF CONOS
                ;
                MSGS:                  ;CANNED MESSAGES FOR RESTART 6
                ;
02FA 2D201F27          DB      45,32,31,39     ;0 " POWER   FAILURE "
02FE 15222D2D          DB      21,34,45,45
0302 1611191C          DB      22,17,25,28
0306 2522152D          DB      37,34,21,45
                ;
030A 2D191E19          DB      45,25,30,25     ;1 " INITIALIZATION "
030E 2419111C          DB      36,25,17,28
0312 192A1124          DB      25,42,17,36
0316 191F1E0D          DB      25,31,30,45
```

```
031A 151E2415         DB    21,30,36,21    ;2 "ENTER TIME  HHMM"
031E 222D24 9         DB    34,45,36,25
0322 1D152D D         DB    29,21,45,45
0326 18181D1D         DB    24,24,29,29
     ;
032A 2315242D         DB    35,21,36,45    ;3 "SET DATE  MMDDYY"
032E 14112415         DB    20,17,36,21
0332 2D2D1D1D         DB    45,45,29,29
0336 14142929         DB    20,20,41,41
     ;
033A 1411292D         DB    20,17,41,45    ;4 "DAY OF WEEK  1-7"
033E 1F162D27         DB    31,22,45,39
0342 15151B2D         DB    21,21,27,45
0346 2D010C07         DB    45,01,12,07
     ;
034A 151E2415         DB    21,30,36,21    ;5 "ENTER ROOM  NNNN"
034E 222D221F         DB    34,45,34,31
0352 1F1D2D D         DB    31,29,45,45
0356 22222222         DB    34,34,34,34
     ;
035A 181F25 2         DB    24,31,37,34    ;6 "HOURS - HHMMHHMM"
035E 232D0C D         DB    35,45,12,45
0362 18181D1D         DB    24,24,29,29
0366 18181D1D         DB    24,24,29,29
     ;
036A 251E1924         DB    37,30,25,36    ;7 "UNIT+RM UUU.RRRR"
036E 2E221D2D         DB    46,34,29,45
0372 2525250A         DB    37,37,37,10
0376 22222222         DB    34,34,34,34
     ;
037A 2D2E2D 2         DB    45,46,45,34    ;8 "  + RESTRICTED +  "
037E 15232422         DB    21,35,36,34
0382 19132415         DB    25,19,36,21
0386 142D2E2D         DB    20,45,46,45
     ;
038A 151E2415         DB    21,30,36,21    ;9 "ENTER PRICE D.CC"
038E 222D2022         DB    34,45,32,34
0392 191315 D         DB    25,19,21,45
0396 140A1313         DB    20,10,19,19
     ;
                                           ;*******
     ;
039A 2D232923 ENMSG:  DB    45,35,41,35    ;11 " SYSTEM ENABLED "
039E 24151D2D         DB    36,21,29,45
03A2 151E11 2         DB    21,30,17,18
03A6 1C1514 D         DB    28,21,20,45
     ;
03AA 23292324 DSMSG:  DB    35,41,35,36    ;12 "SYSTEM DISABLED"
03AE 151D2D2D         DB    21,29,45,45
03B2 14192311         DB    20,25,35,17
03B6 121C1514         DB    18,28,21,20
     ;
03BA 2D2D2D1C LCMSG:  DB    45,45,45,28    ; "   LAST CALL   "
03BE 1123242D         DB    17,35,36,45
03C2 2D13111C         DB    45,19,17,28
03C6 1C2D2D D         DB    28,45,45,45
            SMSGS:                         ;INITIAL MESSAGES
03CA 24191D15         DB    36,25,29,21    ;"TIME      :   M"
03CE 2D2D2D2D         DB    45,45,45,45
03D2 2D2D2D2D         DB    45,45,45,45
03D6 2C2D2D1D         DB    44,45,45,29
     ;
03DA 2D2D2D2D         DB    45,45,45,45    ;"              "
03DE 2D2D2D2D         DB    45,45,45,45
03E2 2D2D2D2D         DB    45,45,45,45
03E6 2D2D2D2D         DB    45,45,45,45
     ;
03EA 1411292D         DB    20,17,41,45    ;"DAY    00/00/00"
03EE 2D2D2D2D         DB    45,45,45,45
```

```
03F2 00002F00           DB      00,00,47,00
03F6 002F0000           DB      00,47,00,00
                  ;
03FA 2E2E2D 2           DB      46,46,45,18     ;"++ BAR-TENDER  ++"
03FE 11220C24           DB      17,34,12,36
0402 151E1415           DB      21,30,20,21
0406 222D2E2E           DB      34,45,46,46
040A 2D131C15   CLRMS:  DB      45,19,28,21     ;" CLEARED"
040E 11221514           DB      17,34,21,20
0412 2D2D2D2D   RATEM:  DB      45,45,45,45     ;"    RATE"
0416 22112415           DB      34,17,36,21
041A 2D1E1F2D   NOUNI:  DB      45,30,31,45     ;" NO UNIT"
041E 251E1924           DB      37,30,25,36
0422 2D24111D   TAMSG:  DB      45,36,17,29     ;" TAMPER "
0426 2015222D           DB      32,21,34,45
042A 23251E     DAYTB:  DB      35,37,30        ;SUN
042D 1D1F1E             DB      29,31,30        ;MON
0430 242515             DB      36,37,21        ;TUE
0433 271514             DB      39,21,20        ;WED
0436 241825             DB      36,24,37        ;THU
0439 162219             DB      22,34,25        ;FRI
043C 231124             DB      35,17,36        ;SAT
043C 231124       ;
                  APPL:                         ;MAINLINE START - INITIALIZATION
                                                ;1ST THING IS CHECK SYSTEM GRAND TOTAL
                                                ;IF IT IS FRAPPED, THEN ALL ELSE OF
                                                ;VALUE IS LOST, AND WE MUST INITIALIZE
                                                ;WHOLE SYSTEM.
043F CD040D             CALL    CHKGR
0442 BE                 CMP     M               ;DOES CHECKSUM AGREE?
0443 C24B04             JNZ     FIRUP           ;NO, INITIALIZE SYSTEM
0446 AF                 XRA     A
0447 F7                 RST     6               ;DISP POWER FAIL
0448 C38604             JMP     FIR2            ;AND ONLY DO A LITTLE INITIALIZATION
                  FIRUP:                        ;START FROM SCRATCH
044B 210020             LXI     H,RAM
044E 01C800             LXI     B,200
0451 CD170D             CALL    SPRED           ;CLEAR SCRATCHPAD
0454 010000             LXI     B,0
0457 3E05               MVI     A,5
0459 210021             LXI     H,STAB          ;NOW CLEAR STAB
                  FIRLP:
045C CD170D             CALL    SPRED           ;ZERO ALL OF SCRATCHPAD
045F 3D                 DCR     A
0460 C25C04             JNZ     FIRLP
0463 21CA03             LXI     H,SMSGS
0466 114620             LXI     D,TM
0469 0E40               MVI     C,64
046B CD1302             CALL    MOVIT           ;INITIALIZE TM
046E 3E07               MVI     A,7
0470 320720             STA     KBQUE+1
0473 212300             LXI     H,CLPAR
0476 111520             LXI     D,HOUR
0479 0E07               MVI     C,7
047B CD1302             CALL    MOVIT           ;CLOCK INITIAL VALUES
047E 3E01               MV      A,1
0480 F7                 RST     6               ;DISP INITIALIZATION
0481 3EFF               MVI     A,0FFH
0483 320420             STA     GRTOT+4
                  FIR2:
0486 218720             LXI     H,FUNC
0489 010E00             LXI     B,14
048C CD170D             CALL    SPRED           ;CLEAR COMM FUNCTION QUEUE
048F CD1E0C             CALL    CLR30
0492 3E10               MVI     A,10H
0494 320520             STA     SYS
0497 CD8D06             CALL    START           ;START COMM TO UNITS
0497 CD8D06       ;
                  MAIN:                         ;MAINLINE LOOP - ALL HAPPENS FROM HERE
049A CDA904             CALL    TIMIT           ;TIMER UPDATES & TIMED TASKS
049D CD8105             CALL    POLEM           ;CHECK POLLING STATUS
04A0 CD8601             CALL    KBQUN           ;TEST FOR KEYS
```

```
04A3 C42A05          CNZ    KBWRK    ;IF KBQUN FOUND WORK
04A6 C39A04          JMP    MAIN     ;PLAY IT AGAIN
              TIMIT:                 ;TIMER TESTS & INITIATES
              ;THIS ROUTINE HAS FOLLOWING RESPONSIBILITIES:
              ;         1. KEEPING TIME AND DATE DISPLAYS UP TO DATE
              ;         2. CHANGING DISPLAY AFTER DCNT EXPIRATION
              ;         3. UPDATING DAILY TASK QUEUE
              ;         4. INITIATING ANY TIME-ORIENTED TASKS
04A9 3A1720          LDA    SEC      ;GET CURRENT SECOND
04AC 211A20          LXI    H,LSEC
04AF BE              CMP    M        ;HAS SECOND CHANGED SINCE LAST
04B0 C8              RZ              ;NO - EARLY OUT
04B1 77              MOV    M,A      ;UPDATE LSEC
04B2 3A0520          LDA    SYS
04B5 E610            ANI    10H      ;TEST BLEEPER FLAG
04B7 CAC004          JZ     TIM1
04BA D370            OUT    BLEPE
04BC 213F20          LXI    H,DCNT   ;FOOL OURSELF
04BF 34              INR    M
              TIM1:
04C0 3A1620          LDA    MIN      ;GET CURRENT MINUTE
04C3 211B20          LXI    H,LMIN
04C6 BE              CMP    M        ;IN NEW MINUTE?
04C7 CAD104          JZ     NEWMS
04CA 77              MOV    M,A      ;YES - UPDATE
04CB CDC60D          CALL   DAYUP    ;TO UPDATE DAY-OF-WEEK
04CE CDF60D          CALL   TYMUP    ;UPDATE TIME DISPLAY
              NEWMS:
04D1 213F20          LXI    H,DCNT
04D4 35              DCR    M        ;DOWN DISPLAY DELAY COUNT
04D5 C0              RNZ             ;OUT IF NOT DONE
04D6 3605            MVI    M,5      ;IF DONE, SET FOR 5 SECS
04D8 AF              XRA    A
04D9 323C20          STA    KFLAG    ;CANCEL KEY ACTIVITY
04DC 210520          LXI    H,SYS
04DF 7E              MOV    A,M      ;TEST SYSTEM FLAG
04E0 E608            ANI    8        ;ERROR PENDING?
04E2 CA1705          JZ     NEWM
04E5 2F              CMA
04E6 A6              ANA    M        ;CLEAR PENDING
04E7 F610            ORI    10H      ;AND SET ALARM
04E9 77              MOV    M,A
              FALARM:                ;FIND THE ALARM
04EA 210221          LXI    H,STAB+2
04ED 110700          LXI    D,7
04F0 0E00            MVI    C,0
              FAL1:
04F2 7E              MOV    A,M
04F3 E640            ANI    ALARM
04F5 C20005          JNZ    FAL2
04F8 19              DAD    D
04F9 0C              INR    C
04FA C2F204          JNZ    FAL1
04FD C30F09          JMP    RESET
              FAL2:
0500 2F              CMA
0501 A6              ANA    M        ;RESET ALARM BIT
0502 77              MOV    M,A
0503 2B              DCX    H
0504 56              MOV    D,M
0505 2B              DCX    H
0506 5E              MOV    E,M
0507 EB              XCHG
0508 224220          SHLD   ROOM     ;STORE FOR DISPLAY ROUT.
050B CD710D          CALL   RMNUM
050E 212204          LXI    H,TAMSG
0511 CD0602          CALL   RIGHT
0514 C3220C          JMP    SET30
              NEWM:
0517 213E20          LXI    H,TFLAG
051A 7E              MOV    A,M      ;GET MESSAGE #
051B C610            ADI    16       ;BUMPIT
```

```
051D E630            ANI     30H        ;WRAPAROUND
051F 77              MOV     M,A
0520 5F              MOV     E,A        ;MAKE INDEX
0521 1600            MVI     D,0
0523 214620          LXI     H,TM
0526 19              DAD     D
0527 C30E02          JMP     DSPLA      ;RET IN DSPLA WILL GET US BACK
             KBWRK:                     ;KEYS HANDLED HERE
052A 32A620          STA     CHAR
052D FE0B            CPI     0BH        ;NUMERIC?
052F D25105          JNC     KB4        ;NO, GO HANDLE FUNCTIONS
0532 213C20          LXI     H,KFLAG
0535 7E              MOV     A,M        ;MUST LOOK AT PRIOR STUFF
0536 B7              ORA     A          ;WAS KB ACTIVE?
0537 CA4105          JZ      KB2        ;IF NO, CLEAR
053A FE11            CPI     11H        ;WAS LAST FUNCTION OR NUMERIC?
053C DA4705          JC      KB3        ;NUMERIC
053F 3600            MVI     M,0        ;FUNCTION, START COUNT
             KB2:
0541 CD110D          CALL    CLEAR      ;AND CLEAR DISPLAY
0544 213C20          LXI     H,KFLAG
             KB3:
0547 34              INR     M          ;NUMERIC, INC COUNT
0548 219720          LXI     H,IMAGE+1
054B CD0E02          CALL    DSPLA      ;SHIFT KEY ONTO SCREEN
054E C3220C          JMP     SET30
             KB4:                       ;HANDLE FUNCTION KEYS
0551 D611            SUI     11H        ;FUNCTIONS START AT 11H
0553 5F              MOV     E,A
0554 1600            MVI     D,0        ;SET UP INDEX
0556 216305          LXI     H,KTABL
0559 19              DAD     D
055A 19              DAD     D          ;APPLY INDEX
055B 3A3C20          LDA     KFLAG      ;PRE-LOAD
055E 5E              MOV     E,M
055F 23              INX     H
0560 56              MOV     D,M
0561 EB              XCHG
0562 E9              PCHL               ;MAKE IT MARCH
0563 4807    KTABL:  DW      FTIME      ;11
0565 9707            DW      FDATE      ;12
0567 0908            DW      HOURS      ;13
0569 BB08            DW      HAPPY      ;14
056B BE08            DW      RATES      ;15
056D 1609            DW      CANCL      ;16
056F 250A            DW      DIAG       ;17
0571 2309            DW      TOTAL      ;18
0573 330A            DW      ASSYN      ;19
0575 8D0A            DW      EMPTY      ;1A
0577 EA04            DW      FALARM     ;1B
0579 130B            DW      FNEXT      ;1C
057B 2E0B            DW      CLTOT      ;1D
057D 5F0B            DW      ENAB       ;1E
057F C40B            DW      DISAB      ;1F
             POLEM:                     ;COMMS SPAKE HERE
0581 3AB320          LDA     FLAG
0584 B7              ORA     A          ;IS COMM RUNNING?
0585 C0              RNZ                ;YES, COME BACK WHEN HE DONE
0586 21B820          LXI     H,TCOMM
0589 7E              MOV     A,M
058A 3600            MVI     M,0
058C 47              MOV     B,A
058D B7              ORA     A          ;ZERO'ED OUT?
058E CA8D06          JZ      START      ;YEP, CRANK IN A NEW ONE
0591 3A0520          LDA     SYS
0594 E620            ANI     20H        ;TEST SYS-TAMPER
0596 C22907          JNZ     SYTAM
0599 78              MOV     A,B
059A FE41            CPI     41H        ;WAS THIS A "SEND DATA"?
059C C2E005          JNZ     DONXT
059F 21BE20          LXI     H,RSTAT
05A2 7E              MOV     A,M
05A3 328620          STA     STAT       ;SAVE STATUS BYTE
```

```
05A6 23                INX   H          ;POINT TO BOTTLES
05A7 7E                MOV   A,M        ;FIND OUT IF ANY DRINKS SERVED
05A8 23                INX   H
05A9 B6                ORA   M
05AA 23                INX   H
05AB B6                ORA   M
05AC 23                INX   H
05AD B6                ORA   M
05AE 23                INX   H
05AF B6                ORA   M
05B0 CABE05            JZ    SD1        ;SKIP UPDATE IF NO SERVINGS
05B3 CD440C            CALL  UPDAT
05B6 3E42              MVI   A,42H
05B8 32B820            STA   TCOMM
05BB CD1E02            CALL  XMIT       ;START CLEAR OPERATION
            SD1:
05BE 3A8620            LDA   STAT       ;GET STATUS BYTE
05C1 E640              ANI   40H        ;TEST FOR TAMPER
05C3 CAE005            JZ    DONXT      ;ALL'SWELL
                                        ;TAMPERED ROOM UNIT
05C6 3AB720            LDA   TADDR
05C9 0608              MVI   B,08
05CB CD280C            CALL  QUIT       ;QUEUE UP A TAMPER RESET
05CE CD0A0F            CALL  ADCNV      ;FIND IN STAB
05D1 23                INX   H
05D2 23                INX   H
05D3 7E                MOV   A,M        ;PULL STATUS BYTE
05D4 F640              ORI   ALARM      ;SET ROOM ALARM
05D6 F680              ORI   DIS        ;SET DISABLED
05D8 77                MOV   M,A
05D9 210520            LXI   H,SYS
05DC 7E                MOV   A,M
05DD F608              ORI   08         ;SET ALARM START
05DF 77                MOV   M,A
            DONXT:                      ;WRAP UP WHAT WE JUST DID AND/OR
                                        ;START NEXT PART OF IT
05E0 3AB320            LDA   FLAG       ;1ST CHECK
05E3 B7                ORA   A          ;TO ENSURE NO ACTIVITY
05E4 C0                RNZ
05E5 3A8720            LDA   FUNC       ;GET ACTIVE FUNCTION CODE
05E8 4F                MOV   C,A
05E9 0600              MVI   B,0
05EB 21F505            LXI   H,DOTAB
05EE 09                DAD   B          ;INDEX
05EF 09                DAD   B
05F0 5E                MOV   E,M
05F1 23                INX   H
05F2 56                MOV   D,M
05F3 EB                XCHG
05F4 E9                PCHL
            DOTAB:
05F5 0706              DW    CONPL      ;00 = CONTINUOUS POLL
05F7 2806              DW    WAKUP      ;01 = ENABLE,SET LEGAL - ALL
05F9 5006              DW    SLEEP      ;02 = DISABLE,RESET LEGAL,LC - ALL
05FB 6A06              DW    SETLC      ;03 = SET LAST CALL ALL
05FD 8406              DW    TOTL       ;04 = READ TOTALS & REPORT
05FF C80A              DW    MPT        ;05 = READ EMPTIES & REPORT
0601 8D06              DW    START      ;06 = ENABLE 1 UNIT
0603 8D06              DW    START      ;07 = DISABLE 1 UNIT
0605 8D06              DW    START      ;08 = RESET TAMPER
            CONPL:                      ;CONTINUOUS POLL
0607 3A8920            LDA   FUNQ1      ;SEE IF SPECIAL REQUEST
060A B7                ORA   A
060B C28D06            JNZ   START      ;YEP, PLAY IT
060E 3AB720            LDA   TADDR      ;NO, GET LAST UNIT WE TALKED TO
0611 CD210F            CALL  NXTRM      ;AND GET NEXT AVAILABLE
            CON1:
0614 D28D06            JNC   START      ;START AGAIN IF LAST IN TABLE
0617 32B720            STA   TADDR
061A CD2007            CALL  CHKNOR
061D C20706            JNZ   CONPL
0620 3E41              MVI   A,41H      ;"SEND DATA" COMMAND
```

```
0622 32B820              STA     TCOMM
0625 C31E02              JMP     XMIT
             WAKUP:                        ;WAKE UP ALL UNITS
0628 3AB720              LDA     TADDR
062B CD210F              CALL    NXTRM
             WAK1:
062E D28D06              JNC     START
0631 32B720              STA     TADDR
0634 CD2007              CALL    CHKNOR
0637 C22806              JNZ     WAKUP
063A 7E                  MOV     A,M
063B E680                ANI     DIS     ;IS IT DISABLED?
063D C24806              JNZ     WAK2
0640 3E49                MVI     A,49H   ;NO, FULL WAKUP
0642 32B820              STA     TCOMM
0645 C31E02              JMP     XMIT
             WAK2:
0648 3E45                MVI     A,45H   ;YES, SET LEGAL HOURS ONLY
064A 32B820              STA     TCOMM
064D C31E02              JMP     XMIT
             SLEEP:                        ;ALL UNITS TO SLEEP
0650 3AB720              LDA     TADDR
0653 CD210F              CALL    NXTRM
             SLP1:
0656 D28D06              JNC     START
0659 32B720              STA     TADDR
065C CD2007              CALL    CHKNOR
065F C25006              JNZ     SLEEP
0662 3E46                MVI     A,46H   ;SLEEP CODE
0664 32B820              STA     TCOMM
0667 C31E02              JMP     XMIT
             SETLC:                        ;SET LAST CALL
066A 3AB720              LDA     TADDR
066D CD210F              CALL    NXTRM
             SET1:
0670 D28D06              JNC     START   ;OUT IF DONE ALL
0673 32B720              STA     TADDR
0676 CD2007              CALL    CHKNOR
0679 C26A06              JNZ     SETLC   ;SKIP LAST CALL IF DISABLED
067C 3E47                MVI     A,47H   ;"LAST CALL" COMMAND
067E 32B820              STA     TCOMM
0681 C31E02              JMP     XMIT
             TOTL:                         ;READ TOTALS & REPORT
0684 3AB720              LDA     TADDR
0687 CD0A0F              CALL    ADCNV   ;SET HL TO STAB ADDRESS
068A C37009              JMP     TOT2    ;TO PRINT-TOTALS ROUTINE
             ;
             START:                        ;START UP NEW COMM SEQUENCE
068D 218920              LXI     H,FUNQ1
0690 118720              LXI     D,FUNC
0693 0E0C                MVI     C,12
0695 CD1302              CALL    MOVIT   ;UNQUEUE FUNCTION
0698 AF                  XRA     A
0699 12                  STAX    D       ;CLEAR LAST QUEUE SPOT
069A 3A8720              LDA     FUNC    ;GET FUNCTION CODE
069D 4F                  MOV     C,A
069E 0600                MVI     B,0     ;MAKE INDEX
06A0 21AA06              LXI     H,STTAB
06A3 09                  DAD     B
06A4 09                  DAD     B
06A5 5E                  MOV     E,M
06A6 23                  INX     H
06A7 56                  MOV     D,M
06A8 EB                  XCHG
06A9 E9                  PCHL
             STTAB:
06AA BC06                DW      ST0     ;00 - CONTINUOUS POLL
06AC C306                DW      ST1     ;01 - WAKUP ALL
06AE D206                DW      ST2     ;02 - SLEEP ALL
06B0 E106                DW      ST3     ;03 - SET LAST CALL ALL
06B2 E806                DW      ST4     ;04 - READ TOTALS
06B4 E806                DW      ST5     ;05 - READ EMPTIES
```

```
06B6 F606              DW    ST6     ;06 - ENABLE SINGLE
06B8 0407              DW    ST7     ;07 - DISABLE SINGLE
06BA 1207              DW    ST8     ;08 - RESET TAMPER
              ST0:
06BC CD1D0F            CALL  GETRM   ;GET FIRST ROOM
06BF D0                RNC           ;OUT IF NO ROOMS
06C0 C31406            JMP   CON1
              ST1:
06C3 3A0520            LDA   SYS
06C6 F680              ORI   80H     ;SET SYS-ENABLED
06C8 320520            STA   SYS
06CB CD1D0F            CALL  GETRM
06CE D0                RNC
06CF C32E06            JMP   WAK1
              ST2:
06D2 3A0520            LDA   SYS
06D5 E67F              ANI   7FH     ;RESET SYS-ENABLED
06D7 320520            STA   SYS
06DA CD1D0F            CALL  GETRM
06DD D0                RNC
06DE C35606            JMP   SLP1
              ST3:
06E1 CD1D0F            CALL  GETRM   ;GET FIRST UNIT
06E4 D0                RNC
06E5 C37006            JMP   SET1
              ST4:
              ST5:
06E8 3A8820            LDA   ADDR    ;GET QUEUED ADDRESS
06EB 32B720            STA   TADDR
06EE 3E41              MVI   A,41H   ;"SEND DATA" COMMAND
06F0 32B820            STA   TCOMM
06F3 C31E02            JMP   XMIT
              ST6:
06F6 3A8820            LDA   ADDR
06F9 32B720            STA   TADDR
06FC 3E43              MVI   A,43H   ;"ENABLE" COMMAND
06FE 32B820            STA   TCOMM
0701 C31E02            JMP   XMIT
              ST7:
0704 3A8820            LDA   ADDR
0707 32B720            STA   TADDR
070A 3E44              MVI   A,44H   ;"DISABLE" COMMAND
070C 32B820            STA   TCOMM
070F C31E02            JMP   XMIT
              ST8:
0712 3A8820            LDA   ADDR
0715 32B720            STA   TADDR
0718 3E48              MVI   A,48H
071A 32B820            STA   TCOMM
071D C31E02            JMP   XMIT
              CHKNOR:                ;CHECK FOR IGNORE FLAG
                                     ;REQUIRES UNIT ADDRESS IN "A"
                                     ;RETURNS "ZERO" SET
0720 CD0A0F            CALL  ADCNV
0723 23                INX   H
0724 23                INX   H
0725 7E                MOV   A,M
0726 E620              ANI   NOR
0728 C9                RET
              SYTAM:                 ;SYSTEM-TAMPER ALARM
                                     ;NO RESPONSE FROM A UNIT
0729 210520            LXI   H,SYS
072C 7E                MOV   A,M
072D E6DF              ANI   0DFH    ;CLEAR SYS-TAMPER FLAG
072F F608              ORI   08      ;AND SET ALARM START
0731 77                MOV   M,A
0732 3AB720            LDA   TADDR
0735 CD0A0F            CALL  ADCNV   ;FIND UNIT IN STAB
0738 23                INX   H
0739 23                INX   H
073A 7E                MOV   A,M     ;PULL STATUS BYTE
073B F620              ORI   NOR     ;SET NO-POLL FLAG
```

```
073D F680                ORI      DIS         ;AND DISABLE
073F F640                ORI      ALARM       ;AND ALARM-PENDING
0741 77                  MOV      M,A
0742 C3E005              JMP      DONXT
                ;END OF MAIN
                ;
                FTIME:
0745 CD200D              CALL     SECUR
0748 FE03                CPI      03          ;3 NUMERICS UP?
074A CA5807              JZ       FT3
074D FE04                CPI      04          ;4 NUMERICS UP?
074F CA6107              JZ       FT4
                FTMSG:
0752 3E02                MVI      A,2
0754 F7                  RST      6           ;HANG UP ENTER DATE
0755 C31E0C              JMP      CLR30
                FT3:
0758 21A320              LXI      H,IMAGE+13
075B CDA70D              CALL     PACK3
075E C36707              JMP      FT
                FT4:
0761 21A220              LXI      H,IMAGE+12
0764 CDAD0D              CALL     PACK4
                FT:
0767 7A                  MOV      A,D
0768 FE24                CPI      24H
076A D25207              JNC      FTMSG       ;HOURS MUST BE < 24
076D 7B                  MOV      A,E
076E FE60                CPI      60H
0770 D25207              JNC      FTMSG       ;AND MINUTES < 60
0773 210520              LXI      H,SYS       ;O.K. TO UPDATE STATUS
0776 7E                  MOV      A,M
0777 F601                ORI      01          ;SET HAVE-TIME FLAG
0779 77                  MOV      M,A
077A 211520              LXI      H,HOUR
077D F3                  DI
077E 72                  MOV      M,D         ;HOUR
077F 23                  INX      H
0780 73                  MOV      M,E         ;MIN
0781 23                  INX      H
0782 363C                MVI      M,60        ;SECS
0784 23                  INX      H
0785 3604                MVI      M,4         ;QTRS
0787 23                  INX      H
0788 36FA                MVI      M,250       ;MS
078A FB                  EI
078B CDF60D              CALL     TYMUP       ;TO SET UP TIME MSG
078E 214620              LXI      H,TM
0791 CD0E02              CALL     DSPLA
0794 C3D907              JMP      CLR10
                FDATE:
0797 CD200D              CALL     SECUR
079A FE01                CPI      01          ;IS THERE 1 NUMERIC UP?
079C CAE307              JZ       FDAY        ;THEN ITS DAY-OF-WEEK
079F 21A020              LXI      H,IMAGE+10
07A2 FE06                CPI      06          ;ARE THERE 6 NUMERICS UP?
07A4 CAB407              JZ       FDT1        ;YUP
07A7 0600                MVI      B,0
07A9 FE05                CPI      05          ;NO, BUT 5 WILL DO
07AB CAB507              JZ       FDT2
07AE 3E03                MVI      A,3
07B0 F7                  RST      6           ;"SET DATE"
07B1 C31E0C              JMP      CLR30
                FDT1:
07B4 46                  MOV      B,M
                FDT2:
07B5 23                  INX      H
07B6 4E                  MOV      C,M
07B7 23                  INX      H
07B8 CDBF0D              CALL     PACK
07BB 111220              LXI      D,MONTH
07BE 12                  STAX     D           ;MONTH
```

```
07BF 13               INX   D
07C0 46               MOV   B,M
07C1 23               INX   H
07C2 4E               MOV   C,M
07C3 23               INX   H
07C4 CDBF0D           CALL  PACK
07C7 12               STAX  D              ;DAY
07C8 13               INX   D
07C9 46               MOV   B,M
07CA 23               INX   H
07CB 4E               MOV   C,M
07CC CDBF0D           CALL  PACK
07CF 12               STAX  D              ;YEAR
07D0 CDC60D           CALL  DAYUP
             NEWDT:
07D3 216620           LXI   H,DM
07D6 CD0E02           CALL  DSPLA
             CLR10:
07D9 AF               XRA   A
07DA 323C20           STA   KFLAG
07DD 3E0A             MVI   A,10
07DF 323F20           STA   DCNT
07E2 C9               RET                  ;DONE HERE
             FDAY:
07E3 3AA520           LDA   IMAGE+15       ;GET CHAR
07E6 FE08             CPI   8              ;MUST BE < 8
07E8 D20308           JNC   DMSG2
07EB B7               ORA   A              ;AND NOT = 0
07EC CA0308           JZ    DMSG2
07EF 321C20           STA   DOW
07F2 CDC60D           CALL  DAYUP
07F5 CDD307           CALL  NEWDT
07F8 210520           LXI   H,SYS          ;BEST TO UPDATE SYS STATUS
07FB 7E               MOV   A,M
07FC F602             ORI   02             ;SET FLAG FOR HAVE DATE
07FE 77               MOV   M,A
07FF CD720E           CALL  LODQ           ;LOAD TIMED-TASK QUEUE
0802 C9               RET
             DMSG2:
0803 3E04             MVI   A,4
0805 F7               RST   6              ;"DAY OF WEEK"
0806 C3220C           JMP   SET30
             HOURS:
0809 FE01             CPI   01             ;1 NUMERIC?
080B CA1608           JZ    RDHRS
080E FE08             CPI   08             ;8?
0810 CA6408           JZ    STHRS
0813 C30308           JMP   DMSG2
             RDHRS:
0816 3AA520           LDA   IMAGE+15       ;GET DIGIT
0819 B7               ORA   A              ;0?
081A CA0308           JZ    DMSG2
081D FE08             CPI   08             ;>7?
081F D20308           JNC   DMSG2
0822 321E20           STA   DAYCD          ;DIGIT O.K. - STORE IT
             RDH1:
0825 3D               DCR   A
0826 4F               MOV   C,A
0827 0600             MVI   B,0            ;MAKE AN INDEX
0829 C5               PUSH  B
082A CD110D           CALL  CLEAR
082D C1               POP   B
082E C5               PUSH  B
082F 212A04           LXI   H,DAYTB
0832 09               DAD   B
0833 09               DAD   B
0834 09               DAD   B
0835 119620           LXI   D,IMAGE
0838 0E03             MVI   C,3
083A CD1302           CALL  MOVIT          ;PUT UP DAY-OF-WEEK
083D 13               INX   D
083E E1               POP   H              ;RETRIEVE INDEX
```

```
083F 29            DAD    H        ;*2
0840 29            DAD    H        ;*4
0841 011F20        LXI    B,HTABL
0844 09            DAD    B
0845 EB            XCHG
0846 1A            LDAX   D        ;START HOUR
0847 13            INX    D
0848 CDF50C        CALL   ASCIT
084B 1A            LDAX   D        ;START MINUTES
084C 13            INX    D
084D CDF50C        CALL   ASCIT
0850 23            INX    H
0851 3624          MVI    M,36     ;PUT UP TO
0853 23            INX    H
0854 361F          MVI    M,31
0856 23            INX    H
0857 23            INX    H
0858 1A            LDAX   D        ;END HOUR
0859 13            INX    D
085A CDF50C        CALL   ASCIT
085D 1A            LDAX   D        ;END MINUTES
085E CDF50C        CALL   ASCIT
0861 C31E0C        JMP    CLR30
         STHRS:                    ;SET LEGAL HOURS
0864 CD200D        CALL   SECUR
0867 3A1E20        LDA    DAYCD
086A B7            ORA    A        ;HAVE THEY READ?
086B CA0308        JZ     DMSG2
086E 219E20        LXI    H,IMAGE+8
0871 CDAD0D        CALL   PACK4    ;PACK IN START HOUR & MIN
0874 7A            MOV    A,D
0875 FE99          CPI    99H      ;99 IS A SPECIAL
0877 CA8508        JZ     STOK
087A FE24          CPI    24H
087C D2B508        JNC    HERR
087F 7B            MOV    A,E
0880 FE60          CPI    60H
0882 D2B508        JNC    HERR
         STOK:
0885 D5            PUSH   D
0886 21A220        LXI    H,IMAGE+12
0889 CDAD0D        CALL   PACK4    ;PACK IN END HOUR & MIN
088C C1            POP    B
088D 7A            MOV    A,D
088E FE24          CPI    24H
0890 D2B508        JNC    HERR
0893 7B            MOV    A,E
0894 FE60          CPI    60H
0896 D2B508        JNC    HERR
0899 3A1E20        LDA    DAYCD
089C 3D            DCR    A        ;MAKE INDEX WITH DAY CODE
089D 6F            MOV    L,A
089E 2600          MVI    H,0
08A0 29            DAD    H        ;DOUBLE
08A1 29            DAD    H        ;FOURPLE
08A2 D5            PUSH   D
08A3 111F20        LXI    D,HTABL
08A6 19            DAD    D
08A7 D1            POP    D
08A8 70            MOV    M,B
08A9 23            INX    H
08AA 71            MOV    M,C
08AB 23            INX    H
08AC 72            MOV    M,D
08AD 23            INX    H
08AE 73            MOV    M,E
08AF 3A1E20        LDA    DAYCD
08B2 C32508        JMP    RDH1     ;TO DISPLAY OUR FINE WORK
         HERR:
08B5 3E06          MVI    A,6
08B7 F7            RST    6        ;"HOURS"
08B8 C31E0C        JMP    CLR30
```

```
          HAPPY:
08BB C30000         JMP     0000H       ;FOR NOW
          RATES:
08BE B7             ORA     A
08BF CACD08         JZ      RDRAT       ;YES, HE WANTS TO READ EM
08C2 FE04           CPI     04          ;4 NUMERICS?
08C4 CAEF08         JZ      STRAT       ;YES, HE WANTS TO WRITE EM
          PRBOT:
08C7 3E09           MVI     A,9
08C9 F7             RST     6           ;"PRICE"
08CA C31E0C         JMP     CLR30
          RDRAT:                        ;READ UP A RATE
          DBOT:
08CD CD110D         CALL    CLEAR
08D0 211204         LXI     H,RATEM
08D3 CDFE01         CALL    LEFT        ;DISPLAY ON LEFT
08D6 214420         LXI     H,RATBL     ;PULL RATE
08D9 56             MOV     D,M
08DA 23             INX     H
08DB 5E             MOV     E,M
08DC 21A020         LXI     H,IMAGE+10
08DF 360D           MVI     M,13        ;DOLLAR SIGN
08E1 23             INX     H
08E2 23             INX     H
08E3 72             MOV     M,D         ;DISPLAY BUCKS
08E4 23             INX     H
08E5 360A           MVI     M,10        ;PUT UP DECIMAL
08E7 23             INX     H
08E8 7B             MOV     A,E
08E9 CDF50C         CALL    ASCIT
08EC C31E0C         JMP     CLR30
          STRAT:                        ;SET NEW DRINK RATE
08EF CD200D         CALL    SECUR
08F2 21A320         LXI     H,IMAGE+13
08F5 7E             MOV     A,M
08F6 FE0A           CPI     10          ;DECIMAL IN RIGHT PLACE?
08F8 C2C708         JNZ     PRBOT
08FB 2B             DCX     H
08FC 56             MOV     D,M         ;PULL IN DOLLARS
08FD 23             INX     H
08FE 23             INX     H
08FF 46             MOV     B,M         ;GET DIMES
0900 23             INX     H
0901 4E             MOV     C,M         ;GET PENNIES
0902 CDBF0D         CALL    PACK        ;PACK INTO A
0905 5F             MOV     E,A         ;CENTS TO E
0906 214420         LXI     H,RATBL
0909 72             MOV     M,D         ;STORE BUCKS
090A 23             INX     H
090B 73             MOV     M,E         ;STORE CENTS
090C C3CD08         JMP     DBOT        ;TO SHOW HIM WHAT WAS DONE
          RESET:
090F 210520         LXI     H,SYS
0912 7E             MOV     A,M
0913 E6EF           ANI     0EFH        ;TURN OFF THE BLEEPER
0915 77             MOV     M,A
          CANCL:
0916 CD110D         CALL    CLEAR       ;CLEAR DISPLAY
0919 3E02           MVI     A,2         ;SET 2-SEC DELAY
091B 323F20         STA     DCNT
091E AF             XRA     A
091F 323C20         STA     KFLAG       ;CLEAR KB ACTIVITY
0922 C9             RET
          ;END OF SUB1
          ;
          TOTAL:
0923 B7             ORA     A           ;NUTHIN UP?
0924 CA3609         JZ      DISPR       ;HAND HIM A PROMPT
0927 FE05           CPI     05          ;4 NUMERICS OR FEWER?
0929 DAC009         JC      TOT1        ;Y
092C FE1F           CPI     1FH         ;WAS LAST A SUCCESSFUL DISABLE?
092E CA4E09         JZ      TOTN        ;IF SO, LET IT HAPPEN
0931 FE18           CPI     18H         ;WAS LAST A READ-TOTAL?
```

```
0933 CAF509           JZ      DCOUN
            DISPR:                    ;DISPLAY ROOM # PROMPT
0936 3E05             MVI     A,5
0938 F7               RST     6        ;ROOM NUMBER PROMPT
0939 C31E0C           JMP     CLR30
            TOT1:
093C CD340D           CALL    RDRUM    ;READ ROOM # & PACK INTO ROOM
093F 7A               MOV     A,D      ;PICK UP FLOOR
0940 FE99             CPI     99H
0942 CA0A0A           JZ      TOTDR    ;FLOOR 99 MEANS DO TOTAL DRINKS
0945 FE80             CPI     80H      ;MUST BE LESS THAN 80
0947 D23609           JNC     DISPR
094A B3               ORA     E        ;CHECK FOR ZERO
094B CA3609           JZ      DISPR    ;NOT ALLOWED
            TOTN:
094E CD3D0F           CALL    RNS      ;FIND IT IN TABLE
0951 E601             ANI     01       ;DID WE GET A HIT?
0953 CA6409           JZ      NOPE
            TOTS:
0956 3A4120           LDA     STADR
0959 0604             MVI     B,04
095B CD280C           CALL    QUIT     ;QUEUE COMMAND FOR COMM
095E CD110D           CALL    CLEAR
0961 C3220C           JMP     SET30
            NOPE:
0964 CD710D           CALL    RMNUM    ;PUT UP ROOM #
0967 211A04           LXI     H,NOUNI  ;NO, TELL THEM, NO CHARGE
096A CD0602           CALL    RIGHT    ;DISPLAY ON RIGHT
096D C31E0C           JMP     CLR30
            TOT2:                     ;ROOM IN TABLE
0970 EB               XCHG
0971 010500           LXI     B,5
0974 21CA20           LXI     H,ANSWR
0977 E5               PUSH    H
0978 CD170D           CALL    SPRED    ;CLEAR ANSWR
097B EB               XCHG
097C 23               INX     H
097D 23               INX     H
097E 23               INX     H        ;POINT TO STAB DRINKS
097F 46               MOV     B,M
0980 23               INX     H
0981 4E               MOV     C,M      ;DRINKS TO BC
0982 C5               PUSH    B        ;SAVEM
0983 CD8C0C           CALL    DRCNV    ;CONVERT HEX DRINKS TO DEC
0986 C1               POP     B        ;RESTORE BINARY DRINKS IN BC
0987 E1               POP     H        ;RESTORE ANSWR ADDR
0988 72               MOV     M,D      ;MSB OF BCD DRINKS
0989 23               INX     H
098A 73               MOV     M,E      ;LSB OF DRINKS
098B 214420           LXI     H,RATBL
098E 56               MOV     D,M
098F 23               INX     H
0990 5E               MOV     E,M      ;RATE TO DE
            ;THE JOB NOW IS TO ADD PACKED BCD IN D,E TO THE
            ;PACKED BCD IN ANSWR+2 THRU ANSWR+4 A TOTAL OF BC
            ;TIMES.
0991 78     MILUP:    MOV     A,B
0992 B1               ORA     C
0993 CAAC09           JZ      MIEXT    ;ZERO => INSIDE LOOP DONE
0996 21CE20           LXI     H,ANSWR+4 ;POINT TO CENTS
0999 7E               MOV     A,M
099A 83               ADD     E        ;CENTS
099B 27               DAA
099C 77               MOV     M,A
099D 2B               DCX     H
099E 7E               MOV     A,M
099F 8A               ADC     D        ;DOLLARS AND TENS
09A0 27               DAA
09A1 77               MOV     M,A
09A2 2B               DCX     H
09A3 7E               MOV     A,M
09A4 CE00             ACI     0        ;HUNDREDS
```

```
09A6 27                  DAA
09A7 77                  MOV    M,A
09A8 0B                  DCX    B
09A9 C39109              JMP    MILUP
              MIEXT:
09AC CD710D              CALL   RMNUM         ;SET UP DISPLAY
09AF 21A520              LXI    H,IMAGE+15
09B2 362D                MVI    M,45          ;PUT A SPACE AT END FOR NOW
09B4 3A3D20              LDA    SFLAG
09B7 E602                ANI    02            ;TEST "MORE" FLAG
09B9 CABE09              JZ     TOT3
09BC 362E                MVI    M,46          ;GOT MORE, SO PUT UP +
              TOT3:
09BE 2B                  DCX    H
09BF 2B                  DCX    H
09C0 11CE20              LXI    D,ANSWR+4     ;POINT TO CENTS
09C3 1A                  LDAX   D
09C4 CDF50C              CALL   ASCIT         ;PUT UP CENTS
09C7 2B                  DCX    H
09C8 2B                  DCX    H
09C9 2B                  DCX    H
09CA 360A                MVI    M,10          ;PUT UP DECIMAL
09CC 2B                  DCX    H
09CD 2B                  DCX    H
09CE 1B                  DCX    D
09CF 1A                  LDAX   D             ;GET DOLLARS & TENS
09D0 CDF50C              CALL   ASCIT
09D3 2B                  DCX    H
09D4 2B                  DCX    H
09D5 1B                  DCX    D
09D6 1A                  LDAX   D             ;GET HUNDREDS & THOUSANDS
09D7 B7                  ORA    A             ;ANY THERE?
09D8 CAE209              JZ     TOT4          ;NO, GO CHECK LEADING ZERO
09DB 2B                  DCX    H
09DC 2B                  DCX    H             ;YES, BIG BILL
09DD CDF50C              CALL   ASCIT
09E0 2B                  DCX    H
09E1 2B                  DCX    H
              TOT4:
09E2 7E                  MOV    A,M           ;GET LAST THAT WE PUT UP
09E3 B7                  ORA    A             ;WAS IT A ZERO?
09E4 C2EA09              JNZ    TOT5          ;N
09E7 362D                MVI    M,45          ;YES, SPACE IT
09E9 23                  INX    H
              TOT5:
09EA 2B                  DCX    H
09EB 360D                MVI    M,13          ;PUT UP A $
09ED 3E18                MVI    A,18H
09EF 323C20              STA    KFLAG         ;SET FUNCTION-FLAG
09F2 C3220C              JMP    SET30
              DCOUN:                          ;DISPLAY ROOM DRINKS
09F5 CD710D              CALL   RMNUM
09F8 21A020              LXI    H,IMAGE+10
09FB 11CA20              LXI    D,ANSWR
09FE 1A                  LDAX   D
09FF CDF50C              CALL   ASCIT
0A02 13                  INX    D
0A03 1A                  LDAX   D
0A04 CDF50C              CALL   ASCIT
0A07 C3220C              JMP    SET30
              TOTDR:                          ;DISPLAY TOTAL DRINKS
0A0A CD200D              CALL   SECUR
0A0D 21AA03              LXI    H,DSMSG
0A10 CDFE01              CALL   LEFT          ;DISPLAY "SYSTEM"
0A13 210020              LXI    H,GRTOT
0A16 EB                  XCHG
0A17 0E04                MVI    C,4           ;FOR 4 BYTES WORTH
              TOTLP:
0A19 1A                  LDAX   D             ;GETABYTE
0A1A CDF50C              CALL   ASCIT         ;HANG UP BOTH DIGITS
0A1D 13                  INX    D
0A1E 0D                  DCR    C
0A1F C2190A              JNZ    TOTLP         ;TILL ALL 8 DIGITS UP
```

```
0A22 C31E0C           JMP     CLR30
              DIAG:
0A25 D370             OUT     BLEPE
0A27 01102B           LXI     B,2B10H  ;"SMEAR" CHAR
0A2A 219620           LXI     H,IMAGE
0A2D CD170D           CALL    SPRED    ;LIGHT ALL DISPLAY SEGMENTS
0A30 C3D907           JMP     CLR10
              ASSYN:                    ;ASSIGN A STATION TO A ROOM
0A33 CD200D           CALL    SECUR
0A36 FE08             CPI     08       ;8 NUMERICS UP?
0A38 C26F0A           JNZ     ASMSG
0A3B 3AA120           LDA     IMAGE+11
0A3E FE0A             CPI     10       ;WITH A DECIMAL?
0A40 C26F0A           JNZ     ASMSG
0A43 219E20           LXI     H,IMAGE+8
0A46 CDA70D           CALL    PACK3    ;PACK IN UNIT #
0A49 42               MOV     B,D
0A4A 4B               MOV     C,E
0A4B CDA10C           CALL    HEXIT
0A4E 324120           STA     STADR
0A51 47               MOV     B,A      ;SAVE IN B
0A52 21A220           LXI     H,IMAGE+12
0A55 CDAD0D           CALL    PACK4    ;PACK IN ROOM #
0A58 7A               MOV     A,D      ;LOOK AT MSB
0A59 FE80             CPI     80H
0A5B D26F0A           JNC     ASMSG    ;FLOOR NUM MUST BE < 80
0A5E B3               ORA     E
0A5F CA750A           JZ      RMOUT    ;IF ROOM # = 0, CLEAR WHOLE ENTRY
0A62 78               MOV     A,B
0A63 CD0A0F           CALL    ADCNV    ;CALC. STAB ADDRESS
0A66 72               MOV     M,D
0A67 23               INX     H
0A68 73               MOV     M,E
0A69 CD890D           CALL    DRU      ;ASSIGNMENT DISPLAY
0A6C C31E0C           JMP     CLR30
              ASMSG:
0A6F 3E07             MVI     A,7
0A71 F7               RST     6        ;ASSIGNMENT PROMPT
0A72 C31E0C           JMP     CLR30
              RMOUT:                    ;CLEAR STATION ENTRY
0A75 78               MOV     A,B
0A76 CD0A0F           CALL    ADCNV
0A79 010700           LXI     B,7
0A7C CD170D           CALL    SPRED    ;CLEAR ENTIRE STAB ENTRY
0A7F 110000           LXI     D,0      ;FOR PROPER MSG
0A82 CD890D           CALL    DRU      ;TO DISPLAY IT
0A85 0607             MVI     B,07
0A87 CD280C           CALL    QUIT     ;HAVE COMM DISABLE IT
0A8A C31E0C           JMP     CLR30
              EMPTY:
0A8D B7               ORA     A
0A8E CA3609           JZ      DISPR
0A91 FE05             CPI     05
0A93 D23609           JNC     DISPR
0A96 CD340D           CALL    RDRUM    ;TO READ ROOM
0A99 7A               MOV     A,D
0A9A FE99             CPI     99H      ;FLOOR 99?
0A9C CAE70A           JZ      EMPAL    ;YES, DO ALL
0A9F CD3D0F           CALL    RNS
0AA2 E601             ANI     01
0AA4 CA6409           JZ      NOPE
0AA7 CD710D           CALL    RMNUM    ;PUT UP ROOM DISPLAY & CLEAR REST
0AAA 0605             MVI     B,05
0AAC CD280C           CALL    QUIT
0AAF 3E1A             MVI     A,1AH
0AB1 323C20           STA     KFLAG
0AB4 C3220C           JMP     SET30
              NONE:
0AB7 21A220           LXI     H,IMAGE+12
0ABA 361E             MVI     M,30
0ABC 23               INX     H
0ABD 361F             MVI     M,31
```

```
0ABF 23             INX     H
0AC0 361E           MVI     M,30
0AC2 23             INX     H
0AC3 3615           MVI     M,21
0AC5 C3220C         JMP     SET30
            MPT:                    ;PUT UP EMPTIES
0AC8 3A8620         LDA     STAT
0ACB E61F           ANI     1FH
0ACD CAB70A         JZ      NONE
0AD0 47             MOV     B,A     ;SAVIT
0AD1 21A420         LXI     H,IMAGE+14
0AD4 110520         LXI     D,2005H ;MASK & CTR
            MTLP:
0AD7 7A             MOV     A,D     ;GET MASK
0AD8 0F             RRC             ;SHIFT
0AD9 57             MOV     D,A
0ADA A0             ANA     B       ;TEST BOTTLE FLAG
0ADB CADF0A         JZ      MTLP1
0ADE 73             MOV     M,E     ;PUT UP #
            MTLP1:
0ADF 2B             DCX     H
0AE0 1D             DCR     E
0AE1 C2D70A         JNZ     MTLP
0AE4 C3220C         JMP     SET30
            EMPAL:
0AE7 CD1D0F         CALL    GETRM
0AEA C3F30A         JMP     NXMT1
            NXTMT:
0AED 3A4120         LDA     STADR
0AF0 CD210F         CALL    NXTRM
            NXMT1:
0AF3 D21609         JNC     CANCL   ;IF WE'RE DONE
0AF6 324120         STA     STADR
0AF9 0605           MVI     B,05
0AFB CD280C         CALL    QUIT
0AFE 3A4120         LDA     STADR
0B01 CD0A0F         CALL    ADCNV
0B04 7E             MOV     A,M
0B05 324220         STA     ROOM
0B08 23             INX     H
0B09 7E             MOV     A,M
0B0A 324320         STA     ROOM+1
0B0D CD710D         CALL    RMNUM
0B10 C3220C         JMP     SET30
            FNEXT:
0B13 FE18           CPI     18H     ;WAS LAST A READ TOTAL?
0B15 CA200B         JZ      NXTOT   ;Y
0B18 FE1A           CPI     1AH     ;HOWSABOUT A EMPTY?
0B1A CAED0A         JZ      NXTMT
0B1D C31609         JMP     CANCL   ;NO
            NXTOT:                  ;READ NEXT ROOM TOTAL
0B20 3A3D20         LDA     SFLAG
0B23 E602           ANI     02      ;WAS THERE A NEXT?
0B25 CA1609         JZ      CANCL   ;N, CLEAR DISPLAY
0B28 CD4C0F         CALL    NEXTS   ;YEP, GET NEXT STATION
0B2B C35609         JMP     TOTS    ;AND GO DO A TOTAL
            CLTOT:
0B2E FE18           CPI     18H     ;WAS LAST A READ TOTAL?
0B30 C22C0D         JNZ     STRCT   ;NO, RESTRICTED OPERATION
0B33 3A4120         LDA     STADR   ;YES, O.K. TO CLEAR
0B36 CD0A0F         CALL    ADCNV   ;CALC. ADDRESS OF UNIT
0B39 23             INX     H
0B3A 23             INX     H
0B3B 010500         LXI     B,5
0B3E CD170D         CALL    SPRED   ;CLEAR TOTALS
0B41 CD710D         CALL    RMNUM   ;PRESET DISPLAY WITH ROOM #
0B44 210A04         LXI     H,CLRMS
0B47 119D20         LXI     D,IMAGE+7
0B4A 0E08           MVI     C,8
0B4C CD1302         CALL    MOVIT   ;PUT UP "CLEARED"
0B4F 3A3D20         LDA     SFLAG
0B52 E602           ANI     02      ;IS THERE A "NEXT"?
0B54 CA220C         JZ      SET30
0B57 21A520         LXI     H,IMAGE+15
```

```
0B5A 362E                MVI    M,46       ;YES, PUT UP +
0B5C C3220C              JMP    SET30
            ENAB:
0B5F FE18                CPI    18H
0B61 CA7F0B              JZ     ENAB1
0B64 B7                  ORA    A
0B65 CA3609              JZ     DISPR      ;MUST HAVE SOME # UP
0B68 FE05                CPI    05         ;4 OR FEWER?
0B6A D23609              JNC    DISPR      ;N, ERROR
0B6D CD340D              CALL   RDRUM      ;YEP, PACKEM INTO ROOM
0B70 7A                  MOV    A,D
0B71 FE99                CPI    99H        ;99TH FLOOR?
0B73 CAB10B              JZ     ENALL      ;YES, DO ALL
0B76 FE80                CPI    80H
0B78 D23609              JNC    DISPR
0B7B B3                  ORA    E
0B7C CA3609              JZ     DISPR
            ENAB1:
0B7F CD3D0F              CALL   RNS        ;GO FIND IT IN STAB
0B82 E601                ANI    01         ;GET ONE?
0B84 CA6409              JZ     NOPE       ;N
0B87 23                  INX    H
0B88 23                  INX    H
0B89 7E                  MOV    A,M
0B8A E60F                ANI    0FH        ;RESET TROUBLE FLAGS
0B8C 77                  MOV    M,A
0B8D CD710D              CALL   RMNUM      ;GET ROOM # UP
0B90 21A203              LXI    H,ENMSG+8
0B93 CD0602              CALL   RIGHT      ;TELLEM WE DIDIT
            ENAB2:
0B96 3A0520              LDA    SYS
0B99 E680                ANI    80H        ;SYSTEM ENABLED?
0B9B CAA30B              JZ     ENAB3      ;NOPE, SKIP IT
0B9E 0606                MVI    B,06       ;SINGLE-UNIT ENABLE
0BA0 CD280C              CALL   QUIT       ;QUEUE IT FOR COMM
            ENAB3:
0BA3 3A3D20              LDA    SFLAG
0BA6 E602                ANI    02         ;MORE UNITS?
0BA8 CA1E0C              JZ     CLR30
0BAB CD4C0F              CALL   NEXTS
0BAE C3960B              JMP    ENAB2      ;QUEUE ANOTHER
                                           ;ENABLE ALL UNITS
            ENALL:
0BB1 3A0520              LDA    SYS
0BB4 F680                ORI    80H
0BB6 320520              STA    SYS
0BB9 0601                MVI    B,01
0BBB CD280C              CALL   QUIT       ;QUEUE "SYSTEM ENABLE"
0BBE 3E0B                MVI    A,11
0BC0 F7                  RST    6          ;SYSTEM ENABLED
0BC1 C31E0C              JMP    CLR30
            DISAB:
0BC4 B7                  ORA    A
0BC5 CA3609              JZ     DISPR      ;SLAP A WRIST IF NO #S
0BC8 FE05                CPI    05         ;MUST BE 5 NUMERICS OR FEWER
0BCA D23609              JNC    DISPR      ;N, GIVE THEM A PROMPT
0BCD CD340D              CALL   RDRUM
0BD0 7A                  MOV    A,D        ;GET MS DIGITS
0BD1 FE99                CPI    99H        ;99TH FLOOR?
0BD3 CA0E0C              JZ     DSALL      ;YEP, DOEM ALL
0BD6 FE80                CPI    80H        ;MUST BE LESS THAN 80
0BD8 D23609              JNC    DISPR
0BDB B3                  ORA    E
0BDC CA3609              JZ     DISPR      ;AND NOT = 0000
                                           ;DISABLE A ROOM
0BDF CD3D0F              CALL   RNS        ;LOOK IT UP
0BE2 E601                ANI    01         ;HIT?
0BE4 CA6409              JZ     NOPE
0BE7 23                  INX    H
0BE8 23                  INX    H
0BE9 7E                  MOV    A,M        ;YEP, GET BYTE
0BEA F680                ORI    80H        ;SET "DISABLED" FLAG
0BEC 77                  MOV    M,A
```

```
0BED CD710D           CALL    RMNUM       ;DISPLAY ROOM
0BF0 21B203           LXI     H,DSMSG+8
0BF3 CD0602           CALL    RIGHT       ;HANG UP DISABLED SIGN
0BF6 3E1F             MVI     A,1FH
0BF8 323C20           STA     KFLAG       ;SET FLAG FOR OTHER FUNCTIONS
             DSAB2:
0BFB 0607             MVI     B,07        ;SINGLE-UNIT DISABLE
0BFD CD280C           CALL    QUIT
0C00 3A3D20           LDA     SFLAG
0C03 E602             ANI     02
0C05 CA220C           JZ      SET30
0C08 CD4C0F           CALL    NEXTS
0C0B C3FB0B           JMP     DSAB2
             DSALL:                       ;DISABLE ALL UNITS
0C0E 3A0520           LDA     SYS
0C11 E67F             ANI     7FH
0C13 320520           STA     SYS
0C16 0602             MVI     B,02
0C18 CD280C           CALL    QUIT        ;QUEUE "SYSTEM DISABLE"
0C1B 3E0C             MVI     A,12
0C1D F7               RST     6           ;SYSTEM DISABLED
                                          ;FALL INTO CLR30
             CLR30:
0C1E AF               XRA     A
0C1F 323C20           STA     KFLAG
             SET30:
0C22 3E1E             MVI     A,30
0C24 323F20           STA     DCNT
0C27 C9               RET
             ;END OF SUB2
             ;
             ;************* MISCELLANEOUS UTILITIES *************
             QUIT:                        ;QUEUE COMMAND FOR COMM
                                          ;"B" HAS COMMAND
                                          ;"STADR" HAS ADDRESS
0C28 E5               PUSH    H
0C29 218920           LXI     H,FUNQ1     ;START WITH 1ST QUEUE SPOT
0C2C 0E06             MVI     C,6         ;QUEUE COUNT/LOOP CONTROL
             QULP:
0C2E 7E               MOV     A,M         ;GET ENTRY
0C2F B7               ORA     A           ;IS IT ZERO?
0C30 CA3C0C           JZ      QUUP
0C33 23               INX     H
0C34 23               INX     H
0C35 0D               DCR     C
0C36 C22E0C           JNZ     QULP
0C39 C3420C           JMP     QUEND
             QUUP:
0C3C 70               MOV     M,B         ;QUEUE COMMAND
0C3D 23               INX     H
0C3E 3A4120           LDA     STADR
0C41 77               MOV     M,A         ;QUEUE ADDRESS
             QUEND:
0C42 E1               POP     H
0C43 C9               RET
             UPDAT:                       ;UPDATE STAB & GR TOTALS
0C44 21BF20           LXI     H,RBOT1
0C47 010500           LXI     B,5
0C4A AF               XRA     A
             UPD2:
0C4B 86               ADD     M           ;ADD UP BOTTLE TOTALS
0C4C D2500C           JNC     UPD3
0C4F 04               INR     B           ;FOR CARRY
             UPD3:
0C50 23               INX     H
0C51 0D               DCR     C
0C52 C24B0C           JNZ     UPD2
0C55 4F               MOV     C,A         ;TEMP STORE LSB
0C56 3ABD20           LDA     RADDR
0C59 CD0A0F           CALL    ADCNV
0C5C 23               INX     H
0C5D 23               INX     H
```

```
0C5E  23                INX    H            ;POINT TO STAB TOTALS
0C5F  56                MOV    D,M
0C60  23                INX    H
0C61  5E                MOV    E,M
0C62  EB                XCHG
0C63  09                DAD    B            ;ADD TO ROOM
0C64  EB                XCHG
0C65  73                MOV    M,E          ;NOW UPDATE TABLE
0C66  2B                DCX    H
0C67  72                MOV    M,D
                                             ;NOW UPDATE GRAND TOTAL
0C68  CD8C0C            CALL   DRCNV        ;DECIMALIZE DRINKS
0C6B  210320            LXI    H,GRTOT+3
0C6E  7B                MOV    A,E
0C6F  86                ADD    M            ;FINALLY, WE ADD TO GRTOT
0C70  27                DAA
0C71  77                MOV    M,A
0C72  7A                MOV    A,D
0C73  2B                DCX    H
0C74  86                ADD    M
0C75  27                DAA
0C76  77                MOV    M,A
0C77  D2870C            JNC    UPD6         ;EARLY OUT IF NO CARRY
0C7A  2B                DCX    H            ;NO SUCH LUCK
0C7B  7E                MOV    A,M
0C7C  3C                INR    A
0C7D  27                DAA
0C7E  77                MOV    M,A
0C7F  D2870C            JNC    UPD6
0C82  2B                DCX    H
0C83  7E                MOV    A,M
0C84  3C                INR    A
0C85  27                DAA
0C86  77                MOV    M,A
              UPD6:
0C87  CD040D            CALL   CHKGR        ;GENERATE CHECKSUM
0C8A  77                MOV    M,A          ;& STORE IN GRLRC
0C8B  C9                RET
              DRCNV:                         ;CONVERT HEX DRINKS IN BC TO BCD IN DE
0C8C  79                MOV    A,C          ;GET LSB
0C8D  CDC50C            CALL   DECIT        ;DECIMALIZE
0C90  04                INR    B
0C91  215602            LXI    H,256H
              DRLUP:
0C94  05                DCR    B
0C95  C8                RZ                  ;DONE WHEN B ZERO
0C96  7B                MOV    A,E
0C97  85                ADD    L            ;ADD 56
0C98  27                DAA
0C99  5F                MOV    E,A
0C9A  7A                MOV    A,D
0C9B  8C                ADC    H            ;ADD 200 AND CARRY
0C9C  27                DAA
0C9D  57                MOV    D,A
0C9E  C3940C            JMP    DRLUP
              HEXIT:                         ;CONVERT PACKED BCD IN BC TO HEX IN A
0CA1  E5                PUSH   H
0CA2  78                MOV    A,B
0CA3  FE01              CPI    1
0CA5  3E00              MVI    A,0          ;PRESET TO ZERO
0CA7  DAB10C            JC     HEX1         ;IF WE DONE
0CAA  3E64              MVI    A,100        ;IN CASE OF A ONE
0CAC  CAB10C            JZ     HEX1
0CAF  3EC8              MVI    A,200        ;IN CASE OF A TWO
              HEX1:
0CB1  6F                MOV    L,A          ;RUNNING SUM TO HL
0CB2  79                MOV    A,C
0CB3  010A00            LXI    B,10
0CB6  60                MOV    H,B          ;USE ZERO FROM B TO PRESET H
              HEXLP:
0CB7  D610              SUI    10H          ;COUNT DOWN BY TEN
```

```
0CB9 DAC00C           JC      HEXAD
0CBC 09               DAD     B         ;COUNT UP BY TEN
0CBD C3B70C           JMP     HEXLP
             HEXAD:
0CC0 C610             ADI     10H       ;ADJUST BACK TO POSITIVE
0CC2 85               ADD     L
0CC3 E1               POP     H
0CC4 C9               RET
             DECIT:                     ;CONVERTS HEX IN A INTO BCD IN D&E
0CC5 1600             MVI     D,0
0CC7 D664             SUI     100
0CC9 DAD60C           JC      DEC1
0CCC 14               INR     D
0CCD D664             SUI     100
0CCF DAD60C           JC      DEC1
0CD2 14               INR     D
0CD3 C3D80C           JMP     DEC2
             DEC1:
0CD6 C664             ADI     100
             DEC2:
0CD8 5A               MOV     E,D
0CD9 D5               PUSH    D
0CDA 5F               MOV     E,A
0CDB E6F0             ANI     0F0H
0CDD 0F               RRC
0CDE 0F               RRC
0CDF 0F               RRC
0CE0 0F               RRC
0CE1 57               MOV     D,A
0CE2 7B               MOV     A,E
0CE3 E60F             ANI     0FH
0CE5 C600             ADI     0
0CE7 27               DAA
0CE8 14               INR     D
             DECLP:
0CE9 5F               MOV     E,A
0CEA C616             ADI     16H
0CEC 27               DAA
0CED 15               DCR     D
0CEE C2E90C           JNZ     DECLP
0CF1 F1               POP     PSW
0CF2 57               MOV     D,A
0CF3 7B               MOV     A,E
0CF4 C9               RET
             ASCIT:                     ;UNPACKS A INTO MEM AT HL & HL+1
0CF5 F5               PUSH    PSW
0CF6 0F               RRC
0CF7 0F               RRC
0CF8 0F               RRC
0CF9 0F               RRC
0CFA E60F             ANI     0FH
0CFC 77               MOV     M,A
0CFD 23               INX     H
0CFE F1               POP     PSW
0CFF E60F             ANI     0FH
0D01 77               MOV     M,A
0D02 23               INX     H
0D03 C9               RET
             CHKGR:                     ;COMPUTE CHECKSUM OF GRAND TOTAL
                                        ;LEAVES CHECKSUM IN A AND
                                        ;HL POINTING TO GRLRC
0D04 210020           LXI     H,GRTOT
0D07 7E               MOV     A,M       ;GET 1ST BYTE OF 4
0D08 23               INX     H
0D09 86               ADD     M         ;ADD IN 2ND
0D0A 23               INX     H
0D0B 8E               ADC     M         ;ADD IN 3RD W/CARRY
0D0C 23               INX     H
0D0D 8E               ADC     M         ;ADD IN 4TH W/CARRY
0D0E 2F               CMA               ;WHATEVER WE GOT, INVERT IT
0D0F 23               INX     H
0D10 C9               RET
```

```
                CLEAR:                      ;CLEAR THE DISPLAY
0D11 219620             LXI    H,IMAGE
0D14 01102D             LXI    B,2D10H
                                            ;LET SPRED DO THE REST
                SPRED:                      ;MOVE B TO HL FOR C TIMES
0D17 C5                 PUSH   B
                SPRLP:
0D18 70                 MOV    M,B
0D19 23                 INX    H
0D1A 0D                 DCR    C            ;DOWNCOUNT
0D1B C2180D             JNZ    SPRLP
0D1E C1                 POP    B
0D1F C9                 RET
                SECUR:                      ;CHECK KEY-SWITCH
0D20 F5                 PUSH   PSW
0D21 DB20               IN     KEYEN
0D23 E640               ANI    40H
0D25 CA2A0D             JZ     SEC1
0D28 F1                 POP    PSW
0D29 C9                 RET
                SEC1:
0D2A F1                 POP    PSW
0D2B E1                 POP    H
                                            ;ELSE FALL INTO STRCT
                STRCT:                      ;SLAP HANDS FOR ATTEMPT TO PERFORM
                                            ;A RESTRICTED FUNCTION
0D2C 3E08               MVI    A,8
0D2E F7                 RST    6
0D2F D370               OUT    BLEPE        ;BLEEPEM
0D31 C31F0C             JMP    CLR30
                RDRUM:                      ;READ ROOM NUMBER OFF LAST 4 DISPLAY
                                            ;POSITIONS & PACK INTO "ROOM"
0D34 FE01               CPI    01           ;TEST NUMERICS IN "KFLAG"
0D36 CA4C0D             JZ     RD1
0D39 FE02               CPI    02
0D3B CA550D             JZ     RD2
0D3E FE03               CPI    03
0D40 CA640D             JZ     RD3
                                            ;MUST BE 4 DIGITS
0D43 21A220             LXI    H,IMAGE+12
0D46 CDAD0D             CALL   PACK4
0D49 C36A0D             JMP    RDR
                RD1:                        ;1-DIGIT
0D4C 1600               MVI    D,0          ;CLEAR MS 2 DIGITS
0D4E 3AA520             LDA    IMAGE+15     ;GET DIGIT OFF SCREEN
0D51 5F                 MOV    E,A
0D52 C36A0D             JMP    RDR
                RD2:                        ;2-DIGIT
0D55 21A420             LXI    H,IMAGE+14   ;THIS ONE TRICKIER THAN REST
0D58 46                 MOV    B,M          ;GET MSD
0D59 23                 INX    H
0D5A 4E                 MOV    C,M          ;GET LSD
0D5B CDBF0D             CALL   PACK         ;LET PACK DO SOME OF THE WORK
0D5E 5F                 MOV    E,A
0D5F 1600               MVI    D,0          ;FILL IN MS
0D61 C36A0D             JMP    RDR
                RD3:                        ;3-DIGIT
0D64 21A320             LXI    H,IMAGE+13   ;VERY EASY
0D67 CDA70D             CALL   PACK3
                RDR:                        ;NOW IN DE - PUT IN ROOM
0D6A 214220             LXI    H,ROOM
0D6D 72                 MOV    M,D
0D6E 23                 INX    H
0D6F 73                 MOV    M,E
0D70 C9                 RET                 ;ALLDONE
                RMNUM:                      ;SET UP ROOM NUMBER DSIPLAY
0D71 CD110D             CALL   CLEAR        ;START WITH A CLEAR FIELD
0D74 219620             LXI    H,IMAGE
0D77 3622               MVI    M,34         ;GIVEM A R
0D79 23                 INX    H
0D7A 361D               MVI    M,29         ;GIVEM A M
0D7C 23                 INX    H
```

```
0D7D 3A4220           LDA    ROOM     ;MSB
0D80 CDF50C           CALL   ASCIT    ;DISPLAYIT
0D83 3A4320           LDA    ROOM+1   ;LSB
0D86 C3F50C           JMP    ASCIT
              DRU:                    ;DISPLAY ROOM & UNIT ASSIGNMENT
0D89 D5               PUSH   D        ;PUSH ROOM # IN DE
0D8A F5               PUSH   PSW      ;AND STATION IN A
0D8B 3E0E             MVI    A,14
0D8D F7               RST    6
0D8E F1               POP    PSW      ;RETRIEVE UNIT
0D8F CDC50C           CALL   DECIT    ;CONVERT UNIT # TO DEC IN DE
0D92 21A320           LXI    H,IMAGE+13
0D95 72               MOV    M,D      ;PUT UP MSD
0D96 23               INX    H
0D97 7B               MOV    A,E
0D98 CDF50C           CALL   ASCIT
0D9B 219820           LXI    H,IMAGE+2
0D9E D1               POP    D        ;PULL BACK ROOM #
0D9F 7A               MOV    A,D
0DA0 CDF50C           CALL   ASCIT
0DA3 7B               MOV    A,E
0DA4 C3F50C           JMP    ASCIT
              PACK3:                  ;PACK 3 CHARS INTO DE
0DA7 C5               PUSH   B
0DA8 0600             MVI    B,0      ;SET MSD TO ZERO
0DAA C3B00D           JMP    PK
              PACK4:                  ;PACK 4 CHARS FROM DISPLAY INTO DE
0DAD C5               PUSH   B
0DAE 46               MOV    B,M      ;GET 1ST CHAR
0DAF 23               INX    H
              PK:
0DB0 4E               MOV    C,M      ;GET 2ND
0DB1 CDBF0D           CALL   PACK     ;PACKEM INTO A
0DB4 57               MOV    D,A      ;STOREM IN D
0DB5 23               INX    H
0DB6 46               MOV    B,M      ;GET 3RD
0DB7 23               INX    H
0DB8 4E               MOV    C,M      ;GET 4TH
0DB9 CDBF0D           CALL   PACK     ;AND THERE AINT NO FIFTH
0DBC 5F               MOV    E,A
0DBD C1               POP    B
0DBE C9               RET
              PACK:                   ;PACK B & C INTO A
0DBF 78               MOV    A,B
0DC0 07               RLC             ;SHIFTEM
0DC1 07               RLC
0DC2 07               RLC
0DC3 07               RLC
0DC4 B1               ORA    C        ;AS YOU MAY HAVE GUESSED,
0DC5 C9               RET             ; I ASSUME NUMERIC DATAS
              DAYUP:                  ;UPDATE DATE DISPLAY
0DC6 3A1C20           LDA    DOW
0DC9 B7               ORA    A
0DCA CADF0D           JZ     DAY1
0DCD 3D               DCR    A        ;CUT DOWN FOR SUBSCRIPT USE
0DCE 4F               MOV    C,A
0DCF 0600             MVI    B,0
0DD1 212A04           LXI    H,DAYTB  ;DAY-TABLE BASE
0DD4 09               DAD    B
0DD5 09               DAD    B        ;APPLY INDEX
0DD6 09               DAD    B
0DD7 116620           LXI    D,DM
0DDA 0E03             MVI    C,3      ;TO MOVE 3 BYTES
0DDC CD1302           CALL   MOVIT
              DAY1:
0DDF 216E20           LXI    H,DM+8
0DE2 111220           LXI    D,MONTH
0DE5 1A               LDAX   D
0DE6 13               INX    D
0DE7 CDF50C           CALL   ASCIT
0DEA 23               INX    H
0DEB 1A               LDAX   D
```

```
0DEC 13                   INX     D
0DED CDF50C               CALL    ASCIT
0DF0 23                   INX     H
0DF1 1A                   LDAX    D
0DF2 CDF50C               CALL    ASCIT
0DF5 C9                   RET
                 ;END OF SUB3
                 ;
                 TYMUP:                          ;UPDATE TIME DISPLAY
0DF6 3A1520               LDA     HOUR
0DF9 215420               LXI     H,TM+14
0DFC 3611                 MVI     M,17            ;PRESET TO AM
0DFE FE12                 CPI     12H             ;TEST FOR NOON
0E00 DA050E               JC      TYM2            ;MORNING
0E03 3620                 MVI     M,32            ;AFTER, MAKE IT PM
                 TYM2:
0E05 FE13                 CPI     13H             ;TEST HOUR AGAIN
0E07 DA130E               JC      TYM3            ;12 OCLOCK OR EARLIER
0E0A 47                   MOV     B,A
0E0B 3E99                 MVI     A,99H
0E0D CE00                 ACI     0               ;ALL THIS TROUBLE
0E0F 90                   SUB     B               ;JUST TO DECIMAL SUBTRACT
0E10 C612                 ADI     12H
0E12 27                   DAA
                 TYM3:
0E13 FE00                 CPI     0
0E15 C21A0E               JNZ     TYM4
0E18 3E12                 MVI     A,12H           ;FOR MIDNIGHT
                 TYM4:
0E1A 214E20               LXI     H,TM+8
0E1D CDF50C               CALL    ASCIT           ;INTO THE MESSAGE
0E20 2B                   DCX     H
0E21 2B                   DCX     H
0E22 7E                   MOV     A,M
0E23 B7                   ORA     A               ;SEE IF WE PUT UP A LEADING ZERO
0E24 C2290E               JNZ     TYM5
0E27 362D                 MVI     M,45            ;SPACE IT IF WE DID
                 TYM5:
0E29 3A1620               LDA     MIN
0E2C 215120               LXI     H,TM+11
0E2F CDF50C               CALL    ASCIT
0E32 211520               LXI     H,HOUR          ;NOW CHECK FOR TIME-CUEUE
0E35 56                   MOV     D,M
0E36 23                   INX     H
0E37 5E                   MOV     E,M
0E38 CDE80E               CALL    HTM             ;CONVERT TO RAW MINUTES
                 TYM6:
0E3B 21A720               LXI     H,Q1
0E3E 7E                   MOV     A,M             ;GET Q TOP
0E3F BA                   CMP     D               ;MATCH?
0E40 C0                   RNZ                     ;OUT IF NOT
0E41 23                   INX     H
0E42 7E                   MOV     A,M
0E43 BB                   CMP     E
0E44 C0                   RNZ
                                                  ;GOT A MATCH, UNQUEUE FUNCTION
0E45 23                   INX     H
0E46 7E                   MOV     A,M
0E47 B7                   ORA     A
0E48 C2520E               JNZ     TYM7            ;NOT ZERO
0E4B CD720E               CALL    LODO            ;IS ZERO, RELOAD QUEUE
0E4E D1                   POP     D
0E4F C33B0E               JMP     TYM6
                 TYM7:
0E52 47                   MOV     B,A
0E53 CD280C               CALL    QUIT            ;QUEUE THE FUNCTION
0E56 21AA20               LXI     H,Q1+3
0E59 11A720               LXI     D,Q1
0E5C 0E09                 MVI     C,9
0E5E CD1302               CALL    MOVIT           ;SLIDE QUEUE
0E61 3AA920               LDA     Q1+2            ;LOOK-AHEAD TO NEXT FUNCTION
```

```
0E64 B7              ORA    A         ;IS IT RELOAD (0)?
0E65 C0              RNZ
0E66 3A1C20          LDA    DOW       ;YES, IF NEW DAY...
0E69 211D20          LXI    H,DAYSK
0E6C BE              CMP    M
0E6D C8              RZ
0E6E CD720E          CALL   LODQ      ;THEN RELOAD NOW!
0E71 C9              RET
            LODQ:                     ;LOAD TIMED-TASK QUEUE
0E72 3A0520          LDA    SYS
0E75 E603            ANI    03
0E77 FE03            CPI    03
0E79 C0              RNZ              ;NO LOAD IF TIME & DAY NOT SET
0E7A 3A1C20          LDA    DOW       ;DAY FOR INDEX
0E7D 321D20          STA    DAYSK
0E80 3D              DCR    A
0E81 6F              MOV    L,A
0E82 2600            MVI    H,0
0E84 29              DAD    H         ;*2
0E85 29              DAD    H         ;*4
0E86 111F20          LXI    D,HTABL
0E89 19              DAD    D         ;INDEX TO HOUR-TABLE
0E8A 01A720          LXI    B,01
0E8D 56              MOV    D,M       ;START HOUR
0E8E 23              INX    H
0E8F 5E              MOV    E,M       ;START MINUTE
0E90 23              INX    H
0E91 7A              MOV    A,D
0E92 FE99            CPI    99H       ;HOUR = 99?
0E94 CAD90E          JZ     LOD99     ;Y, SET TO RELOAD AT MIDNITE
0E97 CDE80E          CALL   HTM       ;CONVERT
0E9A 3E01            MVI    A,01      ;"ENABLE ALL"
0E9C CDDD0E          CALL   LODIT     ;Q IT
0E9F 56              MOV    D,M       ;END HOUR
0EA0 23              INX    H
0EA1 5E              MOV    E,M       ;END MINUTE
0EA2 7A              MOV    A,D
0EA3 B3              ORA    E         ;BOTH ZERO?
0EA4 CABF0E          JZ     LOD2      ;Y, SPECIAL HANDLING
0EA7 CDE80E          CALL   HTM       ;CONVERT TO PURE MINUTES
0EAA EB              XCHG
0EAB E5              PUSH   H         ;PUSH TIME
0EAC 11F1FF          LXI    D,-15
0EAF 19              DAD    D         ;KNOCK OFF 15 MINUTES
0EB0 EB              XCHG             ;BACK TO DE
0EB1 3E03            MVI    A,03      ;LAST CALL CODE
0EB3 CDDD0E          CALL   LODIT
0EB6 D1              POP    D
0EB7 3E02            MVI    A,02      ;SYS DISABLE CODE
0EB9 CDDD0E          CALL   LODIT
0EBC C3D90E          JMP    LOD99
            LOD2:                     ;END AT MIDNITE - SPECIAL CASE
0EBF 23              INX    H
0EC0 BE              CMP    M         ;IS NEXT DAY START = 00
0EC1 C2C90E          JNZ    LOD3      ;N
0EC4 23              INX    H
0EC5 BE              CMP    M         ;HOWSABOUT LSB
0EC6 CAD90E          JZ     LOD99     ;YES, SET TO RELOAD ONLY
            LOD3:
0EC9 119105          LXI    D,1425    ;SET FOR 15 TILL MIDNITE
0ECC 3E03            MVI    A,03
0ECE CDDD0E          CALL   LODIT
0ED1 110000          LXI    D,0
0ED4 3E02            MVI    A,02
0ED6 CDDD0E          CALL   LODIT
                                      ;FALL INTO LOD99
            LOD99:
0ED9 110000          LXI    D,0
0EDC AF              XRA    A
                                      ;FALL INTO LODIT
            LODIT:
0EDD F5              PUSH   PSW
```

```
0EDE 7A              MOV    A,D
0EDF 02              STAX   B            ;0 TIME MSB
0EE0 03              INX    B
0EE1 7B              MOV    A,E
0EE2 02              STAX   B            ;Q LSB
0EE3 03              INX    B
0EE4 F1              POP    PSW
0EE5 02              STAX   B            ;Q FUNCTION
0EE6 03              INX    B
0EE7 C9              RET
              HTM:                       ;DEC HOUR(D) & MIN(E) TO HEX MINS (DE)
0EE8 E5              PUSH   H
0EE9 C5              PUSH   B
0EEA 0600            MVI    B,0
0EEC 4B              MOV    C,E
0EED CDA10C          CALL   HEXIT        ;HEXIZE MINUTES
0EF0 5F              MOV    E,A
0EF1 4A              MOV    C,D
0EF2 CDA10C          CALL   HEXIT        ;HEXIZE HOUR
0EF5 4F              MOV    C,A          ;TO BC FOR MULT
0EF6 210000          LXI    H,0
0EF9 09              DAD    B            ;*1
0EFA 29              DAD    H            ;*2
0EFB 29              DAD    H            ;*4
0EFC 09              DAD    B            ;*5
0EFD 29              DAD    H            ;*10
0EFE 29              DAD    H            ;*20
0EFF E5              PUSH   H
0F00 C1              POP    B
0F01 29              DAD    H            ;*40
0F02 09              DAD    B            ;*60
0F03 1600            MVI    D,0
0F05 19              DAD    D            ;ADD MINUTES
0F06 EB              XCHG
0F07 C1              POP    B
0F08 E1              POP    H
0F09 C9              RET
              ADCNV:                     ;CONVERT STATION ADDRESS (IN A) INTO
                                         ;STAB ADDRESS IN H/L
0F0A D5              PUSH   D
0F0B 5F              MOV    E,A
0F0C 1600            MVI    D,0          ;INTO DE FOR ADDS
0F0E 210000          LXI    H,0          ;CLEAR HL TO START
0F11 19              DAD    D            ;NUMBER
0F12 19              DAD    D            ;*2
0F13 29              DAD    H            ;*4
0F14 19              DAD    D            ;*5
0F15 19              DAD    D            ;*6
0F16 19              DAD    D            ;*7
0F17 110021          LXI    D,STAB       ;TABLE BASE
0F1A 19              DAD    D
0F1B D1              POP    D            ;RESTORE DE
0F1C C9              RET
              GETRM:                     ;FIND A NON-ZERO ROOM IN STAB
0F1D AF              XRA    A
0F1E C3250F          JMP    GETR1
              NXTRM:                     ;FIND THE NEXT ROOM
0F21 FEFF            CPI    255          ;DID WE JUST DO LAST?
0F23 C8              RZ                  ;YEP, SPLIT
0F24 3C              INR    A
              GETR1:
0F25 57              MOV    D,A
0F26 CDA0F          CALL   ADCNV        ;COMPUTE START ADDRESS IN STAB
0F29 010700          LXI    B,7
              RMLP:
0F2C 7E              MOV    A,M          ;GET 2 MSD
0F2D 23              INX    H
0F2E B6              ORA    M            ;OR IN 2 LSD
0F2F 2B              DCX    H
0F30 C23A0F          JNZ    GOT1         ;IF NON-ZERO, WE GOT 1
0F33 09              DAD    B            ;ADD SEARCH INCREMENT
0F34 14              INR    D            ;AND BUMP STATION #
```

```
0F35 C22C0F            JNZ     RMLP
0F38 B7                ORA     A       ;RESET CARRY TO INDICATE NO FIND
0F39 C9                RET
               GOT1:
0F3A 7A                MOV     A,D
0F3B 37                STC             ;CARRY SET MEANS GOT IT
0F3C C9                RET
               RNS:                    ;ROOM NUMBER SEARCH
               ;INPUTS:        ROOM = PACKED BCD ROOM NUMBER
               ;OUTPUTS:       STADR = STATION ADDRESS
               ;               FOUND - BIT 1 OF SFLAG BYTE
               ;               MORE  - BIT 2 OF SFLAG BYTE
               ;               TADR = NEXT STATION, IF MORE SET
               ;               HL = 1ST BYTE OF MATCHING STAB ENTRY
0F3D AF                XRA     A
0F3E 324020            STA     TADR    ;SET START FOR ZERCH
0F41 CD750F            CALL    ZERCH
0F44 DA4C0F            JC      NEXTS   ;JUMP IF MATCH FOUND
0F47 AF                XRA     A
0F48 323D20            STA     SFLAG   ;NO MATCH, CLEAR FLAGS
0F4B C9                RET
               NEXTS:
0F4C 3E01              MVI     A,1
0F4E 323D20            STA     SFLAG   ;SET FOUND FLAG
0F51 3A4020            LDA     TADR
0F54 324120            STA     STADR   ;SET STATION ADDRESS
0F57 CD0A0F            CALL    ADCNV   ;ENSURE RIGHT ADDRESS FOR "NEXT"
0F5A FEFF              CPI     255     ;LAST ONE IN TABLE?
0F5C CA713F            JZ      RNSEN   ;CUT OUT EARLY IF LAST ENTRY
0F5F 3C                INR     A
0F60 324020            STA     TADR    ;SET TO SEARCH AGAIN
0F63 E5                PUSH    H       ;SAVE ENTRY ADDRESS
0F64 CD750F            CALL    ZERCH
0F67 E1                POP     H       ;RESTORE 1ST ENTRY ADDRESS
0F68 D2712F            JNC     RNSEN   ;OUT IF NO MORE
0F6B 3E03              MVI     A,3
0F6D 323D20            STA     SFLAG   ;SET FOUND AND MORE FLAGS
0F70 C9                RET
               RNSEN:
0F71 3A3D20            LDA     SFLAG
0F74 C9                RET
               ZERCH:                  ;DO ACTUAL SEARCH FOR "RNS"
               ;INPUTS:        TADR = SEARCH START ENTRY NUMBER
               ;               ROOM = PACKED BCD ROOM NUMBER
               ;OUTPUTS:       TADR = MATCH ENTRY NUMBER
               ;               HL = START ADDRESS OF MATCH ENTRY
               ;               CARRY = 1 IF MATCH FOUND
0F75 3A4020            LDA     TADR
0F78 5F                MOV     E,A     ;STORE FOR COUNTER
0F79 CD0A0F            CALL    ADCNV   ;CONVERT # TO ADDRESS
0F7C 23                INX     H
0F7D 010700            LXI     B,7     ;SEARCH INCREMENT
0F80 3A4320            LDA     ROOM+1
0F83 57                MOV     D,A
               Z1:
0F84 7A                MOV     A,D     ;ROOM NUMBER
0F85 BE                CMP     M       ;COMPARE TO TABLE ROOM
0F86 C2950F            JNZ     Z2
0F89 2B                DCX     H       ;ROOM MATCHED, COMPARE FLOOR
0F8A 7E                MOV     A,M
0F8B E5                PUSH    H
0F8C 214220            LXI     H,ROOM
0F8F BE                CMP     M       ;CHECK FLOOR
0F90 E1                POP     H
0F91 CA9C0F            JZ      Z3      ;MATCH FOUND
0F94 23                INX     H       ;NOT FOUND, RESTORE POINTER
               Z2:
0F95 09                DAD     B       ;TO NEXT ENTRY
0F96 1C                INR     E
0F97 C2840F            JNZ     Z1      ;TRY AGAIN IF NOT END
0F9A B7                ORA     A       ;AT END, RESET CARRY
0F9B C9                RET
```

```
Z3:
0F9C 7B            MOV    A,E
0F9D 324020        STA    TADR    ;SET MATCH ENTRY
0FA0 37            STC            ;SO HE'LL KNOW
0FA1 C9            RET
0000               END
```

| | | | | | | | |
|---|---|---|---|---|---|---|---|
| ADCNV | 0FCA | ADDR  | 2088 | ALARM | 0040 | ANSWR | 20CA |
| APPL  | 043F | ASCIT | 0CF5 | ASMSG | 0A6F | ASSYN | 0A33 |
| BLEPE | 0070 | CANCL | 0916 | CBAR  | 20A6 | CHKGR | 0D04 |
| CHKNO | 0720 | CHRPS | 0040 | CL1   | 00A3 | CLEAR | 0D11 |
| CLOCK | 072  | CLOK1 | 00BA | CLPAR | 3023 | CLR10 | 07D9 |
| CLR30 | 0C1E | CLRMS | 040A | CLTOT | 0B2E | COMMS | 0254 |
| COMXX | 026D | CON1  | 0614 | CONPL | 0607 | CSSET | 027C |
| CTO   | 20C8 | DATAI | 0000 | DAY   | 2013 | DAY1  | 0DDF |
| DAYCD | 201E | DAYSK | 2 1D | DAYTB | 042A | DAYUP | 0DC6 |
| DBOT  | 08CD | DCNT  | 203F | DCOUN | 09F5 | DEC1  | 0CD6 |
| DEC2  | 0CD8 | DECIT | 0CCE | DECLP | 0CE9 | DIAG  | 2A25 |
| DIS   | 0080 | DISAB | 0BC4 | DISPL | 0030 | DISPR | 0936 |
| DISPU | 0020 | DISPY | 0124 | DISTB | 019F | DM    | 2066 |
| DMSG2 | 0803 | DONXT | 05E0 | DOTAB | 05F5 | DOW   | 201C |
| DRCNV | 0C8C | DRLUP | 0C94 | DRU   | 0D39 | DSAB2 | 0BFB |
| DSALL | 0C0E | DSMSG | 03AA | DSP1  | 0057 | DSP2  | 005F |
| DSPEM | 050  | DSPLA | 020E | EMPAL | 0AE7 | EMPTY | 0A8D |
| ENAB  | 0B5F | ENAB1 | 0B7F | ENAB2 | 0B96 | ENAB3 | 0BA3 |
| ENALL | BB1  | ENMSG | 039A | FAL1  | 04F2 | FAL2  | 0500 |
| FALAR | 04EA | FCNS  | 203B | FDATE | 0797 | FDAY  | 07E3 |
| FDT1  | 07B4 | FDT2  | 07B5 | FIR2  | 0486 | FIRLP | 045C |
| FIRUP | 044B | FLAG  | 20B3 | FNEXT | 0B13 | FT    | 0767 |
| FT3   | 0758 | FT4   | 0761 | FTIME | 0745 | FTMSG | 0752 |
| FUNC  | 087  | FUNQ1 | 2089 | GETR1 | 0F25 | GETRM | 0F1D |
| GOT1  | F3A  | GRTOT | 2000 | HAPPY | 08BB | HERR  | 08B5 |
| HEX1  | CB1  | HEXAD | 0CC0 | HEXIT | 0CA1 | HEXLP | 0CB7 |
| HOUR  | 2015 | HOURS | 0809 | HTABL | 201F | HTM   | 0EE8 |
| IMAGE | 096  | KB2   | 0541 | KB3   | 0547 | KB4   | 0551 |
| KBFLG | 0050 | KBQ   | 0172 | KBQUE | 2006 | KBQUN | 0186 |
| KBWRK | 052A | KEYEN | 3020 | KEYFN | 2030 | KEYS  | 00DC |
| KEYSX | 00ED | KFCN2 | 0107 | KFCN3 | 0112 | KFCN4 | 011D |
| KFLAG | 203C | KQFUL | 0178 | KQL1  | 0155 | KQL2  | 015E |
| KQL3  | 0160 | KQLOD | 014D | KTABL | 0563 | LCMSG | 03BA |
| LEFT  | 01FE | LMIN  | 201D | LOD2  | 0EBF | LOD3  | 0EC9 |
| LCD99 | 0ED9 | LODIT | 0EDD | LODQ  | 0E72 | LSEC  | 201A |
| MAIN  | 049A | MIEXT | 09AC | MILUP | 0991 | MIN   | 2016 |
| MONTB | 0066 | MONTH | 2012 | MOVIT | 0213 | MOVLP | 0214 |
| MPT   | AC8  | MS    | 2019 | MSGS  | 02FA | MTLP  | 0AD7 |
| MTLP1 | 0ADF | NEWDT | 07D3 | NEWM  | 0517 | NEWMS | 04D1 |
| NEXTS | 0F4C | NOENK | 20F0 | NONE  | 0AB7 | NOPE  | 0964 |
| NOR   | 0020 | NOUNI | 041A | NXMT1 | 0AF3 | NXTMT | 0AED |
| NXTOT | 0B20 | NXTRM | 0F21 | PACK  | 0DBF | PACK3 | 0DA7 |
| PACK4 | 0DAD | PK    | 0DB0 | POLEM | 0581 | POS   | 2095 |
| PRBOT | 08C7 | Q1    | 20A7 | QTRS  | 2018 | QUEND | 0C42 |
| QUIT  | 0C28 | QULP  | 0C2E | QUUP  | 0C3C | RADDR | 20BD |
| RAM   | 2000 | RATBL | 2044 | RATEM | 0412 | RATES | 08BE |
| RBOT1 | 0BF  | RCV   | 028B | RCV10 | 02C5 | RCV13 | 02CA |
| RCVCM | 02AF | RCVCT | 20BA | RCVLP | 02B7 | RD1   | 0D4C |
| RD2   | 0D55 | RD3   | 0D64 | RDHR  | 0825 | RDHRS | 0816 |
|       |      | RDR   | 2D6A | RDRAT | 08CD | RDRUM | 0D34 | RESET | 090F |
| RIGHT | 0206 | RMLP  | 0F2C | RMNUM | 0D71 | RMOUT | 0A7E |
| RNS   | 0F3D | RNSEN | 0F71 | ROOM  | 2042 | RSTAT | 20BE |
| RTIME | 02CF | RTRY  | 20C9 | SD1   | 05BE | SEC   | 2017 |
| SEC1  | 0D2A | SECUR | 0D20 | SET1  | 0670 | SET30 | 0C22 |
| SETLC | 066A | SFLAG | 203D | SLEEP | 0650 | SLP1  | 0656 |
| SM    | 2056 | SMSGS | 03CA | SPRED | 0D17 | SPRLP | 0D18 |
| SSYNC | 02D7 | ST0   | 06BC | ST1   | 06C3 | ST2   | 06D2 |
| ST3   | 06E1 | ST4   | 06E8 | ST5   | 06E8 | ST6   | 06F6 |
| ST7   | 0704 | ST8   | 0712 | STAB  | 2100 | STADR | 2041 |
| START | 068D | STAT  | 2086 | STERS | 0864 | STOK  | 0885 |
| STRAT | 08EF | STRCT | 2D2C | STTAB | 26AA | SUART | 0010 |
| SYS   | 2035 | SYTAM | 0729 | TADDR | 20B7 | TADR  | 2040 |
| TAMSG | 0422 | TCOMM | 2038 | TFLAG | 203E | TIM1  | 04C0 |
| TIMIT | 04A9 | TIMOT | 008C | TKOFF | 0060 | TM    | 2046 |
| TOT1  | 093C | TOT2  | 0970 | TOT3  | 09BE | TOT4  | 09F2 |
| TOT5  | 09EA | TOTAL | 0923 | TOTDR | 0A0A | TOTL  | 0684 |

```
TOTLP 0A19      TOTN  094E      TOTS  0956      TRTAB 0143
TYM2  0E05      TYM3  0E13      TYM4  0E1A      TYM5  0E29
TYM6  0E3B      TYM7  0E52      TYMUP 0DF6      UCLR  0010
UPD2  0C4B      UPD3  0C50      UPD6  0C87      UPDAT 0C44
UXMIT 0000      WAK1  062E      WAK2  0648      WAKUP 0628
XFAIL 0247      XMIT  021E      XMITR 0229      YEAR  2014
Z1    0F84      Z2    0F95      Z3    0F9C      ZERCH 0F75
```

```
;     BBBBBBBB       0000         0000       ZZZZZZZZ  EEEEEEE
;    BBBBBBBBB      000000       000000      ZZZZZZZZ  EEEEEEE
;    BB      BB    000  000     000  000    ZZ    ZZ   EE
;    BB      BB    00    00     00    00          ZZ   EE
;    BBBBBBBB      00    00     00    00         ZZ    EEEEEE
;    BBBBBBBB      00    00     00    00        ZZ     EEEEE
;    BB      BB    00    00     00    00       ZZ      EE
;    BB      BB    00    00     00    00      ZZ       EE
;    BB      BB    000  000     000  000     ZZ    ZZ  EE
;    BBBBBBBBB      000000       000000      ZZZZZZZZ  EEEEEEE
;     BBBBBBBB       0000         0000       ZZZZZZZZ  EEEEEEE
;
;
;       SSSS       TTTTTTTT       AA        TTTTTTTT   NN        NN
;      SSSSSS      TTTTTTTT      AAAA       TTTTTTTT   NNN       NN
;     SS    SS        TT        AA  AA         TT      NNNN      NN
;     SS    SS        TT        AA  AA         TT      NN NN     NN
;     SS               TT       AA  AA         TT      NN  NN    NN
;      SSS             TT       AA  AA         TT      NN   NN   NN
;       SSSS           TT      AAAAAAAA        TT      NN    NN  NN
;         SSS          TT       AA  AA         TT      NN     NN NN
;    SS    SS          TT       AA  AA         TT      NN      NNNN
;    SS    SS          TT       AA  AA         TT      NN       NNN
;     SSSS             TT       AA  AA         TT      NN        NN
;
;       ROOMMATE CONTROL PROGRAM
;
;       INPUT PORTS
;
0000            DATAI   EQU     0       ;UART DATA IN
0001            SUART   EQU     1       ;UART STATUS
0002            BUZST   EQU     2       ;BOOZE STATUS
                                        ;BIT 80 = 0 = KEY SWITCH ON
                                        ;BIT 40 = 1 = TAMPERED
                                        ;BIT 20 = 1 = CALIBRATE SW ON
                                        ;BIT 10 = 0 = BOTTLE 5 EMPTY
                                        ;BIT 08 = 0 = BOTTLE 4 EMPTY
                                        ;BIT 04 = 0 = BOTTLE 3 EMPTY
                                        ;BIT 02 = 0 = BOTTLE 2 EMPTY
                                        ;BIT 01 = 0 = BOTTLE 1 EMPTY
0003            RNUMB   EQU     3       ;ROOM NUMBER
0004            KEYBR   EQU     4       ;BOOZE REQUEST KEYS
                ;
                ;       OUTPUT PORTS
                ;
0000            UXMIT   EQU     0       ;UART DATA OUT
0001            UCLR    EQU     1       ;UART CLEAR
0002            LITZ    EQU     2       ;INDICATOR LIGHTS
0003            POUR    EQU     3       ;BOOZE POUR
                ;
                ;       RAM DECLARATIONS
                ;
0820                    ORG     820H
0820            RAM     EQU     820H
                ;
0820            KEYS:   DS      1       ;CURRENT STATUS OF PRESSED KEYS
0821            TAMPR:  DS      1       ;00 = NOT TAMPERED
                                        ;40 = TAMPERED
                                        ;C0 = TAMPERED AND RESET
```

```
0822            ENBLE:  DS      1       ;00 = DISABLED
                                        ;80 = ENABLED
0823            LCF:    DS      1       ;BIT 80 = LAST CALL SET
                                        ;BIT 40 = LC CURRENT STATE
0824            LH:     DS      1       ;00 = LEGAL HOURS OFF
                                        ;80 = LEGAL HOURS ON
                ;
0825            B1CT:   DS      1       ;ACTIVE COUNTER - BOTTLE #1
0826            B2CT:   DS      1
0827            B3CT:   DS      1
0828            B4CT:   DS      1
0829            B5CT:   DS      1
                ;
082A            B1CTX:  DS      1       ;LAST REPORTED COUNTS
082B            B2CTX:  DS      1
082C            B3CTX:  DS      1
082D            B4CTX:  DS      1
082E            B5CTX:  DS      1
                ;
082F            FLAG:   DS      1       ;00 => SYNC SEARCH
                                        ;01 => RCV
                                        ;02 => XMIT
                                        ;04 => ADDRESS SEARCH
0830            RCVCT:  DS      3       ;CHAR COUNT, 2 SYNCS
0833            RADDR:  DS      1       ;REC'D ADDRESS
0834            RCOMM:  DS      1       ;REC'D COMMAND
0835            RLRC:   DS      1       ;REC'D LRC
0836                    DS      8
083E            XMTCT:  DS      3       ;CHAR COUNT, 2 SYNCS
0841            XADDR:  DS      1
0842            XSTAT:  DS      1       ;STATUS
0843            XBCT:   DS      5       ;5 SERVING COUNTERS
0848            XLRC:   DS      4       ;REMAING SPACE FOR LINE TEST
                ;
084C            LITES:  DS      1       ;LH,LC,HH,5,4,3,2,1
084D            TIMER:  DS      2       ;TIME CONTROL OF BLINK
0000                    ORG     0
0000 D301               OUT     UCLR    ;CLEAR UART
0002 DB00               IN      DATAI
0004 DB00               IN      DATAI
0006 AF                 XRA     A
0007 D302               OUT     LITZ    ;TURN OFF ALL INDICATORS
0009 318008             LXI     SP,880H ;SET STACK AT END OF RAM
000C 212008             LXI     H,RAM
000F 110000             LXI     D,0
0012 72         CLUP:   MOV     M,D     ;CLEAR ALL OF MEMORY
0013 23                 INX     H
0014 1D                 DCR     E
0015 C21200             JNZ     CLUP
                ;
0018 DB02       MAIN:   IN      BUZST   ;READ EMPTIES
001A E61F               ANI     1FH     ;ISOLATE THEM
001C 324C08             STA     LITES
001F DB02               IN      BUZST
0021 E640               ANI     40H     ;IS UNIT TAMPERED WITH?
0023 CA2F00             JZ      MAINX
0026 212108             LXI     H,TAMPR
0029 B6                 ORA     M       ;YES SET FLAG
002A 77                 MOV     M,A
002B AF                 XRA     A
002C 322208             STA     ENBLE   ;AND DISABLE OURSELF
002F CD6D00     MAINX:  CALL    KEYIN
0032 CDB600             CALL    COMMS
0035 3A4C08             LDA     LITES
0038 47                 MOV     B,A
0039 3A2208             LDA     ENBLE
003C B7                 ORA     A
003D C24200             JNZ     MLOK    ;WE ARE ENABLED
0040 0600               MVI     B,0     ;ELSE NO BOTTLE LITES
                MLOK:
0042 3A2408             LDA     LH
0045 B0                 ORA     B       ;ADD LEGAL-HOURS
```

```
0046 47               MOV     B,A
0047 3A2308           LDA     LCF     ;ISOLATE LAST-CALL BLINKER
004A E640             ANI     40H
004C B0               ORA     B       ;AND ADD IT IN
004D D302             OUT     LITZ    ;SEND IT TO THE LIGHTS
004F 2A4D08           LHLD    TIMER
0052 2B               DCX     H
0053 7C               MOV     A,H
0054 B5               ORA     L       ;IS BLINK INTERVAL DONE?
0055 C26700           JNZ     RSTIM
0058 3A2308           LDA     LCF
005B B7               ORA     A       ;ARE WE IN LAST CALL?
005C F26700           JP      RSTIM   ;NO, SKIP IT
005F EE40             XRI     40H     ;YES, CHANGE BLINK STATE
0061 322308           STA     LCF
0064 21A00F           LXI     H,4000
0067 224D08   RSTIM:  SHLD    TIMER
006A C31800           JMP     MAIN
                  ;
006D DB02     KEYIN:  IN      BUZST
006F E620             ANI     20H     ;IS CALIBRATE SWITCH ON?
0071 C27D00           JNZ     KYCAL   ;YES => IGNORE ENABLE & TAMPR
0074 DB02             IN      BUZST   ;READ BOOZE BOTTLE STATUS
0076 EE80             XRI     80H
0078 212208           LXI     H,ENBLE
007B A6               ANA     M       ;TEST FOR ENABLED STATE
007C F0               RP              ;IF NOT ENABLED - EXIT
007D DB02     KYCAL:  IN      BUZST
007F E61F             ANI     1FH
0081 4F               MOV     C,A
0082 212008           LXI     H,KEYS  ;GET KEY MASK
0085 46               MOV     B,M
0086 DB04             IN      KEYBR   ;READ BOOZE REQUEST BUTTONS
0088 E61F             ANI     1FH     ;MASK OFF UNDEFINED JUNK
008A 77               MOV     M,A
008B 2F               CMA             ;REVERSE NEGATIVE LOGIC
008C A0               ANA     B       ;MASK OFF OLD KEYS
008D A1               ANA     C       ;MASK OFF EMPTIES
008E C8               RZ              ;NO NEW VALID REQUESTS
              ;AT THIS POINT 5 LS BITS OF A ARE NEW REQUESTS
008F 47               MOV     B,A
0090 D303             OUT     POUR
0092 DB02             IN      BUZST
0094 E620             ANI     20H
0096 C0               RNZ             ;CALIBRATE => DO NOT ACCUMULATE
0097 78               MOV     A,B
0098 212508           LXI     H,B1CT
009B 0605             MVI     B,5
009D 0F       KEYLP:  RRC
009E D2A200           JNC     KEYX
00A1 34               INR     M
00A2 23       KEYX:   INX     H
00A3 05               DCR     B
00A4 C29D00           JNZ     KEYLP
00A7 0600             MVI     B,0
00A9 CD4502           CALL    MILLI
00AC CD4502           CALL    MILLI
00AF CD4502           CALL    MILLI
00B2 CD4502           CALL    MILLI
00B5 C9               RET
              ;       COMMUNICATIONS SERVICE
              ;
00B6 3A2F08   COMMS:  LDA     FLAG
00B9 FE02             CPI     2       ;IS CURRENT STATUS = XMIT?
00BB CA1902           JZ      XMIT
00BE DB01             IN      SUART   ;
00C0 B7               ORA     A       ;IS ANYTHING HAPPENING?
00C1 F0               RP
00C2 213008           LXI     H,RCVCT
00C5 3A2F08           LDA     FLAG    ;READ STATE VARIABLE
00C8 0600             MVI     B,0
00CA 34               INR     M
```

```
00CB 4E              MOV     C,M       ;THESE TWO FOR CODE COMPACTION
00CC B7              ORA     A
00CD CAF100          JZ      SYNCS     ;00 => SYNC SEARCH
00D0 0F              RRC
00D1 DA0401          JC      RCV       ;01 => RECEIVE
00D4 0F              RRC
00D5 DA1902          JC      XMIT      ;02 => TRANSMIT
                 ;
                 ;AT THIS POINT FLAG = 04 => ADDRESS SEARCH
                 ;
00D8 DB00            IN      DATAI     ;READ CHAR
00DA 57              MOV     D,A
00DB DB03            IN      RNUMB     ;READ LOCAL ROOM NUMBER
00DD BA              CMP     D
00DF C2E900          JNZ     SSS       ;IF NOT US, START SYNC SEARCH
00E1 09              DAD     B         ;POINT INTO BUFFER
00E2 72              MOV     M,D       ;MOV CHAR TO BUF(RCVCT)
00E3 3E01            MVI     A,1
00E5 322F08          STA     FLAG      ;SET STATE TO RCV
00E8 C9              RET
                 ;
                 ;
00E9 AF      SSS:    XRA     A
00EA 322F08          STA     FLAG      ;SET STATE TO SYNC SEARCH
00ED 323008          STA     RCVCT     ;CLEAR COUNTER
00F0 C9              RET
                 ;
                 ;
                 ;FLAG = 00 => SYNC SEARCH
                 ;
00F1 DB00    SYNCS:  IN      DATAI     ;READ CHAR
00F3 FE16            CPI     16H       ;IS IT AN OUTGOING SYNC?
00F5 C2E900          JNZ     SSS       ;NO => SET UP ALL OVER
00F8 09              DAD     B         ;POINT INTO BUFFER
00F9 77              MOV     M,A
00FA 79              MOV     A,C
00FB FE02            CPI     2         ;IS COUNT = 2?
00FD C0              RNZ               ;NO => THERE IS YET ANOTHER SYNC
00FE 3E04            MVI     A,4
0100 322F08          STA     FLAG      ;SET STATE TO ADDRESS SEARCH
0103 C9              RET
                 ;
                 ;
                 ;FLAG = 01 => RCV
                 ;
0104 DB00    RCV:    IN      DATAI     ;READ BYTE
0106 09              DAD     B
0107 77              MOV     M,A       ;MOVE CHAR TO BUF(RCVCT)
0108 3A3408          LDA     RCOMM     ;GET COMMAND
010B 5F              MOV     E,A
010C FE40            CPI     40H       ;IS IT LINE TEST?
010E CA5901          JZ      LINET
0111 79              MOV     A,C
0112 FE05            CPI     5
0114 C0              RNZ
0115 CD3B01          CALL    RCVRC     ;CALCULATE LRC
 118 B7              ORA     A
0119 C2E900          JNZ     SSS       ;IF NOT ZERO, START OVER
 11C 323E08          STA     XMTCT     ;CLEAR XMIT COUNT
 11F 3E02            MVI     A,2
0121 322F08          STA     FLAG      ;SET STATE TO XMIT
0124 7B              MOV     A,E       ;COMMAND
0125 E60F            ANI     0FH
0127 FE0A            CPI     10
 129 D2E900          JNC     SSS       ;INVALID COMMAND => START OVER
012C 3D              DCR     A
 12D 5F              MOV     E,A       ;DOUBLE IT
 12E 07              RLC
 12F 5F              MOV     E,A
 130 1600            MVI     D,0
 132 214701          LXI     H,CASE
 135 19              DAD     D
```

```
136 5E                  MOV     E,M
137 23                  INX     H
0138 56                 MOV     D,M     ;GET DISPATCH ADDRESS
139 EB                  XCHG
13A E9                  PCHL
                ;
                ;
013B 213108     RCVRC:  LXI     H,RCVCT+1
13E 7E                  MOV     A,M     ;GET 1ST BYTE
13F 0D                  DCR     C
140 23          RCVLP:  INX     H
141 AE                  XRA     M       ;ACCUMULATE LRC
142 0D                  DCR     C
143 C24001              JNZ     RCVLP
146 C9                  RET
                ;
                ;
                ;
                CASE:
147 7001                DW      SENDD   ;41 => SEND DATA
149 C001                DW      CLRTT   ;42 => CLEAR TOTALS
14B D401                DW      ENAOP   ;43 => ENABLE OPERATION
14D E001                DW      DISOP   ;44 => DISABLE OPERATION
14F F401                DW      SLH     ;45 => SET LEGAL HOURS
151 E701                DW      RLH     ;46 => RESET LEGAL HOURS
                                        ;      (AND LAST CALL)
                                        ;      (AND DISABLE)
153 FC01                DW      SLC     ;47 => SET LAST CALL
155 0402                DW      RTAMP   ;48 => RESET TAMPER
157 0E02                DW      WAKUP   ;49 => COMBINATION 43 & 45
                ;       CASES
                ;
159 113308      LINET:  LXI     D,RCVCT+3       ;CASE 40 - LINE TEST
15C 213F08              LXI     H,XMTCT+1
15F 060B                MVI     B,11
161 3617                MVI     M,17H
163 23                  INX     H
0164 3617               MVI     M,17H   ;TWO SYNCS
166 23                  INX     H
167 1A          LTLUP:  LDAX    D
168 77                  MOV     M,A
169 13                  INX     D
16A 23                  INX     H
16B 05                  DCR     B
16C C26701              JNZ     LTLUP
16F C9                  RET
                ;
                ;
170 112508      SENDD:  LXI     D,B1CT
173 212A08              LXI     H,B1CTX
176 0605                MVI     B,5
0178 1A         SDLUP:  LDAX    D       ;GET ACTIVE COUNT
179 86                  ADD     M       ;ADD OLD COUNT
17A 77                  MOV     M,A     ;UPDATE OLD COUNT
17B AF                  XRA     A
17C 12                  STAX    D       ;CLEAR ACTIVE COUNT
17D 13                  INX     D
17E 23                  INX     H
17F 05                  DCR     B
180 C27801              JNZ     SDLUP
183 DB02                IN      BUZST   ;READ CURRENT STATUS
185 E6BF                ANI     0BFH    ;REMOVE TAMPER FLAG
187 EE9F                XRI     9FH     ;COMPL. ENABLE & FULL BOTTLES
189 47                  MOV     B,A     ;SAVE IT
18A 3A2108              LDA     TAMPR   ;TAMPER STATUS
18D FE40                CPI     40H     ;HAVE WE AN UNCLEARED TAMPER?
18F C29401              JNZ     SDL1    ;NO, DON'T SEND
192 B0                  ORA     B       ;YES, COMBINE WITH OTHER STATII
193 47                  MOV     B,A
                SDL1:
194 78                  MOV     A,B
```

```
        195 324208                STA     XSTAT   ;PUT STATUS IN BUFFER
        198 DB03                  IN      RNUMB
        19A 324108                STA     XADDR   ;PUT LOCAL ADDRESS IN BUFFER
        19D 112A08                LXI     D,B1CTX ;POINT TO OLD COUNTERS
        1A0 214308                LXI     H,XBCT  ;POINT TO THERE PLACE IN BUFFER
        1A3 0605                  MVI     B,5
        1A5 1A          SDLPX:    LDAX    D       ;MOV     BOTTLE COUNTS TO BUFFER
        1A6 77                    MOV     M,A
        1A7 23                    INX     H
        1A8 13                    INX     D
        1A9 05                    DCR     B
        1AA C2A501                JNZ     SDLPX
        1AD 3E17                  MVI     A,17H
        1AF 323F08                STA     XMTCT+1 ;PUT IN SYNCS
        01B2 324008               STA     XMTCT+2
        1B5 0E09                  MVI     C,9
        1B7 213F08      CASEX:    LXI     H,XMTCT+1
        1BA CD3E01                CALL    RCVRC+3 ;CALCULATE LRC
        1BD 23                    INX     H
        1BE 77                    MOV     M,A
        1BF C9                    RET
                        ;
        1C0 212A08      CLRTT:    LXI     H,B1CTX
        1C3 0605                  MVI     B,5
        1C5 AF                    XRA     A
        1C6 77          CTLUP:    MOV     M,A
        1C7 23                    INX     H
        1C8 05                    DCR     B
        1C9 C2C601                JNZ     CTLUP
        1CC CD5901      CEXIT:    CALL    LINET   ;MOVE BUFFER & INSERT SYNCS
        1CF 0E04                  MVI     C,4
        1D1 C3B701                JMP     CASEX   ;FIX UP LRC
                        ;
                        ENAOP:
        1D4 3E80                  MVI     A,80H
        1D6 322208                STA     ENBLE   ;SET ENABLE FLAG
        01D9 AF                   XRA     A
        1DA 322108                STA     TAMPR   ;AND CLEAR TAMPER
        1DD C3CC01                JMP     CEXIT
                        ;
                        DISOP:
        1E0 AF                    XRA     A
        1E1 322208                STA     ENBLE   ;RESET ENABLE FLAG
        1E4 C3CC01                JMP     CEXIT
                        ;
                        RLH:
        1E7 AF                    XRA     A
        1E8 322408                STA     LH      ;KILL LEGAL HOURS
        1EB 322308                STA     LCF     ;AND LAST-CALL
        1EE 322208                STA     ENBLE   ;AND DISABLE
        1F1 C3CC01                JMP     CEXIT
                        ;
                        SLH:
        1F4 3E80                  MVI     A,80H
        1F6 322408                STA     LH      ;SET LEGAL HOURS LIGHT
        1F9 C3CC01                JMP     CEXIT
                        ;
                        SLC:
        1FC 3EC0                  MVI     A,0C0H
        1FE 322308                STA     LCF     ;TURN ON LAST CALL
        0201 C3CC01               JMP     CEXIT
                        ;
                        RTAMP:
        204 212108                LXI     H,TAMPR
        207 7E                    MOV     A,M
        208 F680                  ORI     80H     ;TURN ON CLEARING BIT
        20A 77                    MOV     M,A
        20B C3CC01                JMP     CEXIT
                        ;
                        WAKUP:
        20E 3E80                  MVI     A,80H
```

```
210 322208              STA     ENBLE       ;ENABLE US
0213 322408             STA     LH          ;AND SET LEGAL HOURS
216 C3CC01              JMP     CEXIT

;
                ;FLAG = 02 => XMIT
                ;
219 DB00        XMIT:   IN      DATAI       ;READ CHAR - TO CLEAR IT OUT
21B DB01                IN      SUART       ;READ UART STATUS
21D E640                ANI     40H
21F C8                  RZ                  ;NO BUFFER => NOT READY
220 213E08              LXI     H,XMTCT
223 34                  INR     M
224 0600                MVI     B,0
226 4E                  MOV     C,M         ;GET BUMPED COUNT
227 09                  DAD     B           ;POINT INTO BUFFER
228 7E                  MOV     A,M         ;GET NEXT BYTE
229 D300                OUT     UXMIT       ;SEND DATA
22B 3A3408              LDA     RCOMM
22E FE40                CPI     40H
230 C23A02              JNZ     XNOLT       ;IS OP = LINE TEST?
233 3E0D                MVI     A,13        ;LENGTH OF LINE TEST
235 B9          XCOM:   CMP     C
236 C0                  RNZ                 ;NOT DONE => RETURN
237 C3E900              JMP     SSS
23A FE41        XNOLT:  CPI     41H         ;IS OP = SEND DATA?
23C 3E05                MVI     A,5
23E C23502              JNZ     XCOM        ;NOT 41 => REGULAR
241 07                  RLC                 ;A NOW = 10
242 C33502              JMP     XCOM

;
                ;
245 0E83        MILLI:  MVI     C,131
247 0D          MILUP:  DCR     C
248 C24702              JNZ     MILUP
24B 05                  DCR     B
24C C24502              JNZ     MILLI
024F C9                 RET
                ;
000                     END
```

| | | | |
|---|---|---|---|
| B1CT  0825 | B1CTX 082A | B2CT  0826 | B2CTX 082B |
| B3CT   827 | B3CTX 082C | B4CT  0828 | B4CTX 082D |
| B5CT   829 | B5CTX 082E | BUZST 0002 | CASE  0147 |
| CASEX  1B7 | CEXIT 01CC | CLRTT 01C0 | CLUP  0012 |
| COMMS  0B6 | CTLUP 01C6 | DATAI 0000 | DISOP 01E0 |
| EN OP  1D4 | ENBLE 0822 | FLAG  082F | KEYBR 0004 |
| KEYIN  06D | KEYLP 009D | KEYS  0820 | KEYX  00A2 |
| KY AL  07D | LCF   0823 | LH    0824 | LINET 0159 |
| LITES  84C | LITZ  0002 | LTLUP 0167 | MAIN  0018 |
| MAINX  02F | MILLI 0245 | MILUP 0247 | MLOK  0042 |
| POUR   003 | RADDR 0833 | RAM   0820 | RCOMM 0834 |
| RCV    104 | RCVCT 0830 | RCVLP 0140 | RCVRC 013B |
| RL     1E7 | RLRC  0835 | RNUMB 0003 | RSTIM 0067 |
| RT MP  204 | SDL1  0 94 | SDLPX 01AE | SDLUP 0178 |
| SENDD  170 | SLC   01FC | SLH   01F4 | SSS   00E9 |
| SU RT 0001 | SYNCS 00F1 | TAMPR 0821 | TIMER 084D |
| UCLR   001 | UXMIT 0000 | WAKUP 020E | XADDR 0841 |
| XBCT   843 | XCOM  0235 | XLRC  0848 | XMIT  0219 |
| XMTCT 083E | XNOLT 023A | XSTAT 0842 | |

We claim:

1. A system for indicating and controlling at a central console the dispensing of beverages from a plurality of units remote from the console, each of the units including a plurality of beverage reservoirs, comprising:

a plurality of beverage flow controllers at each unit, one of said flow controllers being provided for each reservoir;

the console including: a keyboard for deriving data and command signals, data processing means responsive to the keyboard data and command signals for deriving addressing signals for the units;

each of said units including: customer input signalling means, data processing means for: selectively deriving control signals for the flow of a beverage from the reservoirs and for deriving signals indicative of the quantity of beverage dispensed from the selected reservoirs, and for coupling the quantity of beverage signals to the console data processing means in response to the address of the unit being transmitted to the unit data processor from the console data processor, and means for activating the flow control means in response to the beverage flow control signals;

the console further comprising: display means responsive to the console data processing means for displaying characters derived in response to the keyboard data signals and the quantity of beverage signals derived from the address units.

2. The system of claim 1 wherein each of the units includes a display means responsive to signals derived from the unit data processing means, the console data processing means including: a clock source, means responsive to the clock source for accumulating local time data, means responsive to the accumulated local time data and a keyboard time indicating data signal for deriving time indicating control signals for controlling additional operations at one of the data processing means and thence controlling the indicator means associated with the one data processing means.

3. The system of claim 2 wherein the time indicating signal is indicative of the hours during which the beverage may be dispensed, and the one data processing means is at the unit, the unit data processing means including means responsive to the time indicating signal from the console data processor for deriving a signal to prevent derivation of the beverage flow control signals at the unit.

4. The system of claim 3 wherein the unit data processing means includes means responsive to the time indicating signal from the console data processor for deriving a control signal that is applied to an indicator at the unit.

5. The system of claim 4 wherein the time indicating signal is indicative of a predetermined interval prior to the time during which the beverage may not be dispensed, the unit data processing means including means responsive to the predetermined interval signal for deriving another control signal that is applied to another indicator at the unit.

6. The system of claim 1 wherein the console data processing means includes means responsive to the quantity of beverage signals transmitted to it from the unit for deriving signals indicative of accumulated quantity of liquid dispensed from the individual units, and means responsive to a keyboard command signal for deriving a signal that is supplied to the console display means and is indicative of the accumulated signals.

7. The system of claim 6 wherein a keyboard data signal is indicative of the price for a quantity of dispensed beverage from the reservoirs; the console data processing means being responsive to the price indicating signal and the quantity of beverage dispensed signal for deriving a signal indicative of the total cost of the dispensed beverage from a location including one of the units.

8. The system of claim 6 wherein a keyboard data signal is indicative of the price for a quantity of dispensed beverage from differing reservoirs, different prices being assignable to beverages from different reservoirs at the same unit, said console data processing means being responsive to the price indicating signal and the quantity of beverage dispensed signal for deriving a signal indicative of the total cost of the dispensed beverage from a location including one of the units.

9. The system of claim 1 wherein the console data processing means is responsive to a next command signal derived from the keyboard to address data processors of different units in sequence, the console data processing means responding to each next command signal and a further command signal from the keyboard to command certain of the data processing means of addressed units to transmit quantity of beverage signals to the console data processing means.

10. The system of claim 9 further including means for sensing the presence or absence of beverage in each reservoir, means responsive to the sensing means for supplying a signal to the unit data processor to indicate when beverage is absent from the reservoir, the further signal commanding the empty status of the reservoir to be signalled from the units to the console data processor, the unit data processor being responsive to the absent, next, and empty command signals to transmit a unit empty signal to the console data processor, the display means at the console being activated in response to the unit empty signal to provide an indication of the unit having an empty reservoir.

11. The system of claim 10 wherein the unit empty signal indicates which reservoir at the unit is empty, and the display means responds to the unit empty signal to indicate which reservoir at the unit is empty.

12. The system of claim 1 wherein the keyboard includes means for entering a command signal for enabling a determination to be made of a total amount of money spent at a location including a unit, and for entering a data signal indicative of the location of the unit, the console data processor being responsive to the total amount spent and location signals for addressing a unit at the location to command stored data signals to be transmitted from the data processor of the addressed unit to the console data processor, the stored data signals indicating the quantity of dispensed beverage from all of the reservoirs at the unit.

13. The system of claim 12 wherein multiple units are assignable to a single location, each of the units having a different address, the keyboard including means for deriving location number and unit number indicating signals, a next command signal, and an enter command signal, the console data processing means being responsive to the location number and unit number indicating signals and the enter command signal to correlate the multiple units with the signal for a single location, and to indicate multiple units at the single location, the console data processing means addressing one of the units at the location in response to the keyboard location number signal and total command signal, the console data processing means then addressing another unit at the location in response to the next signal, the addressed units sequentially supplying the console data processor with the quantity of dispensed beverage signals in response to the total command and next command signals, the console data processor responding to the total command signal and the multiple units indication to activate the display means with an indication that another unit is at the location, whereby an operator at the console is advised that the next signal command should be derived from the keyboard.

14. A remote unit for dispensing beverage from a plurality of reservoirs, the units being adapted to transmit data to a central console and to be responsive to data from the console, comprising a beverage flow controller for each of the reservoirs, a customer activated switch for each reservoir, a data processor, said data processor including: a memory for storing program and data signals, a microprocessor having an address bus coupled to the memory as a control for the program signals of the memory, a data bus coupled to the microprocessor and the memory, means for connecting the data bus to be responsive to the customer activated switches, the data bus being controlled by the program signals so that signals resulting from the customer activated switches are coupled as data signals to the memory, means for connecting the data bus to the flow controllers, the data bus being controlled by the program signals so that customer activated data signals in memory are selectively coupled as enabling signals to the flow controllers, means for connecting the data bus with a communication link to the console so that signals are transmitted in both directions between the console and the data bus, the console selectively supplying the connecting means with enable and memory read out signals that are coupled to the memory under the control of the program, the enable signal being read out from memory to the data bus in response to the program signal to couple the customer activated signals to the memory, the program signal and memory read out signal in the memory activating the memory and the connecting means so that customer activated signals in memory are supplied to the data bus and thence to the connecting means so they can be transmitted to the console.

15. The unit of claim 14 further including means for sensing the presence and absence of liquid in each of the reservoirs, means responsive to the sensing means for deriving an absent signal, means for coupling the absent signal to the data bus, the program signal controlling the absent signal coupling means and the memory so the absent signal is stored in the memory, the program signal and a further signal from the console enabling the absent signal to be coupled from the memory to the data bus and thence to the connecting means so it can be transmitted to the console.

16. A system for indicating at a central console the dispensing of beverages from a plurality of units remote from the console, each of the units including a plurality of beverage reservoirs, comprising:
   a plurality of beverage flow controllers and beverage sensors at each unit, one of said flow controllers and one of said sensors being provided for each reservoir, the sensor for each reservoir deriving a signal to indicate when no beverage is in the reservoir;
   each of said units including: customer input signalling means for deriving signals indicative of which reservoir is selected by a customer at the unit, means responsive to the customer input signalling means for selectively deriving control signals for the flow of beverage from the selected reservoirs and for deriving signals indicative of the quantity of beverage dispensed from the selected reservoirs, means for activating the flow control means in response to the beverage flow control signals;
   means for coupling the quantity of beverage and the no beverage signals to the console;
   the console including means for displaying indications derived in response to the quantity of beverage and no beverage signals.

17. The system of claim 16 wherein the console includes an empty command source and a next command source, means for sequentially coupling the sensor signals at each unit to the console in response to activation of the empty command source until a no beverage signal indicates that a reservoir is empty, and means for continuing the sequential coupling of the sensor signals to the console in response to activation of the empty command source.

18. The system of claim 17 wherein the console includes means for enabling the displaying means to display an indication of a number associated with a unit from which the no beverage signal is derived to the exclusion of other units in response to activation of the empty command source.

19. A system for indicating and controlling at a central console the dispensing of beverages from a plurality of units remote from the console, each of the units including a plurality of beverage reservoirs, comprising:
   a plurality of beverage flow controllers at each unit, one of said flow controllers being provided for each reservoir;
   the console including: a source for signalling the hours during which the beverage may be dispensed, a clock source, means responsive to the clock source for accumulating local time data, means responsive to the accumulated local time data, and the source for signalling hours for deriving enable and disable signals for the beverage flow controllers;
   each of said units including: customer input signalling means for deriving signals indicative of which reservoir is selected by a customer, means responsive to the customer input signalling means for selectively deriving control signals for the flow of beverage from the selected reservoirs and for deriving signals indicative of the quantity of beverage dispensed from the selected reservoirs, means for activating the flow control means in response to the beverage flow control signals while the enable signal is being derived to the exclusion of while the disable signal is being derived;
   means for coupling the quantity of beverage signals to the console;
   the console including means for displaying indications derived in response to the quantity of beverage signals.

20. The system of claim 19 wherein the console includes means responsive to the enable the disable signals for controlling an indicator at each unit.

21. The system of claim 19 or 20 wherein the console includes means responsive to the clock and hour sources for changing an indicator at each unit a predetermined time prior to the derivation of the disable signal.

* * * * *